(12) United States Patent
Oke et al.

(10) Patent No.: US 7,768,621 B2
(45) Date of Patent: Aug. 3, 2010

(54) MANUFACTURING METHOD FOR A LIQUID CRYSTAL DISPLAY

(75) Inventors: Ryuutarou Oke, Mobara (JP); Yoshiaki Nakayoshi, Mobara (JP); Kikuo Ono, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/907,789

(22) Filed: Oct. 17, 2007

(65) Prior Publication Data

US 2008/0057606 A1 Mar. 6, 2008

Related U.S. Application Data

(62) Division of application No. 11/166,096, filed on Jun. 27, 2005, now abandoned, which is a division of application No. 09/951,971, filed on Sep. 14, 2001, now Pat. No. 6,933,989.

(30) Foreign Application Priority Data

Sep. 20, 2000 (JP) ............... 2000-286046

(51) Int. Cl.
  *G02F 1/13* (2006.01)
  *G02F 1/1343* (2006.01)
(52) U.S. Cl. ...................... 349/187; 349/141
(58) Field of Classification Search ........ 349/141, 349/187
  See application file for complete search history.

(56) References Cited

U.S. PATENT DOCUMENTS

| | | |
|---|---|---|
| 5,032,536 A | 7/1991 | Oritsuki et al. |
| 5,760,854 A | 6/1998 | Ono et al. |
| 5,914,758 A | 6/1999 | Kishida et al. |
| 6,081,308 A | 6/2000 | Jeong et al. |
| 6,255,130 B1 | 7/2001 | Kim |
| 6,281,953 B1 | 8/2001 | Lee et al. |
| 6,337,520 B1 | 1/2002 | Jeong et al. |
| 6,380,098 B1 | 4/2002 | Jeong et al. |
| 6,486,494 B2 | 11/2002 | Jeong et al. |
| 6,570,182 B2 | 5/2003 | Jeong et al. |
| 6,582,982 B2 | 6/2003 | Jeong et al. |

(Continued)

FOREIGN PATENT DOCUMENTS

JP         A-8-87031         9/1994

(Continued)

*Primary Examiner*—David Nelms
*Assistant Examiner*—Nathanael R Briggs
(74) *Attorney, Agent, or Firm*—Stites & Harbison, PLLC; Juan Carlos A. Marquez, Esq.

(57) ABSTRACT

There is provided a liquid crystal display device in which the wiring resistivity of signal lines is reduced. The liquid crystal display device includes substrates disposed in opposition to each other with a liquid crystal interposed therebetween, a thin film transistor to be driven by a scanning signal supplied from a gate signal line, and a pixel electrode to be supplied with a video signal from a drain signal line via the thin film transistor, the thin film transistor and the pixel being provided in each pixel area on a liquid-crystal-side surface of one of the substrates. The gate signal line is made of a multi-layered structure including at least an ITO film formed on the liquid-crystal-side surface and a Mo layer formed to overlie the ITO film.

2 Claims, 49 Drawing Sheets

U.S. PATENT DOCUMENTS

| | | |
|---|---|---|
| 6,686,606 B2 | 2/2004 | Jeong et al. |
| 6,762,802 B2 * | 7/2004 | Ono et al. .................... 349/38 |
| 6,946,681 B2 | 9/2005 | Jeong et al. |

FOREIGN PATENT DOCUMENTS

| | | | |
|---|---|---|---|
| JP | 08-262491 | 3/1995 |
| JP | A-8-262491 | 3/1995 |
| JP | 10-240150 | 2/1998 |
| KR | 1999-0056730 | 12/1997 |

\* cited by examiner

FIG.10

| 1 | DEPOSITION OF GATE MO/ITO |
|---|---|
| 2 | PHOTO (1) GATE PATTERNING |
| 3 | RESIST STRIPPING |
| 4 | CONTINUOUS DEPOSITION OF CVD 3 LAYERS + SD METAL |
| 5 | PHOTO (2) PROCESSING OF SD METAL AND n+ |
| 6 | RESIST REFLOW |
| 7 | PROCESSING OF a-Si LAYER |
| 8 | RESIST STRIPPING |
| 9 | DEPOSITION OF PIXEL ITO |
| 10 | PHOTO (3) PROCESSING OF PIXEL ITO |
| 11 | RESIST STRIPPING |
| 12 | PAS DEPOSITION |
| 13 | PHOTO (4) FORMATION OF PIXELS |
| 14 | RESIST STRIPPING |

FIG.17

| 1 | DEPOSITION OF GATE MO/ITO |
|---|---|
| 2 | PHOTO (1) GATE PATTERNING |
| 3 | RESIST STRIPPING |
| 4 | CONTINUOUS DEPOSITION OF CVD 3 LAYERS + SD METAL |
| 5 | PHOTO (2) HALF-EXPOSURE TECHNIQUE |
| 6 | ETCHING OF CHANNEL PORTION AND a-Si |
| 7 | RESIST STRIPPING |
| 8 | DEPOSITION OF PIXEL ITO |
| 9 | PHOTO (3) PROCESSING OF PIXEL ITO |
| 10 | RESIST STRIPPING |
| 11 | PAS DEPOSITION |
| 12 | PHOTO (4) FORMATION OF PIXELS |
| 13 | RESIST STRIPPING |

FIG.24

| | |
|---|---|
| 1 | DEPOSITION OF GATE MO/ITO |
| 2 | PHOTO (1) GATE PATTERNING |
| 3 | RESIST STRIPPING |
| 4 | CONTINUOUS DEPOSITION OF CVD 3 LAYERS + SD METAL |
| 5 | PHOTO (2) a-Si PATTERNING |
| 6 | a-Si ETCHING |
| 7 | RESIST STRIPPING |
| 8 | DEPOSITION OF PIXEL ITO |
| 9 | PHOTO (3) CHANNEL PATTERNING |
| 10 | ETCHING OF CHANNEL ITO |
| 11 | RESIST STRIPPING |
| 12 | CHANNEL ETCHING (ITO MASK) |
| 13 | PAS DEPOSITION |
| 14 | PHOTO (4) FORMATION OF PIXELS |
| 15 | RESIST STRIPPING |

FIG.39

| 1 | DEPOSITION OF GATE MO/ITO |
|---|---|
| 2 | PHOTO (1) GATE PATTERNING |
| 3 | RESIST STRIPPING |
| 4 | CONTINUOUS DEPOSITION OF CVD 3 LAYERS + SD METAL |
| 5 | PHOTO (2) HALF-EXPOSURE TECHNIQUE |
| 6 | ETCHING OF CHANNEL PORTION, a-Si AND PIXEL PART |
| 7 | RESIST STRIPPING |
| 8 | PAS DEPOSITION |
| 9 | PHOTO (3) FORMATION OF PIXELS |
| 10 | RESIST STRIPPING | ns
MANUFACTURING METHOD FOR A LIQUID CRYSTAL DISPLAY

CROSS-REFERENCE TO RELATED APPLICATION

This application is a Divisional of U.S. application Ser. No. 11/166,096 filed Jun. 27, 2005, now abandoned which is a Divisional of U.S. application Ser. No. 09/951,971 filed Sep. 14, 2001, now U.S. Pat. No. 6,933,989 which claims the priority of Japanese Patent Application No. 2000-286046 filed Sep. 20, 2000. Priority is claimed based U.S. application Ser. No. 11/166,096 filed Jun. 27, 2005, which claims the priority of U.S. application Ser. No. 09/951,971 filed Sep. 14, 2001, which claims the priority of Japanese Patent Application No. 2000-286046 filed Sep. 20, 2000, all of which is incorporated by reference.

BACKGROUND OF THE INVENTION

1. Field of the Invention

The present invention relates to a liquid crystal display device, and more particularly, to an active matrix type of liquid crystal display device.

2. Background Art

An active matrix type of liquid crystal display device includes pixel areas provided on a liquid-crystal-side surface of either one of substrates disposed in opposition to each other with a liquid crystal interposed therebetween, each of the pixel areas being an area surrounded by gate signal lines disposed to be extended in the x direction and to be juxtaposed in the y direction and drain signal lines disposed to be extended in the y direction and to be juxtaposed in the x direction.

Each of the pixel areas includes a switching element to be driven by a gate signal from either one of the gate signal lines, and a pixel electrode to be supplied with a video signal from a drain signal line via the switching element.

Two types of liquid crystal display devices are known. One is a so-called vertical electric field type of liquid crystal display device in which a counter electrode common to each pixel area is formed on the liquid-crystal-side surface of one of substrates so that the optical transmissivity of its liquid crystal is controlled by an electric field generated between the counter electrode and a pixel electrode approximately perpendicularly to the substrates. The other is a so-called in-plane-switching type of liquid crystal display device in which a pixel electrode and an adjacent counter electrode are formed in each pixel area on a substrate on which pixel electrodes are formed, so that the optical transmissivity of its liquid crystal is controlled by an electric field generated between the pixel electrode and the counter electrode approximately in parallel with the substrate.

However, it has been demanded that the gate signal lines or the drain signal lines of such a liquid crystal display device have smaller wiring resistivity to cope with a recent increase in panel size.

In other words, by reducing the wiring resistivity of these signal lines, it is possible to restrain the delay of signals, whereby it is possible to achieve far larger panel sizes.

However, even if the wiring resistivity of these signal lines can be reduced, it is necessary to avoid an increase in the number of manufacturing processes because yield factor decreases.

In addition, in the case where a conductive layer, a semiconductor layer and an insulating layer are stacked in a predetermined pattern on a liquid-crystal-surface side of a substrate, the resultant steep steps are required to be made as smooth as possible in terms of an improvement in the yield factor. This is because a film undergoes climb-over damages in portions where the steps are present.

SUMMARY OF THE INVENTION

The invention has been made in view of the above-described problems, and one object of the invention is to provides a liquid crystal display device in which the wiring resistivity of signal lines is small.

Another object of the invention is to provide a liquid crystal display device in which few steep steps are present on a liquid-crystal-side surface of a substrate.

Another object of the invention is to provide a manufacturing method for a liquid crystal display device in which the number of manufacturing processes is made small.

Representative aspects of the invention disclosed in the present application will be described below in brief.

A liquid crystal display device according to the invention includes: substrates disposed in opposition to each other with a liquid crystal interposed therebetween; a thin film transistor to be driven by a scanning signal supplied from a gate signal line; and a pixel electrode to be supplied with a video signal from a drain signal line via the thin film transistor, the thin film transistor and the pixel being provided in each pixel area on a liquid-crystal-side surface of one of the substrates. The gate signal line is made of a multi-layered structure including, for example, an ITO film formed on the liquid-crystal-side surface, and a Mo layer formed to overlie the ITO film.

In the liquid crystal display device constructed in this manner, the wiring resistivity of the gate signal lines is made small by using Mo or the like which has a small resistivity.

In this case, the reason why the ITO film or the like is interposed between the Mo layer and the substrate is that if the gate signal line is made of a single layer of Mo or the like, the adhesion of the gate signal line to the substrate becomes insufficient.

In the case where the gate signal line made of such multi-layered structure is formed by selective etching, the side walls of the gate signal line are respectively formed to have tapered surfaces which become gradually more open toward the substrate, whereby it is possible to decrease steep steps.

A manufacturing method for a liquid crystal display device according to the invention includes the steps of: forming, on a substrate, gate signal lines each made of a stacked structure in which a transparent conductive film and a metal layer are stacked in that order; forming an insulating film to cover the gate signal lines; forming, on the insulating film, a stacked structure in which a semiconductor layer, a high-concentration layer and a conductive layer are stacked in that order; performing selective etching of the conductive layer and the high-concentration layer by using a resist reflow method, to form drain electrodes and source electrodes for thin film transistors as well as drain signal lines and to perform selective etching of the semiconductor layer; forming pixel electrodes each of which is in part directly superposed on the source electrode of the corresponding one of the thin film transistors; and forming a protective film and opening, in the protective film, apertures for exposing the respective pixel electrodes.

In the manufacturing method for the liquid crystal display device constructed in this manner, although the formation of the semiconductor layer and the formation of the drain electrode and the source electrode have heretofore been performed with individual photo-processes, such individual photo-process can be replaced with one photo-process by using the resist reflow method, whereby it is possible to reduce the entire manufacturing process.

At the same time that holes are formed in the protective film, holes at gate terminal parts and drain terminal parts are formed, whereby it is possible to reduce the entire manufacturing process.

BRIEF DESCRIPTION OF THE DRAWINGS

The invention will become more readily appreciated and understood from the following detailed description of preferred embodiments of the invention when taken in conjunction with the accompanying drawings, in which:

FIG. 10 is a table showing one embodiment of a manufacturing method for the liquid crystal display device shown in FIG. 1;

FIG. 17 is a table showing one embodiment of a manufacturing method for the liquid crystal display device according to the invention;

FIG. 24 is a table showing one embodiment of a manufacturing method for the liquid crystal display device according to the invention;

FIG. 39 is a table showing one embodiment of the liquid crystal display device shown in FIG. 25;

DETAILED DESCRIPTION OF THE INVENTION

Embodiments of the liquid crystal display device according to the invention will be described below with reference to the accompanying drawings.

Embodiment 1

Equivalent Circuit

Figure 54:
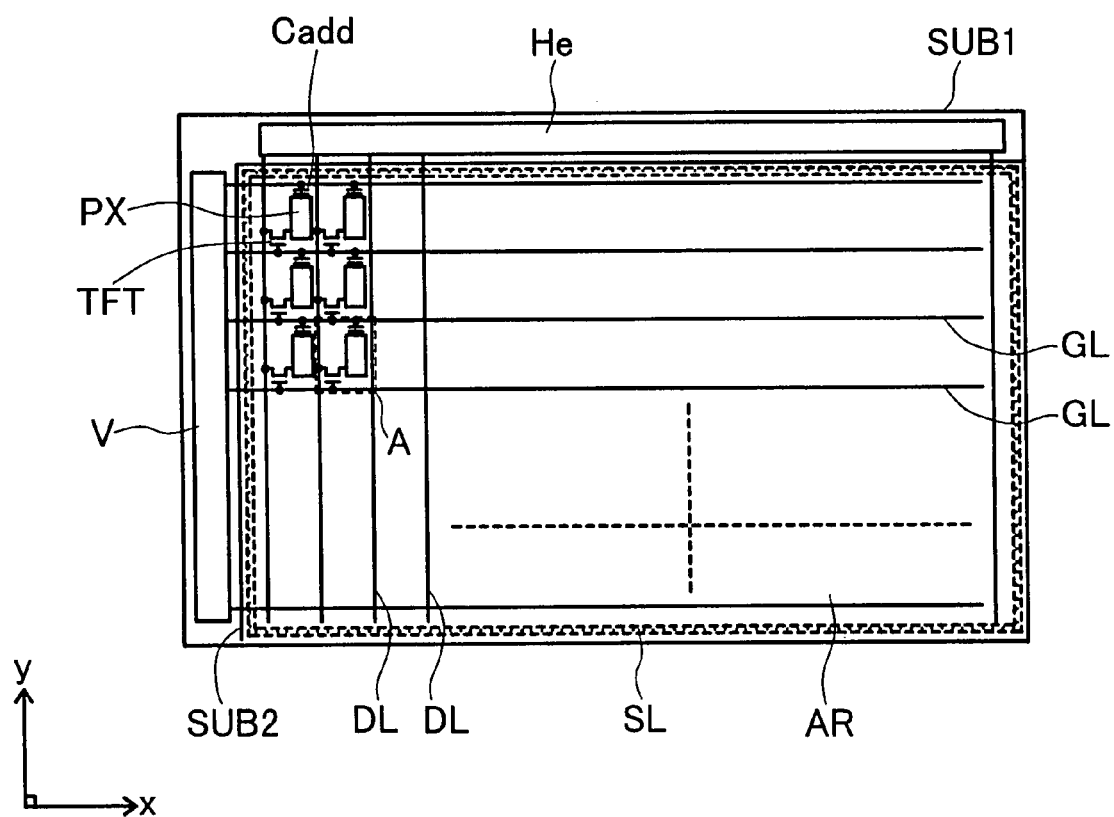
FIG. 54 is a view showing one embodiment of the equivalent circuit of the liquid crystal display device according to the invention.

FIG. 54 is an equivalent circuit diagram showing one embodiment of the liquid crystal display device according to the invention. FIG. 54 is a circuit diagram which is depicted to correspond to the actual geometrical layout of the liquid crystal display device.

In FIG. 54, there is shown a transparent substrate SUB1. This transparent substrate SUB1 is disposed to be opposed to another transparent substrate SUB2 with a liquid crystal interposed therebetween.

Gate signal lines GL and drain signal lines DL are formed on a liquid-crystal-side surface of the transparent substrate SUB1. The gate signal lines GL are disposed to be extended in the x direction and to be juxtaposed in the y direction as viewed in FIG. 54, while the drain signal lines DL are insulated from the gate signal lines GL and are disposed to be extended in the y direction and to be juxtaposed in the x direction as viewed in FIG. 54. Rectangular areas each of which is surrounded by adjacent ones of the gate signal lines GL and adjacent ones of the drain signal lines DL constitute pixel areas, respectively, and a display part AR is formed by an aggregation of these pixel areas.

A thin film transistor TFT and a pixel electrode PX are formed in each of the pixel areas. The thin film transistor TFT is driven by the supply of a scanning signal (voltage) from one of the adjacent gate signal lines GL, and a video signal (voltage) is supplied to the pixel electrode PX from one of the adjacent drain signal lines DL via the thin film transistor TFT.

A capacitance element Cadd is formed between the pixel electrode PX and the other of the adjacent gate signal lines GL so that when the thin film transistor is turned off, a video signal supplied to the pixel electrode PX is stored in the capacitance element Cadd for a long time.

The pixel electrode PX in each of the pixel areas is arranged to generate an electric field between the pixel electrode PX and a counter electrode CT (not shown) formed in common to each of the pixel areas on a liquid-crystal-side surface of the other transparent substrate SUB2 which is disposed to be opposed to the transparent substrate SUB1 with the liquid crystal interposed therebetween. The optical transmissivity of the liquid crystal between each of the pixel electrodes PX and the counter electrode CT is controlled by the electric field.

One end of each of the gate signal lines GL is formed to be extended to one side (in FIG. 54, the left-hand side) of the transparent substrate SUB1, and the extended portion (which will be hereinafter called a gate terminal part GTM) is connected to a bump of a vertical scanning circuit (semiconductor integrated circuit) V mounted on the transparent substrate SUB1.

In addition, one end of each of the drain signal lines DL is formed to be extended to one side (in FIG. 54, the top side) of the transparent substrate SUB1, and the extended portion (which will be hereinafter called a drain terminal part DTM) is connected to a video signal driver circuit (semiconductor integrated circuit) He mounted on the transparent substrate SUB1.

The transparent substrate SUB2 is disposed to be opposed to the area (display part AR) of the transparent substrate SUB1 that avoids an area in which the vertical scanning circuit V and the video signal driver circuit He are mounted.

The transparent substrate SUB2 is secured to the transparent substrate SUB1 by a sealing material SL formed in the periphery of the transparent substrate SUB2, and this sealing material SL also has the function of sealing the liquid crystal between the transparent substrates SUB1 and SUB2.

<<Construction of Pixel>>

Figure 1:
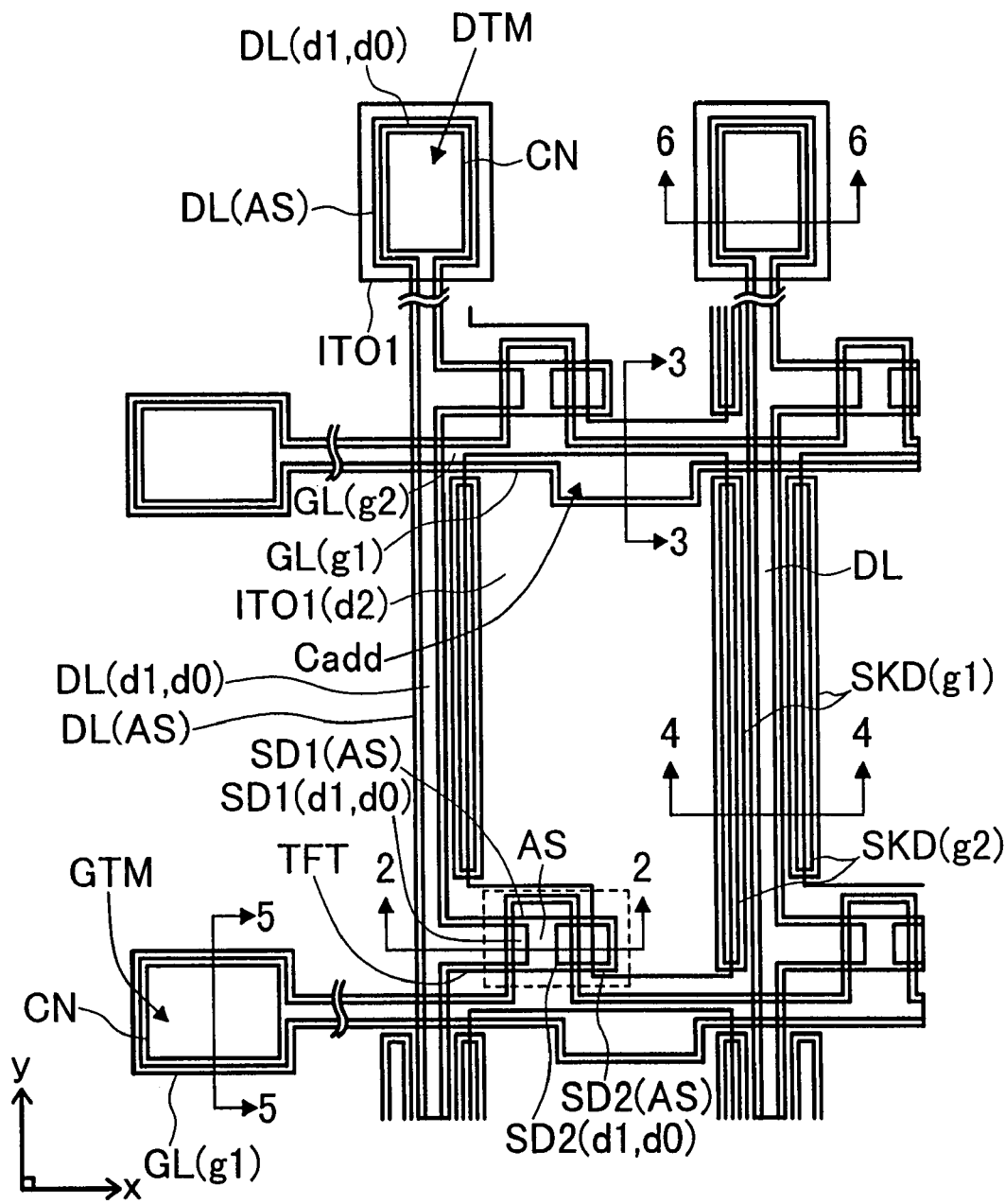
FIG. 1 is a plan view showing one embodiment of a pixel of a liquid crystal display device according to the invention.
Figure 2:
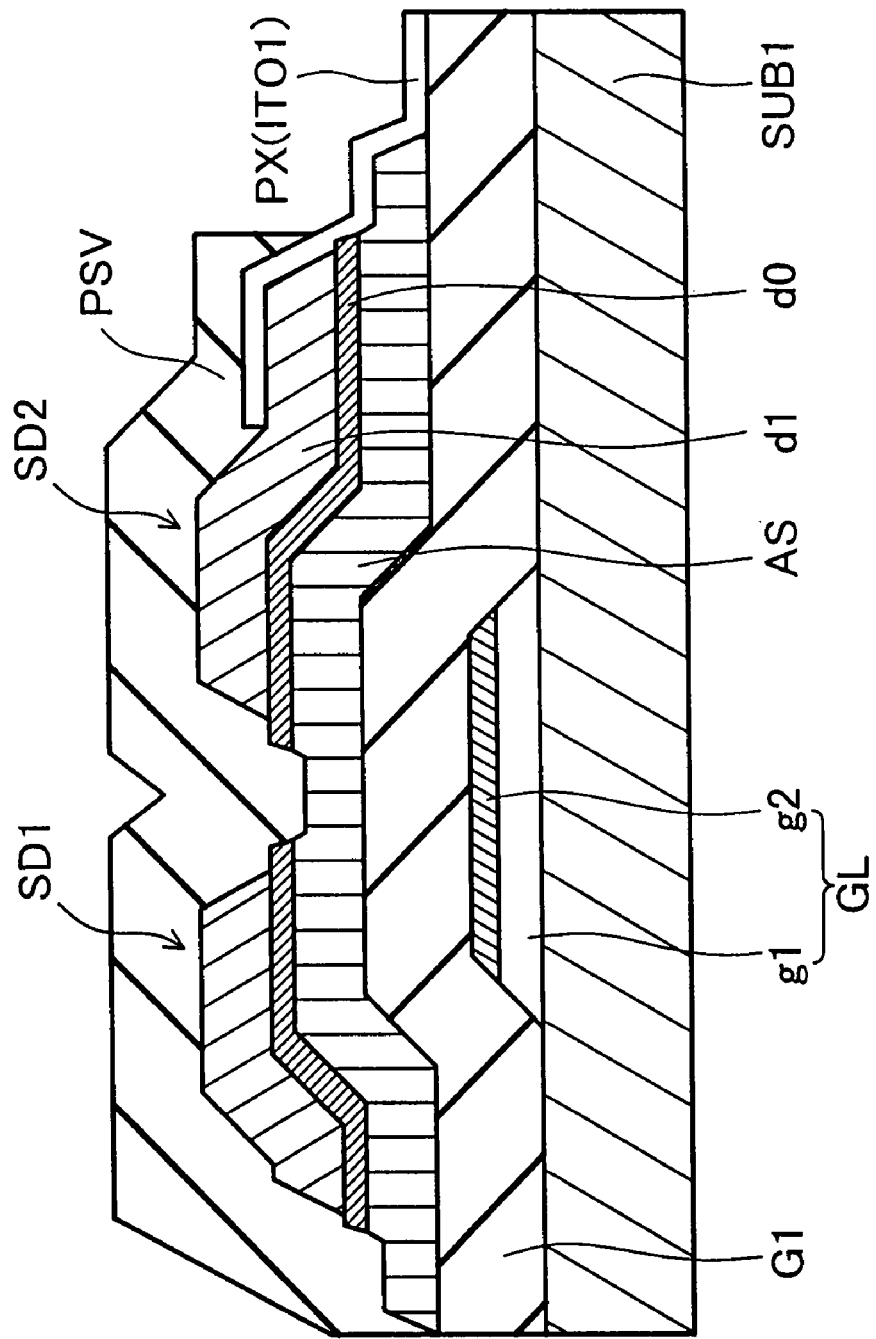
FIG. 2 is a cross-sectional view taken along line 2-2 of FIG. 1.
Figure 3:
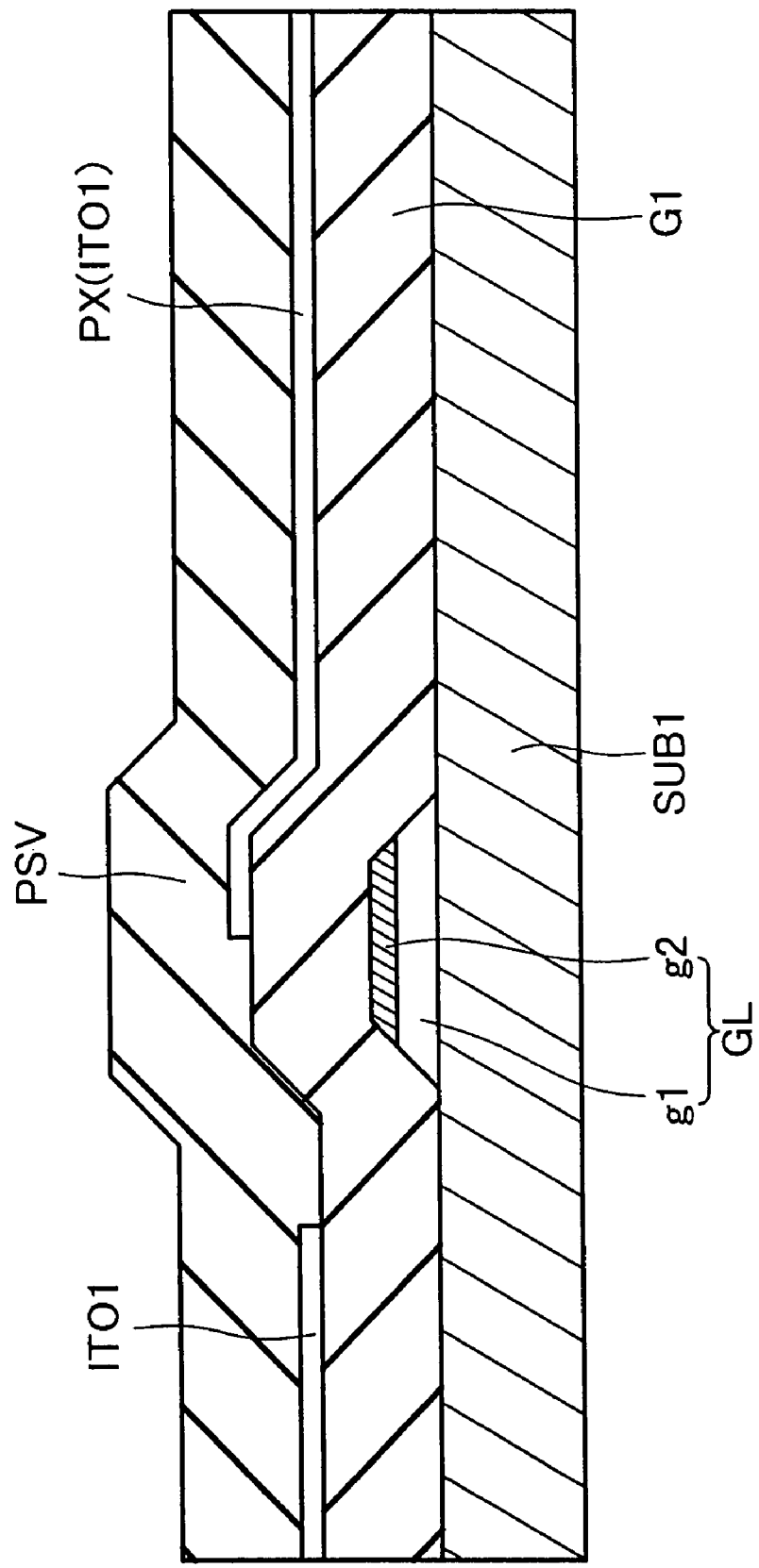
FIG. 3 is a cross-sectional view taken along line 3-3 of FIG. 1.
Figure 4:
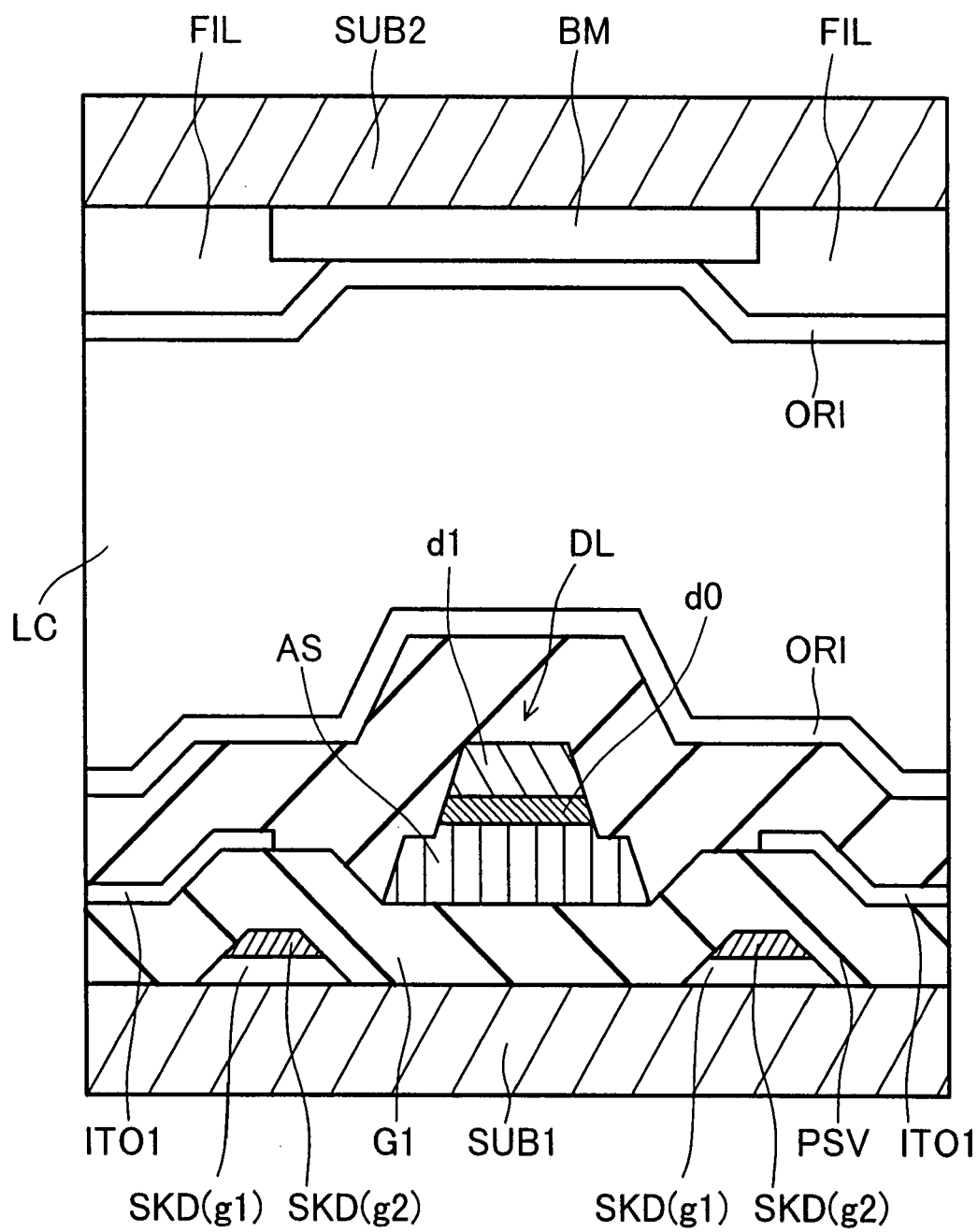
FIG. 4 is a cross-sectional view taken along line 4-4 of FIG. 1.
Figure 5:
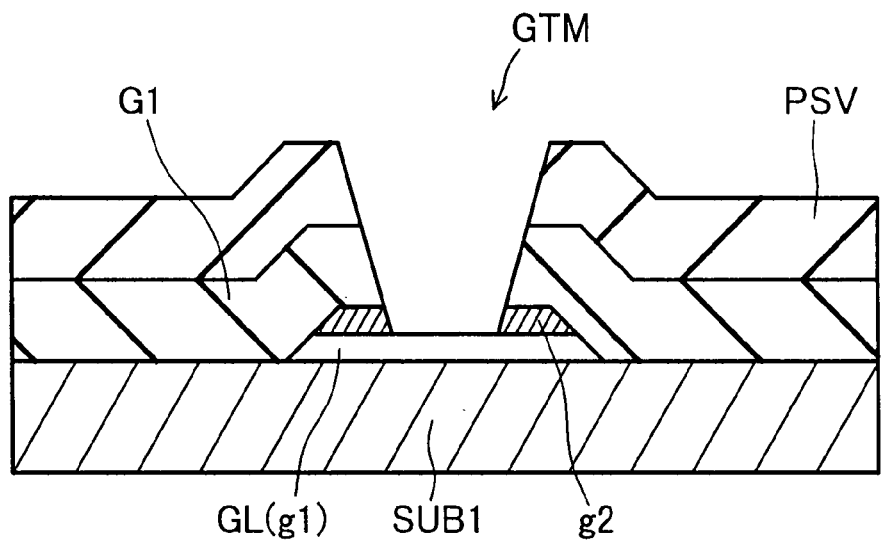
FIG. 5 is a cross-sectional view taken along line 5-5 of FIG. 1.
Figure 6:
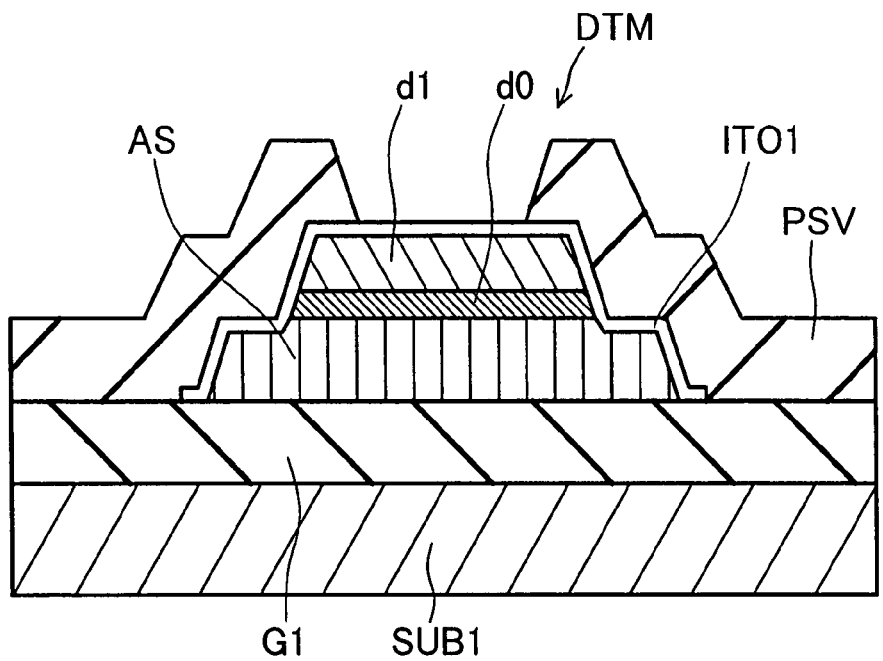
FIG. 6 is a cross-sectional view taken along line 6-6 of FIG. 1.

FIG. 1 shows the construction of one pixel (corresponding to the portion shown in a dotted frame A of FIG. 54) on the liquid-crystal-side surface of the transparent substrate SUB1, as well as the constructions of terminal parts for supplying a scanning signal and a video signal to the pixel. FIG. 2 shows a cross-sectional view taken along line 2-2 of FIG. 1, FIG. 3 shows a cross-sectional view taken along line 3-3 of FIG. 1, FIG. 4 shows a cross-sectional view taken along line 4-4 of FIG. 1, FIG. 5 shows a cross-sectional view taken along line 5-5 of FIG. 1, and FIG. 6 shows a cross-sectional view taken along line 6-6 of FIG. 1.

The gate signal lines GL disposed to be extended in the x direction and to be juxtaposed in the y direction as viewed in FIG. 1 are formed on the liquid-crystal-side surface of the transparent substrate SUB1. Each of these gate signal lines GL is made of a two-layer structure which includes an ITO (Indium-tin-Oxide) film as its lower layer and a molybdenum (MO) film as its upper layer.

One end (in FIG. 1, the left-hand side) of each of the gate signal lines GL is formed to be extended outwardly from the display part AR, and the extended portion is formed as the gate terminal part GTM having a comparatively large area.

The gate signal lines GL and the drain signal lines DL which will be described later surround the rectangular area, and this rectangular area is constructed as a pixel area.

A portion of each of the gate signal lines GL has an extended portion which projects into the pixel area, and this extended portion has the function of the gate electrode of the thin film transistor TFT which will be described later.

In addition, another portion of each of the gate signal lines GL has an extended portion which projects into another pixel area disposed adjacently to the pixel area in the −y direction, and this extended portion has the function of one electrode of the capacitance element Cadd (the other electrode of which is the pixel electrode PX).

In the pixel area, light shield films SKD are formed to run adjacently to and in parallel with the respective drain signal lines DL. These light shield films SKD are formed in parallel with the gate signal lines GL, and have a two-layer structure which includes an ITO film as its lower layer and a Mo film as its upper layer.

These light shield films SKD, together with a black matrix BM formed on the glass substrate SUB2, can highly reliably block light due to the disorder of alignment of the liquid crystal in the periphery of the pixel electrode PX (particularly, along the sides of the pixel electrode PX that are parallel to the y direction in FIG. 1).

An insulating film GI (refer to FIGS. 2 and 6) is formed on the liquid-crystal-side surface of the transparent substrate SUB1 on which the gate signal lines GL and the light shield films SKD are formed in the above-described manner. This insulating film GI has the function of an interlayer insulating film between the gate signal lines GL and the drain signal lines DL which will be described later, the function of gate insulating films for the thin film transistors TFT which will be described later, and the function of dielectric films for the capacitance elements Cadd which will be described later.

A semiconductor layer AS made of, for example, amorphous Si (a-Si) is formed on the upper surface of the insulating film GI in such a manner as to traverse the extended portion of each of the gate signal lines GL that projects into the pixel area.

This semiconductor layer AS constitutes the semiconductor layer of the thin film transistor TFT, and a drain electrode SD1 and a source electrode SD2 are formed on the upper surface of the semiconductor layer AS, whereby a reversed staggered structure MIS transistor is formed which uses the extended portion of the gate signal line GL as its gate electrode.

Incidentally, this semiconductor layer AS is formed not only in the region in which the thin film transistor TFT is formed, but is formed to be integrally extended into the region in which the drain signal line DL to be described later is formed. This construction is intended to strengthen the interlayer insulation of the drain signal line DL from the gate signal line GL.

The drain electrode SD1 and the source electrode SD2 on the semiconductor layer AS are formed at the same time as the drain signal line DL.

Specifically, the drain signal lines DL which are disposed to be extended in the y direction and to be juxtaposed in the x direction as viewed in FIG. 1 are formed on the upper surface of the insulating film GI (the semiconductor layer AS underlies the drain signal lines DL), and a part of each of the drain signal lines DL is formed to be extended to the upper surface of the semiconductor layer AS of the thin film transistor TFT and forms the drain electrode SD1.

Incidentally, one end (in FIG. 1, the top side) of each of the drain signal lines DL is formed to be extended outwardly from the display part AR, and the extended portion is formed as the gate terminal part GTM having a comparatively large area.

The source electrode SD2 is formed to be spaced apart from the drain electrode SD1 by a distance equivalent to the channel length of the thin film transistor TFT.

This source electrode SD2 is formed to be extended into the pixel area from above the semiconductor layer AS of the thin film transistor TFT, and this extended portion is formed as a part for connection to the pixel electrode PX which will be described later.

The drain signal lines DL, the drain electrodes SD1 and the source electrodes SD2 are formed of, for example, molybdenum (Mo).

Incidentally, a high-concentration layer $d_0$ doped with an impurity is formed at the interface between the semiconductor layer AS and each of the source electrode SD2 and the drain electrode SD1 (refer to FIG. 2). This high-concentration layer $d_0$ functions as a contact layer of the thin film transistor TFT.

In addition, the high-concentration layer $d_0$ is formed at the interface between the drain signal lines DL and the underlying semiconductor layer AS (refer to FIG. 4).

The pixel electrode PX made of, for example, ITO (Indium-Tin-Oxide) film is formed on the central portion of the upper surface of the insulating film GI except the narrow periphery thereof within the pixel area.

The side of the pixel electrode PX that is adjacent to the thin film transistor TFT is formed to avoid the region in which the thin film transistor TFT is formed and to be superposed on and connected to the extended portion of the source electrode SD2.

The sides of the pixel electrode PX that are adjacent to the respective drain signal lines DL are formed so that the outlines of the respective sides are superposed on the central axes (or approximately central axes) of the respective light shield films SKD.

Each of the light shield films SKD mainly functions to block light leak due to an electric field generated between the pixel electrode PX and an adjacent one of the drain signal lines DL as well as light due to the alignment disorder of the liquid crystal due to an electric field generated from the adjacent one of the drain signal lines DL in the periphery of the pixel electrode PX.

Furthermore, the pixel electrode PX is formed to slightly overlap the gate signal line GL for driving the thin film transistor TFT and the other gate signal line GL (the gate signal line GL shown on the upper side of FIG. 1) which is disposed adjacent to the gate signal line GL with the pixel electrode PX interposed therebetween.

The other gate signal line GL has an extended portion which projects into the pixel area as described previously, and the pixel electrode PX is superposed on the other gate signal line GL via the insulating film GI in a comparatively large area.

The capacitance element Cadd which uses the insulating film GI as its dielectric film is formed in the portion in which the pixel electrode PX and the other gate signal line GL are superposed on each other. The capacitance element Cadd serves, for example, the effect of enabling a video signal supplied to the pixel electrode PX to be stored for a comparatively long time even when the thin film transistor TFT is turned off.

A protective film PSV which is made of, for example, SiN is formed on the surface of the transparent substrate SUB1 formed in the above-described manner.

This protective film PSV is provided for preventing the thin film transistor TFT from coming into direct contact with the liquid crystal, and apertures are formed in the areas of the protective film PSV in which the respective pixel electrodes PX are formed.

Specifically, the protective film PSV is formed so that the central portion of the pixel electrode PX except the periphery thereof is exposed (refer to FIG. 2). In this construction, since the protective film PSV is absent in the portion of the pixel area through which to transmit light, it is possible to prevent the absorption of light into the protective film PSV.

An alignment layer ORI which covers the entire area of the display part AR is formed on the surface of the transparent substrate SUB1 formed in the above-described manner (refer to FIG. 4), and serves to determine the initial alignment direction of a liquid crystal LC which is in direct contact with the alignment layer ORI.

As shown in FIG. 4, the black matrix BM is formed on the liquid-crystal-LC-side surface of the transparent substrate SUB2 so as to partition each of the pixel areas from the adjacent one. Color filters FIL having colors corresponding to the respective pixel areas are individually formed in apertures formed in the portions of the black matrix BM that correspond to the respective pixel areas.

Another alignment layer ORI which covers the entire area of the display part AR is formed on the surface of the transparent substrate SUB2 formed in the above-described manner, and serves to determine the initial alignment direction of the liquid crystal LC which is in direct contact with the alignment layer ORI.

<<Gate Signal Line GL>>

Each of the gate signal lines GL is made of a two-layer structure, and its lower layer is made of an ITO (Indium-Tin-Oxide) film g1, while its upper layer is made of a Mo layer g2, as shown in FIGS. 2 or 3 by way of example.

In the recent trend toward increased sizes of liquid crystal display panels, it has been desired to reduce the resistivity of each of the gate signal lines GL, and the Mo layer g2 is selected as the main material of the gate signal lines GL. However, if the Mo layer g2 is used as a single layer, the adhesion of the Mo layer g2 to the transparent substrate SUB1 which is a base substrate becomes insufficient. For this reason, the ITO film g1 is used as an intermediate layer.

By subjecting each of the gate signal lines GL having the two-layer structure to selective etching which allows for the etching rates of the respective layers (as will be described later), tapered surfaces which become gradually more open toward the transparent substrate SUB1 can be formed on the side walls of each of the gate signal lines GL, whereby it is possible to prevent so-called climb-over disconnection of the drain signal lines DL which climb over the gate signal lines GL and it is also possible to prevent so-called climb-over damage to the protective film PSV.

During the formation of the gate terminal parts GTM of the respective gate signal lines GL, there may be a case where selectivity to the Mo layer g2 cannot be ensured when contact holes are to be formed by dry-etching the protective film PSV and the insulating film GI. However, since the ITO film g1 remains as a so-called stopper, the gate terminal parts GTM can be formed with good reliability.

Figure 7A:
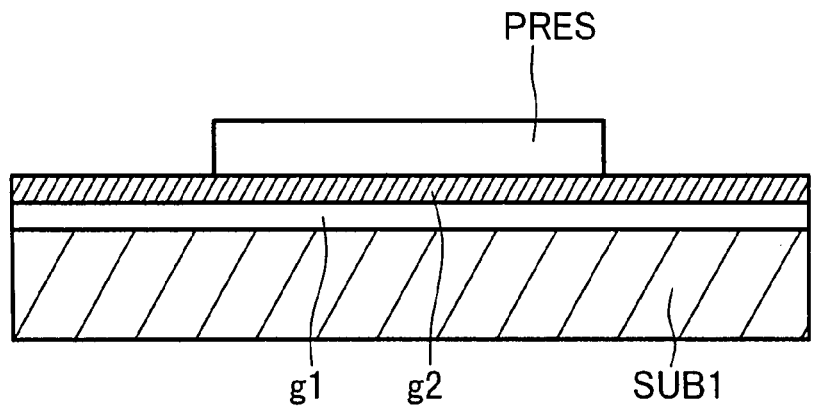
FIGS. 7A to 7C are process diagrams showing one embodiment of a manufacturing method for the gate signal lines GL shown in FIG. 1.
Figure 7B:
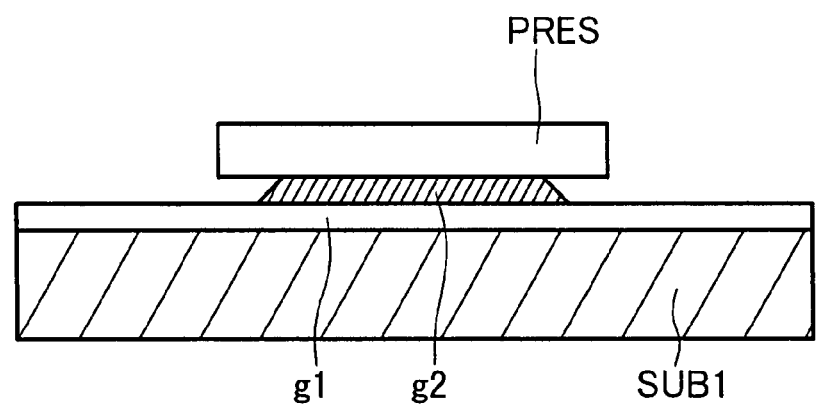
Figure 7C:
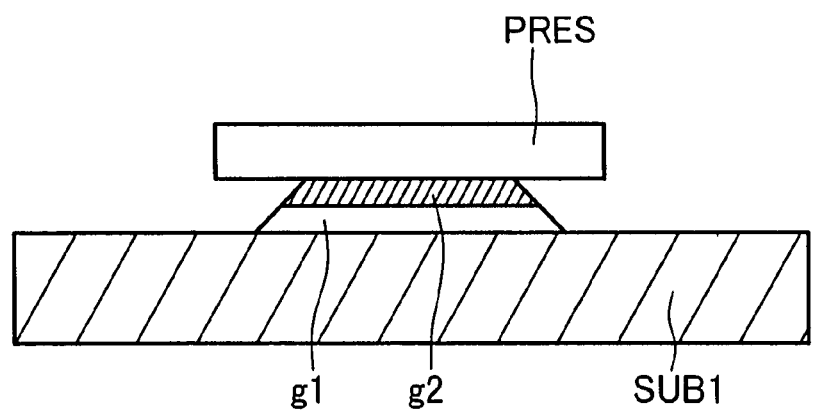

FIGS. 7A to 7C are process diagrams showing one embodiment of a method of forming one of the above-described gate signal lines GL.

First, as shown in FIG. 7A, the ITO film g1 is formed on the main surface of the transparent substrate SUB1, and the Mo layer g2 is formed on the upper surface of the ITO film g1. Then, a photoresist film PRES is formed on the surface of the Mo layer g2, and this photoresist film PRES is selectively exposed by using a photomask (not shown). After that, the photoresist film PRES is developed so that the photoresist film PRES is left in an area in which to form the gate signal line GL.

Then, the photoresist film PRES is used as a mask to selectively etch the portion of the Mo layer g2 that is exposed from this mask. The etching solution used in this step is selected from, for example, a mixed acid containing phosphoric acid and nitric acid and a mixed solution of cerium nitrate and nitric acid. In this case, tapered surfaces which become gradually more open toward the transparent substrate SUB1 are respectively formed on the side walls of the remaining Mo layer g2.

Then, the photoresist film PRES is again used as a mask to selectively etch the portion of the ITO film g1 that is exposed from this mask. The etching solution used in this step is, for example, aqua regia (a mixed solution of hydrochloric acid and nitric acid). In this case, tapered surfaces which become gradually more open toward the transparent substrate SUB1 are respectively formed on the side walls of the remaining Mo layer g1.

After that, the photoresist film PRES is removed, whereby the gate signal line GL is formed on the transparent substrate SUB1. This gate signal line GL has side walls which respectively have gently tapered surfaces which become gradually more open toward the transparent substrate SUB1, whereby it is possible to fully prevent a layer to be stacked in a later step from undergoing damages such as cuttings due to steps.

<<Drain Signal Line DL>>

A cross section of one of the drain signal lines DL is clearly shown in FIG. 4. The shown drain signal line DL is formed in parallel with the thin film transistors TFT formed by a resist reflow method which will be described later, and is made of a stacked structure in which the semiconductor layer AS made of a-Si, the high-concentration layer $d_0$ formed on the surface of the semiconductor layer AS, and a Mo layer $d_1$ are stacked in that order.

Accordingly, as shown in FIG. 4, tapered surfaces which become gradually more open toward the transparent substrate SUB1 are respectively formed on the side walls of the drain signal line DL, and steps are respectively formed midway on these tapered surfaces, specifically, in the portion of the semiconductor layer AS that underlies the high-concentration layer do.

Therefore, it is possible to reliably prevent the drain signal line DL from causing so-called climb-over damage to the protective film PSV and the alignment layer ORI.

The climb-over damage occurring in this case causes the problem that a crack or the like occurs in the protective film PSV in the vicinity of either of the side walls of the drain signal line DL and the material of the drain signal line DL is ionized through this crack and solved out in the liquid crystal, thus changing the resistivity of the liquid crystal.

<<Thin Film Transistor TFT>>

FIG. 2 is a view showing a cross section of one of the thin film transistors TFT. The shown thin film transistor TFT is formed by using a so-called resist reflow method which will be described later.

The gate signal line GL which constitutes part of the gate electrode of the thin film transistor TFT has side walls formed in a tapered shape which becomes gradually more open toward the transparent substrate SUB1, whereby the insulating film GI, the drain electrode SD1 and the source electrode SD2 are stacked in that portion can be prevented from being damaged by steps.

The pixel electrode PX electrically connected to the source electrode SD2 of the thin film transistor TFT is formed to be directly stacked on the source electrode SD2. Accordingly, the protective film PSV which prevents the thin film transistor TFT from coming in direct contact with the liquid crystal LC is formed to overlie the pixel electrode PX.

Specifically, the pixel electrode PX is positioned as a layer which underlies the protective film PSV, whereby the formation of a contact hole to the protective film PSV is avoided with respect to the electrical connection between the source electrode SD2 of the thin film transistor TFT and the pixel electrode PX.

The thin film transistor TFT formed by a resist reflow method has side walls formed by a stacked structure in which the semiconductor layer AS, the high-concentration layer $d_0$ and the drain electrode SD1 or the source electrode SD2 are stacked in that order. The respective side walls are formed to have tapered surfaces which become gradually more open toward the transparent substrate SUB1, and steps are respectively formed midway on these tapered surfaces, specifically, in the portion of the semiconductor layer AS that underlies the high-concentration layer do.

Therefore, it is possible to reliably prevent the drain signal line DL from causing so-called climb-over damage to the protective film PSV and the alignment layer ORI.

In particular, the pixel electrode PX is made of a material which is comparatively easily damaged at a location where the pixel electrode PX climbs over a step. In addition, the pixel electrode PX must be formed to climb over the stacked structure and overlap the source electrode SD2. However, since the steps are respectively formed on the tapered surfaces of the side walls of the stacked structure, the pixel electrode PX can be fully prevented from undergoing climb-over damage due to the step.

FIGS. 8A to 8F are process diagrams showing one embodiment of a method of forming the above-described thin film transistor TFT.

Figure 8A:
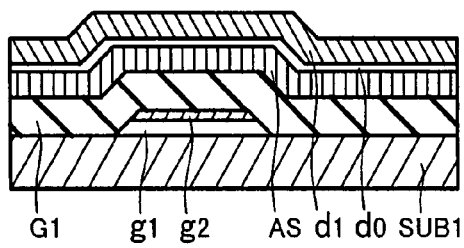
FIGS. 8A to 8F are process diagrams showing one embodiment of a manufacturing method for the thin film transistor shown in FIG. 1.

First, as shown in FIG. 8A, after a gate signal line GL and an insulating film GI have been formed, a semiconductor layer AS is formed on the surface of this insulating film GI and a high-concentration layer $d_0$ is formed on the surface of the semiconductor layer AS, and a Mo layer $d_1$ is formed on the high-concentration layer $d_0$. In this case, the semiconductor layer AS, the high-concentration layer $d_0$ and the Mo layer $d_1$ are continuously deposited in the same chamber.

Figure 8E:
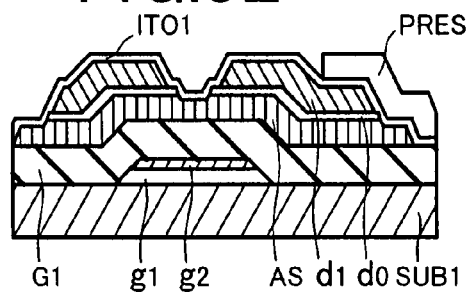
Figure 8B:
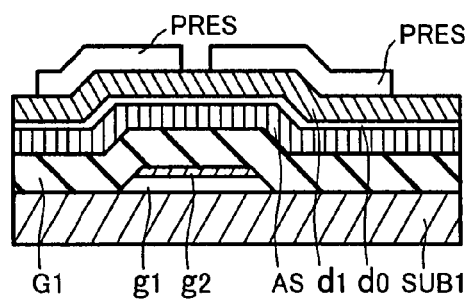

As shown in FIG. 8B, a photoresist film PRES is formed on the surface of the Mo layer $d_1$, and the portions of the photoresist film PRES that correspond to portions in which to form a drain signal line DL, a drain electrode SD1 and a source electrode SD2 are left through selective exposure using a photomask.

Figure 8F:
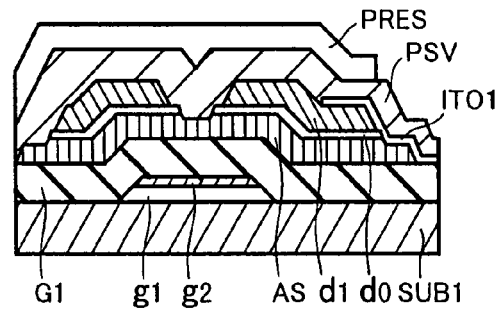
Figure 8C:
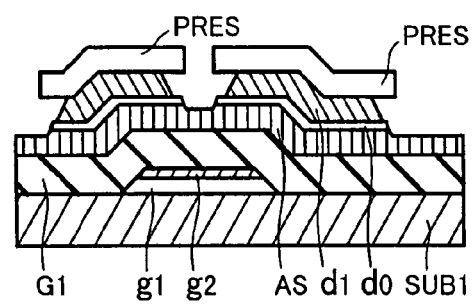

As shown in FIG. 8C, the photoresist film PRES is used a mask, and the portion of the Mo layer $d_1$ that is exposed from this mask is selectively etched (for example, a mixed acid containing phosphoric acid and nitric acid or a mixed solution of cerium nitrate and nitric acid is selected for this etching), and further, the high-concentration layer $d_0$ is dry-etched. In this case, the surface of the semiconductor layer AS is cut to a slight extent.

Incidentally, the etching of the high-concentration layer $d_0$ is not limited to only the above-described method, and after the selective etching of the Mo layer $d_1$, this Mo layer $d_1$ may be used as a mask to etch the high-concentration layer do.

Figure 8D:
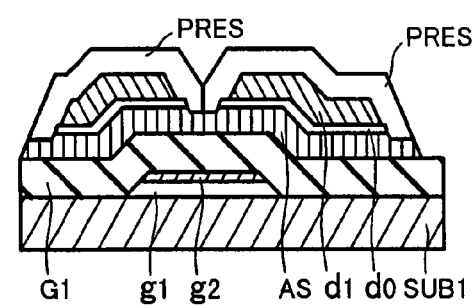

As shown in FIG. 8D, the photoresist film PRES is made to reflow. By this treatment, the peripheral portions of the photoresist film PRES are sagged, and the sagged portions also function as a mask. The method of reflowing the photoresist film PRES is, for example, baking, dissolution in an organic solvent atmosphere or immersion in water.

In this step, the sags of the photoresist film PRES need to completely cover the portion (channel region) between the drain electrode SD1 and the source electrode SD2. To this end, in the step shown in FIG. 8B, the pattern width of the photoresist film PRES in this portion needs to be made as narrow as possible.

Furthermore, this photoresist film PRES is used as a mask to selectively etch the portion of the semiconductor layer AS that is exposed from this mask.

Then, the photoresist film PRES is removed. It is preferable to subject the photoresist film PRES to so-called MEA stripping after ashing has been performed, because if the baking of the photoresist film PRES is performed during the reflow thereof, the photoresist film PRES becomes difficult to strip.

As shown in FIG. 8E, an ITO film ITO1 is formed, and a photoresist film PRES is formed in a portion which corresponds to an area in which to form a pixel electrode PX (as well as a drain terminal part DTM). This photoresist film PRES is used as a mask to remove the portion of the ITO film ITO1 that is exposed from this mask. After that, the photoresist film PRES is removed.

As shown in FIG. 8F, a protective film PSV is formed, and a photoresist film PRES is formed so that an aperture is formed in the central portion of the pixel area (including the region in which the thin film transistor TFT is formed) except the periphery of the pixel area.

This photoresist film PRES is used as a mask to remove the portion of the protective film PSV that is exposed from this mask. Incidentally, at the same time that holes are formed in this protective film PSV, holes at the gate terminal parts GTM and the drain terminal parts DTM are also formed. After that, the photoresist film PRES is removed.

<<Capacitance Element Cadd>>

FIG. 3 is a view showing a cross section of one of the capacitance elements Cadd. The pixel electrode PX is formed in such a manner that a part of the pixel electrode PX is superposed on a part of the gate signal line GL with the insulating film GI interposed therebetween, and the insulating film GI serves as the dielectric film of the capacitance element Cadd.

As described above, since the pixel electrode PX is formed to be positioned as a layer underlying the protective film PSV, the dielectric film of the capacitance element Cadd does not use a two-layer structure made of the protective film PSV and the insulating film GI, and is formed of only the insulating film GI.

For this reason, the capacitance value of the capacitance element Cadd can be set by the film thickness of the insulating film GI and the area of superposition between the gate signal line GL and the pixel electrode PX, whereby the capacitance value of the capacitance element Cadd can readily be set.

Steps due to the gate signal line GL easily appear on the surface of the dielectric film of the capacitance element Cadd owing to the fact that the dielectric film is formed of only the insulating film GI. However, the gate signal line GL has a two-layer structure which includes the ITO film g1 as its lower layer and the Mo layer g2 as its upper layer, and the side walls of the gate signal line GL is formed in the shape of a gentle taper, whereby in the case where part of the pixel electrode PX is superposed on the gate signal line GL, it is possible to fully prevent the pixel electrode PX from being damaged at a location where the pixel electrode PX climbs over a step.

<<Black Matrix BM>>

A cross section of the black matrix BM is shown in FIG. 4. FIG. 4 shows that the black matrix BM is formed to cover only the drain signal line DL, but the black matrix BM is also formed to cover the gate signal lines GL and the thin film transistors TFT.

This construction is intended to improve contrast and to prevent a variation in the characteristics of the thin film transistor TFT due to irradiation with external light.

The light shield films SKD which are formed at the same time as the gate signal lines GL are formed on the opposite sides of the drain signal line DL, and the black matrix BM which covers the drain signal line DL is formed so that the widthwise opposite ends of the black matrix BM are respectively positioned over the light shield films SKD.

<<Gate Terminal Part GTM>>

FIG. 5 is a view showing a cross section of one of the gate terminal parts GTM. The shown gate terminal part GTM is formed by opening apertures, respectively, in the protective film PSV and the insulating film GI in that order (by selective etching using dry etching) and exposing an extending end of the gate signal line GL. The opening of the apertures is performed at the same time as the opening of apertures in the protective film PSV in the respective pixel areas.

As is apparent from FIG. 5, the gate signal line GL which has been formed of the ITO film g1 as the lower layer and the Mo layer g2 as the upper layer is formed with the overlying Mo layer g2 being removed at the gate terminal part GTM. This is because the Mo layer g2 for which no selection ratio can be ensured is etched while the apertures are being opened in the protective film PSV and the insulating film GI by dry etching.

However, the underlying ITO film g1 having the function of a stopper of the etching is left, and the function of the gate terminal part GTM is fully realized by the ITO film g1. In addition, the ITO film g1 is made of a material which cannot easily be oxidized, whereby it is possible to form, for example, the gate terminal part GTM having reliability in resistance to electrolytic corrosion.

<<Drain Terminal Part DTM>>

FIG. 6 is a view showing a cross section of one of the drain terminal parts DTM. The shown drain terminal part DTM is formed by opening an aperture in the protective film PSV (by selective etching) and exposing an extending end of the drain signal line DL. The opening of the aperture is performed at the same time as the opening of apertures in the protective film PSV in the respective pixel areas.

In this construction, the ITO film ITO1 is formed to cover the drain signal line DL at the drain terminal part DTM. This ITO film ITO1 is formed at the same time that the pixel electrode PX is formed. The ITO film ITO1 is formed so that the occurrence of electrolytic corrosion can be prevented.

As described above, the drain signal line DL is formed in parallel with the thin film transistors TFT formed by the resist reflow method, and is made of a stacked structure in which the semiconductor layer AS, the high-concentration layer $d_0$ and the Mo layer d1 are stacked in that order. The side walls of the drain signal line DL is formed in the shape of a gentle taper.

Accordingly, in the case where the drain signal line DL is covered with the ITO film ITO1 at the drain terminal part DTM, it is possible to solve a problem such as the cuttings of the ITO film ITO1 due to steps.

<<Manufacturing Method>>

FIGS. 9A to 9H are process diagrams showing one embodiment of a manufacturing method for the above-described liquid crystal display device.

FIGS. 9A to 9H are views showing the process diagrams for forming the portion of the gate terminal part GTM, together with the process diagrams shown in FIGS. 8A to 8F.

Figure 9A:
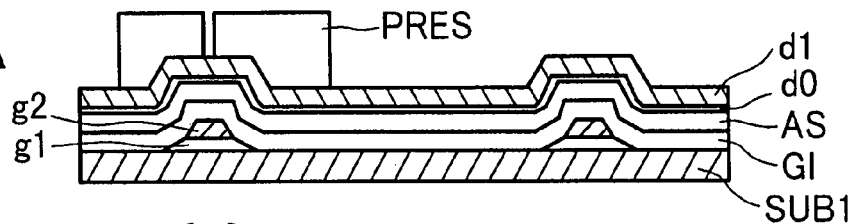
FIGS. 9A to 9H are process diagrams showing one embodiment of a manufacturing method for the liquid crystal display device shown in FIG. 1.
Figure 9B:
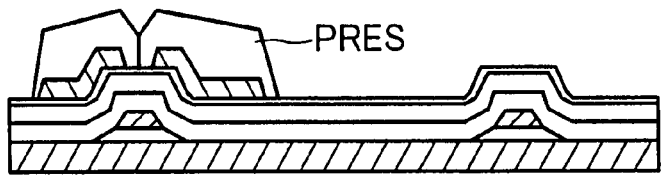
Figure 9C:
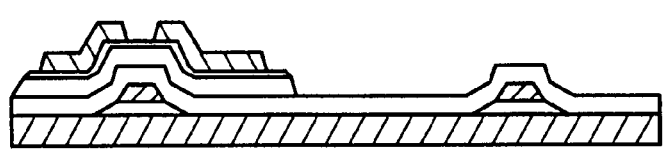
Figure 9D:
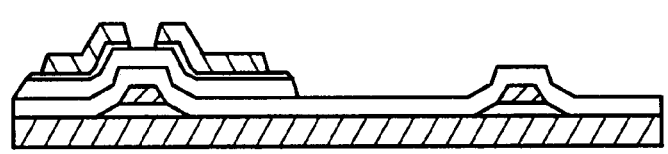
Figure 9E:
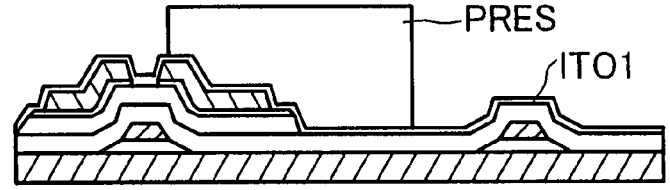
Figure 9F:
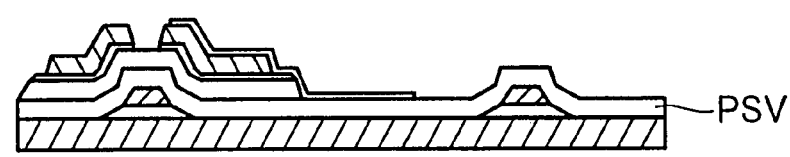
Figure 9G:
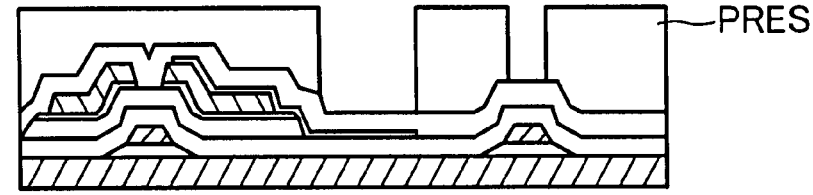
Figure 9H:
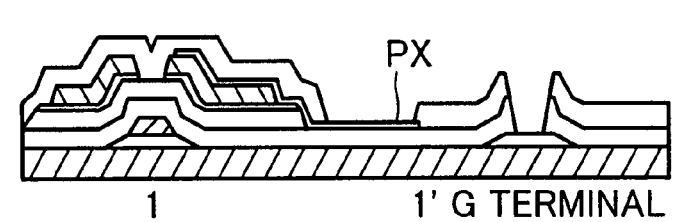

FIG. 9A corresponds to FIG. 8A, FIG. 9B corresponds to FIG. 8B, FIG. 9C corresponds to FIG. 8C, FIG. 9D corresponds to FIG. 8D, FIG. 9E corresponds to FIG. 8E, and FIG. 9G corresponds to FIG. 8F.

A series of processes is as shown in the Table of FIG. 10. As is apparent from this table, the number of photo-processes can be reduced to four, specifically, the patterning of the gate signal lines GL, the patterning of the drain signal lines DL (the drain electrodes and the source electrodes), the patterning of the pixel electrodes PX and the pattering of the protective film PSV.

Embodiment 2

In the above description of Embodiment 1, reference has been made to the liquid crystal display device in which the thin film transistors TFT are formed by using the resist reflow method. However, the invention can also be applied to a liquid crystal display device in which its thin film transistors TFT are formed by using a so-called half-exposure method.

Embodiment 2 is the same as Embodiment 1 except the following construction.

<<Thin Film Transistor TFT>>

Figure 11:
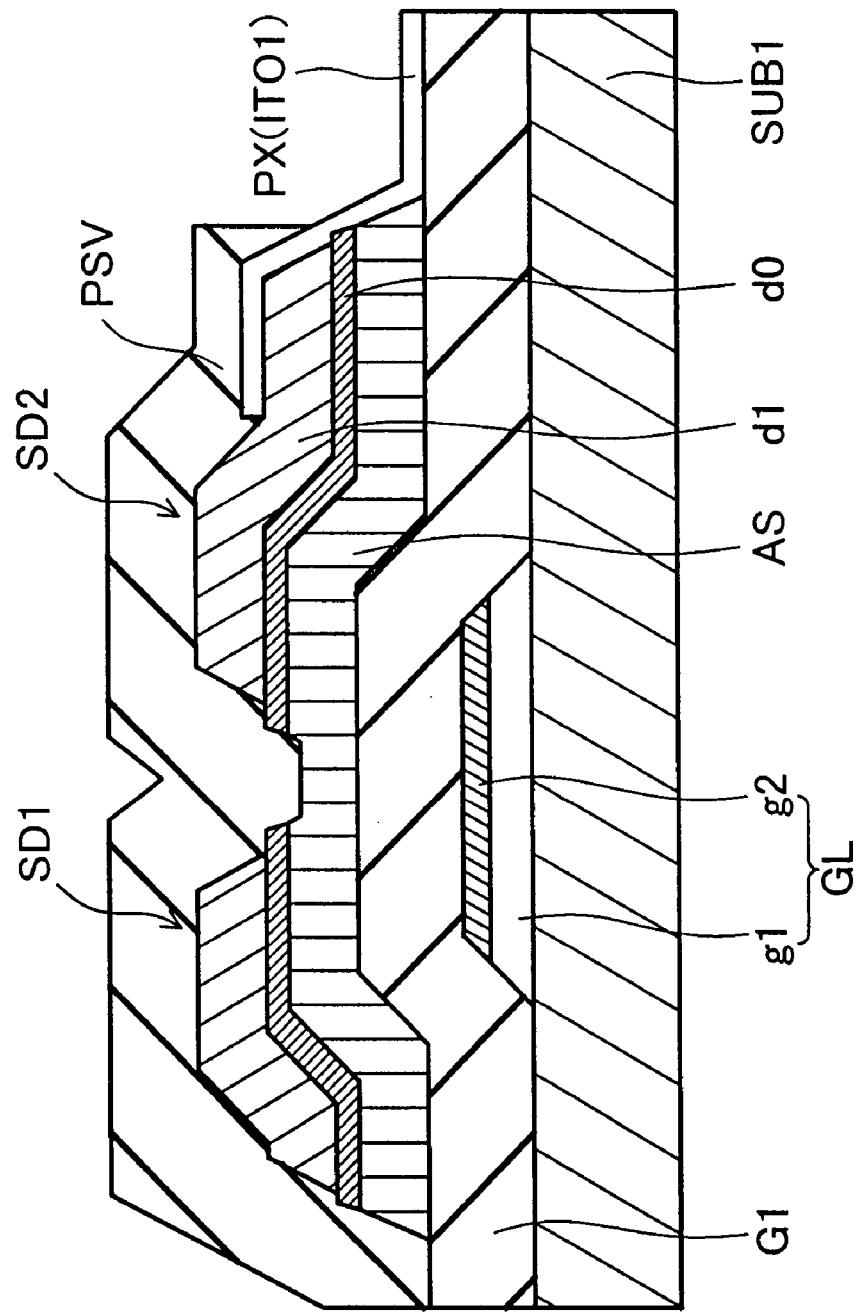
FIG. 11 is a view showing another embodiment of the liquid crystal display device according to the invention, and showing a cross section of a thin film transistor.

FIG. 11 is a view showing a cross section of a thin film transistor TFT formed by using a so-called half-exposure method.

The thin film transistor TFT has side walls formed by a stacked structure in which a semiconductor layer AS, a high-concentration layer $d_0$ and a Mo layer $d_1$ are stacked in that order, and the respective side walls are formed to have gently tapered surfaces which become gradually more open toward the transparent substrate SUB1.

FIGS. 15A to 15E are process diagrams showing one embodiment of a method of forming the thin film transistor TFT.

Figure 15A:
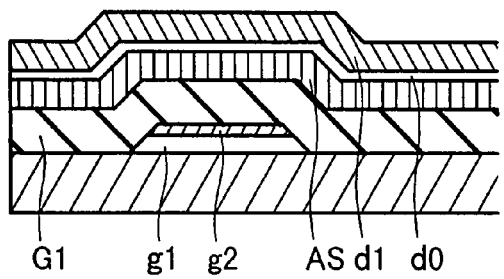
FIGS. 15A to 15E are views showing another embodiment of the liquid crystal display device according to the invention, and are process diagrams showing one embodiment of a manufacturing method for a thin film transistor.

First, as shown in FIG. 15A, after a gate signal line GL and an insulating film GI have been formed, the semiconductor layer AS is formed on the surface of this insulating film GI and the high-concentration layer $d_0$ is formed on the surface of the semiconductor layer AS, and the Mo layer $d_1$ is formed on the high-concentration layer $d_0$. In this case, the semiconductor layer AS, the high-concentration layer $d_0$ and the Mo layer $d_1$ are continuously deposited in the same chamber.

Figure 15D:
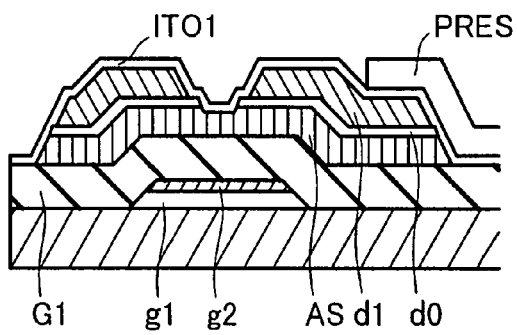
Figure 15B:
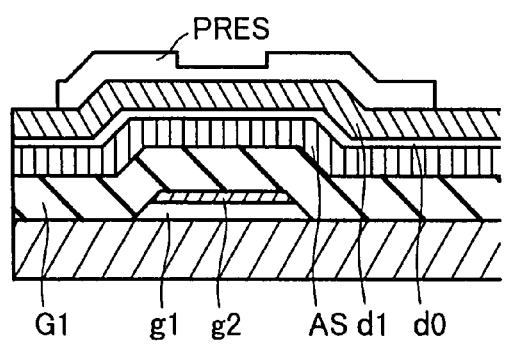

As shown in FIG. 15B, a photoresist film PRES is formed on the surface of the Mo layer $d_1$, and selective exposure using a photomask is performed. The photomask used in this case is either a mask having a grid structure or a mask fabricated by controlling the film thickness of a semi-transparent film such as MoSi, and the photoresist file PRES left by using the photomask in portions which correspond to portions in which to form a drain signal line DL, a drain electrode SD1 and a source electrode SD2 and in a portion which corresponds to the portion (channel portion) between the drain electrode SD1 and the source electrode SD2. In this case, the film thickness of the photoresist film PRES over the channel portion is made smaller than the film thickness of the photoresist film PRES over the other regions.

Specifically, in the channel portion, resist conditions are controlled so that the time of completion of etching of the photoresist, the Mo layer $d_1$ and the high-concentration layer $d_0$ becomes (approximately) the same as the time of completion of etching of the Mo layer $d_1$, the high-concentration layer $d_0$ and the semiconductor layer AS.

Figure 15E:
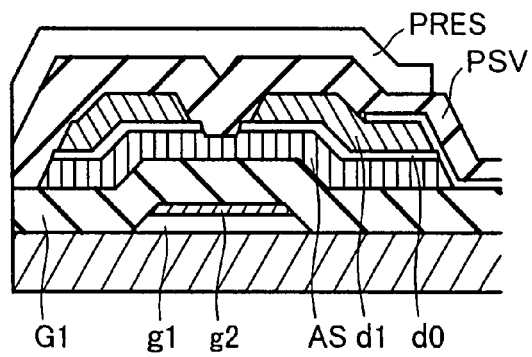
Figure 15C:
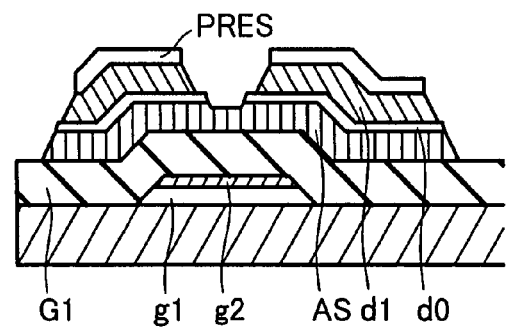

As shown in FIG. 15C, the photoresist film PRES is used a mask, and the portion of the Mo layer $d_1$ that is exposed from this mask is selectively etched (for example, a mixed acid containing phosphoric acid and nitric acid or a mixed solution of cerium nitrate and nitric acid is selected for this etching), and further, the high-concentration layer $d_0$ and the semiconductor layer AS are dry-etched. In this case, in the channel portion, the Mo layer $d_1$ and the high-concentration layer $d_0$ as well as the semiconductor layer AS are etched, but the surface of the semiconductor layer AS is only cut to a slight extent.

Incidentally, the etching of the high-concentration layer $d_0$ is not limited to only the above-described method, and after the selective etching of the Mo layer $d_1$, this Mo layer $d_1$ may be used as a mask to etch the high-concentration layer $d_0$.

After that, the photoresist film PRES is removed.

As shown in FIG. 15D, an ITO film ITO1 is formed, and a photoresist film PRES is formed in a portion which corresponds to an area in which to form a pixel electrode PX (as well as a drain terminal part DTM). This photoresist film PRES is used as a mask to remove the portion of the ITO film ITO1 that is exposed from this mask. After that, the photoresist film PRES is removed.

As shown in FIG. 15E, a protective film PSV is formed, and a photoresist film PRES is formed so that an aperture is formed in the central portion of the pixel area (including the region in which the thin film transistor TFT is formed) except the periphery of the pixel area.

This photoresist film PRES is used as a mask to remove the portion of the protective film PSV that is exposed from this mask. Incidentally, at the same time that holes are formed in this protective film PSV, holes at the gate terminal parts GTM and the drain terminal parts DTM are also formed. After that, the photoresist film PRES is removed.

<<Drain Signal Line DL>>

Figure 12:
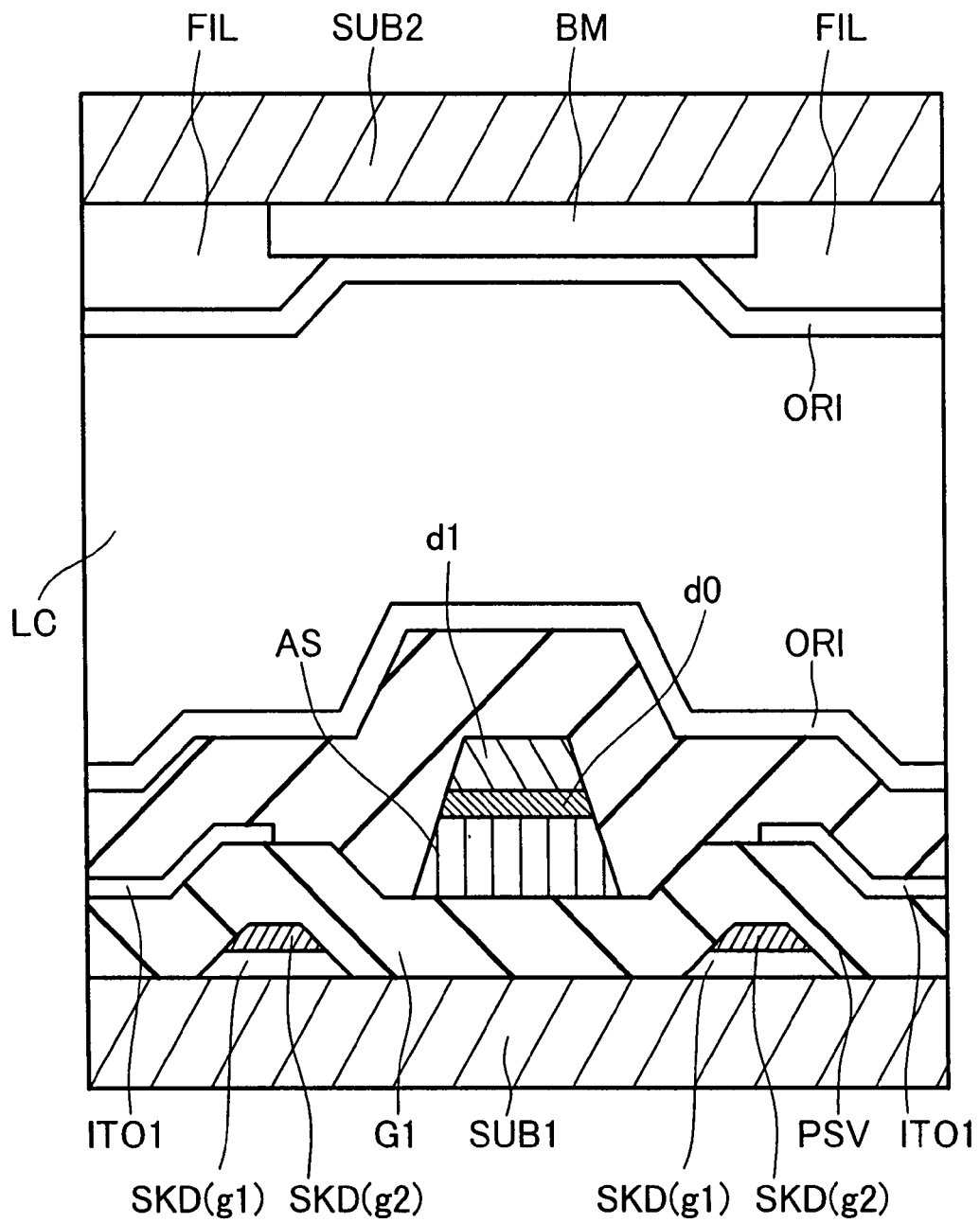
FIG. 12 is a view showing another embodiment of the liquid crystal display device according to the invention, and showing a cross section of a drain signal line and the vicinity thereof.

A cross section of one of drain signal lines DL is shown in FIG. 12. The shown drain signal line DL is made of a stacked structure in which the semiconductor layer AS, the high-concentration layer $d_0$ and the Mo layer $d_1$ are stacked in that order, and is formed in parallel with the thin film transistors TFT formed by the half-exposure method. Accordingly, as shown in FIG. 12, tapered surfaces which become gradually more open toward the transparent substrate SUB1 are respectively formed on the side walls of the drain signal line DL.

<<Gate Terminal Part GTM>>

Figure 13:
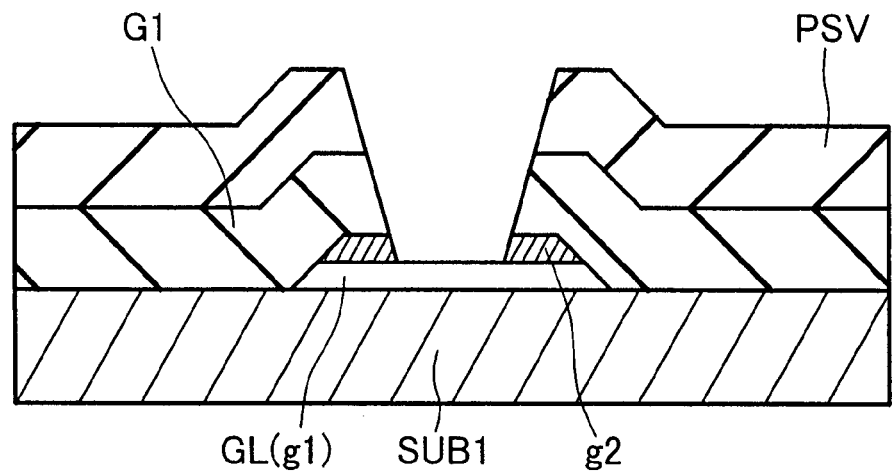
FIG. 13 is a view showing another embodiment of the liquid crystal display device according to the invention, and showing a cross section of a gate terminal part.

A cross section of one of the gate terminal parts GTM is shown in FIG. 13. The shown gate signal line GTM is formed similarly to the case of Embodiment 1.

<<Drain Terminal Part DTM>>

Figure 14:
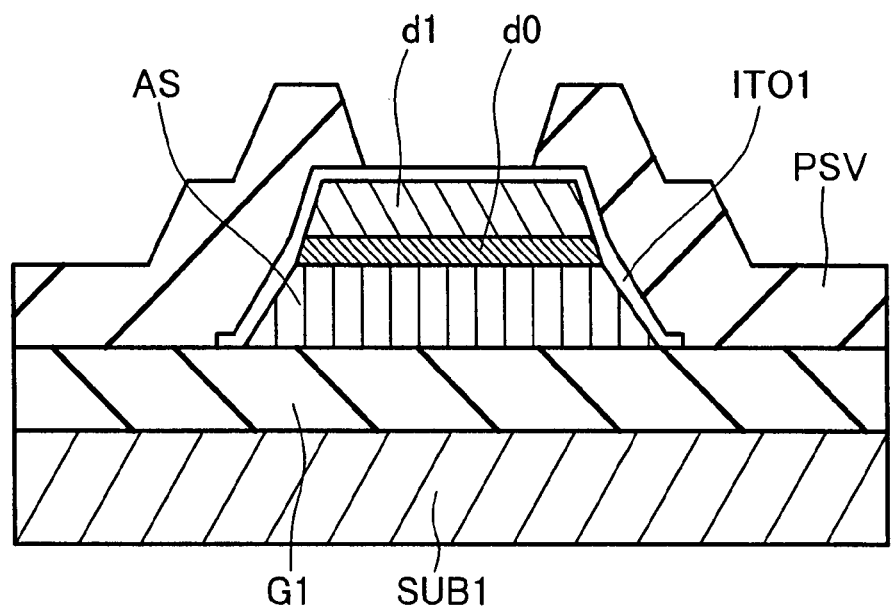
FIG. 14 is a view showing another embodiment of the liquid crystal display device according to the invention, and showing a cross section of a drain terminal part.

A cross section of one of the drain terminal parts DTM is shown in FIG. 14. The shown drain terminal part DTM is made of a stacked structure in which the semiconductor layer AS, the high-concentration layer $d_0$ and the Mo layer $d_1$ are stacked in that order, and tapered surfaces which become gradually more open toward the transparent substrate SUB1 are respectively formed on the side walls of the drain signal line DL.

At the drain terminal part DTM, the ITO film ITO1 is formed to extend to the side walls of the drain signal line DL. The ITO film ITO1 is formed at the same time that the pixel electrode PX is formed for preventing the electric corrosion.

The drain terminal part DTM is formed by opening an aperture in the protective film PSV and exposing the ITO film ITO1.

<<Manufacturing Method>>

FIGS. 16A to 16G are process diagrams showing one embodiment of a manufacturing method for the above-described liquid crystal display device.

FIGS. 16A to 16G are views showing the process diagrams for forming the portion of the gate terminal part GTM, together with the process diagrams shown in FIGS. 15A to 15E.

Figure 16A:
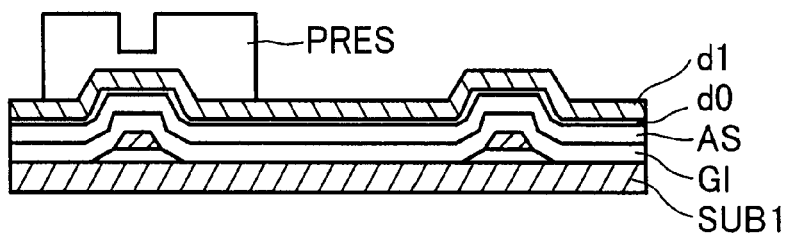
FIGS. 16A to 16G are process diagrams showing one embodiment of a manufacturing method for the liquid crystal display device according to the invention.
Figure 16B:
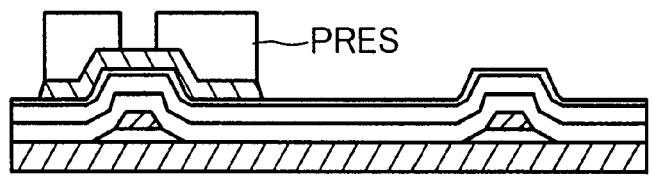
Figure 16C:
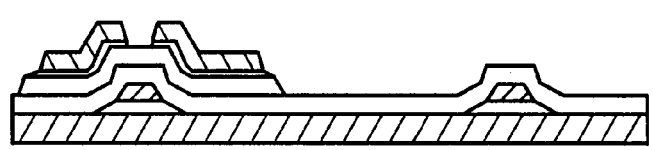
Figure 16D:
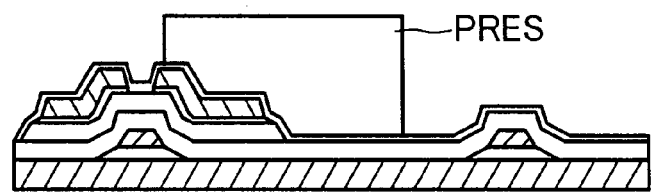
Figure 16E:
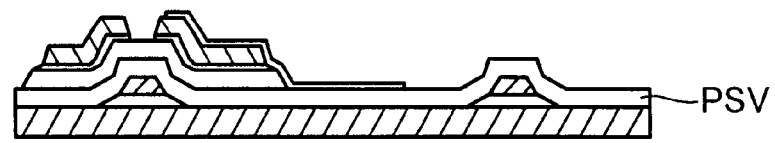
Figure 16F:
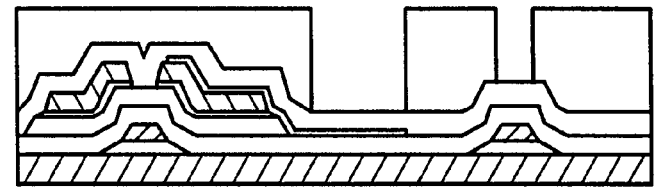
Figure 16G:
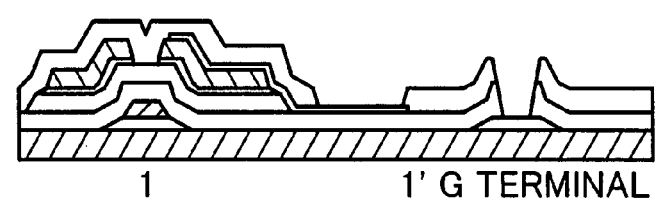

FIG. 16A corresponds to FIG. 15B, FIG. 16C corresponds to FIG. 15C, FIG. 16D corresponds to FIG. 15D, and FIG. 9F corresponds to FIG. 15E.

A series of processes is as shown in the Table of FIG. 17. As is apparent from this table, the number of photo-processes can be reduced to four, specifically, the patterning of the gate signal lines GL, the patterning of the drain signal lines DL (the drain electrodes and the source electrodes), the patterning of the pixel electrodes PX and the pattering of the protective film PSV.

Embodiment 3

The invention can also be applied to a liquid crystal display device in which its thin film transistors TFT are formed by using a so-called ITO mask method.

Embodiment 3 is the same as Embodiment 1 except the following construction.

<<Thin Film Transistor TFT>>

Figure 18:
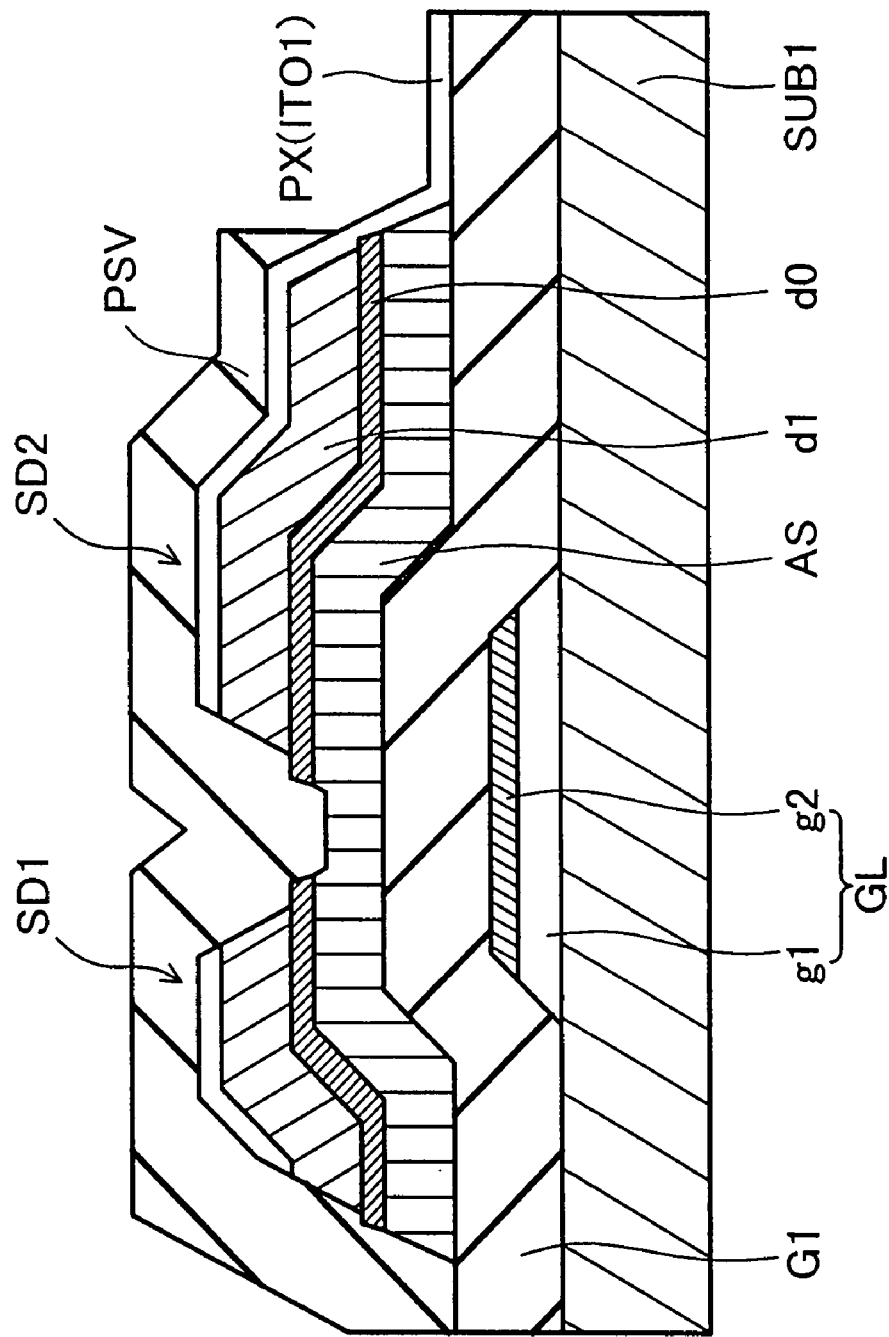
FIG. 18 is a view showing another embodiment of the liquid crystal display device according to the invention, and showing a cross section of a thin film transistor.

FIG. 18 is a view showing a cross section of a thin film transistor TFT formed by using an ITO mask method.

In the thin film transistor TFT, the ITO film ITO1 of the pixel electrode PX is directly superposed on not only the entire surface of the source electrode SD2, but also the surface of the drain signal line DL (and the drain electrode SD1).

Similarly to the case of the other embodiments, the side walls of a stacked structure in which the semiconductor layer AS, the high-concentration layer $d_0$ and the Mo layer $d_1$ are stacked in that order are respectively formed to have gently tapered surfaces which become gradually more open toward the transparent substrate SUB1.

FIGS. 22A to 22G are process diagrams showing one embodiment of a method of forming the thin film transistor TFT.

Figure 22A:
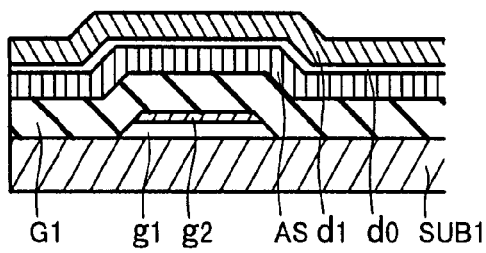
FIGS. 22A to 22G are views showing another embodiment of the liquid crystal display device according to the invention, and are process diagrams showing one embodiment of a manufacturing method for a thin film transistor.

First, as shown in FIG. 22A, after a gate signal line GL and an insulating film GI have been formed, the semiconductor layer AS is formed on the surface of this insulating film GI and the high-concentration layer $d_0$ is formed on the surface of the semiconductor layer AS, and the Mo layer $d_1$ is formed on the high-concentration layer $d_0$. In this case, the semiconductor layer AS, the high-concentration layer $d_0$ and the Mo layer $d_1$ are continuously deposited in the same chamber.

Figure 22E:
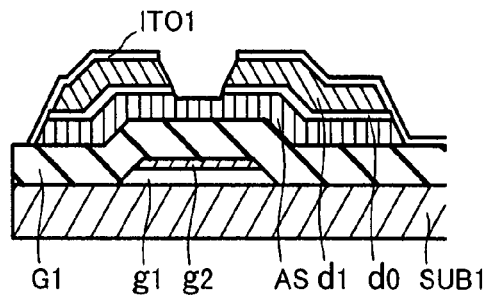
Figure 22B:
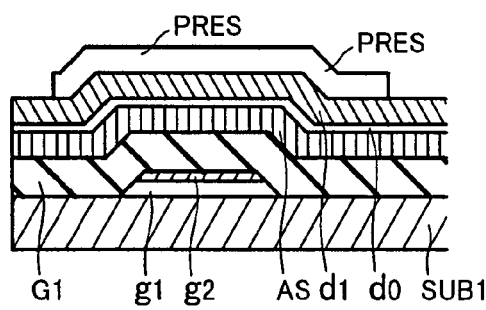

As shown in FIG. 22B, a photoresist film PRES is formed on the surface of the Mo layer $d_1$ and through selective exposure using a photomask, the photoresist film PRES is left in portions which correspond to portions in which to form a drain signal line DL, a drain electrode SD1 and a source electrode SD2 and in a portion which corresponds to the region (channel portion) between the drain electrode SD1 and the source electrode SD2.

Then, the photoresist film PRES is used a mask, and the portion of the Mo layer $d_1$ that is exposed from this mask, the high-concentration layer $d_0$ and the semiconductor layer AS are selectively etched in that order. After that, the photoresist film PRES is removed.

Figure 22F:
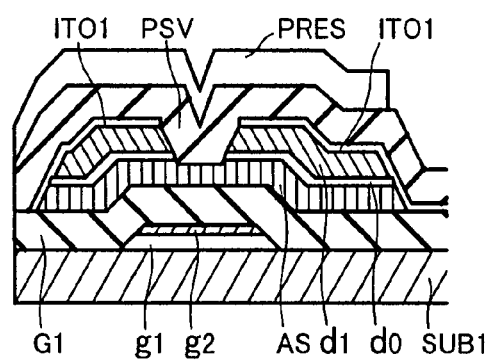
Figure 22C:
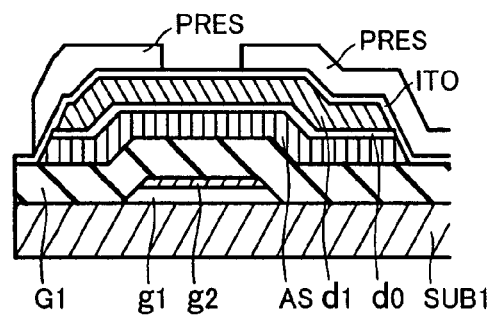

As shown in FIG. 22C, an ITO film ITO is formed, and a photoresist film PRES is formed on the upper surface of the ITO film ITO. The photoresist film PRES is left in a portion which corresponds to an area in which to form the drain signal line DL, the drain electrode SD1 and the pixel electrode PX.

Figure 22G:
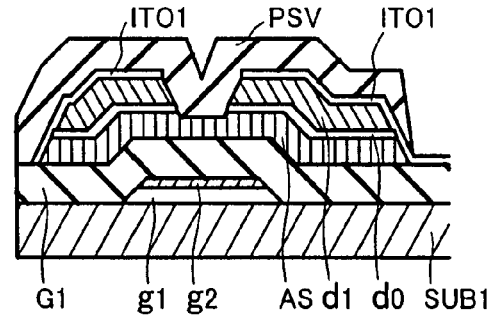
Figure 22D:
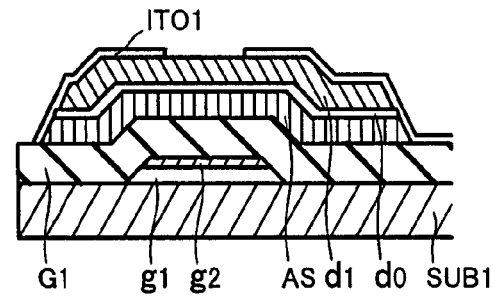

As shown in FIG. 22D, the photoresist film PRES is used as a mask to selectively etch the portion of the ITO film ITO that is exposed from this mask. After that, the photoresist film PRES is removed.

As shown in FIG. 22E, the ITO film ITO is used as a mask to selectively etch the portion of the Mo layer $d_1$ that is exposed from this mask, and furthermore, the high-concentration layer $d_0$ is selectively etched. Thus, the surface of the semiconductor layer AS is exposed.

As shown in FIG. 22F, a protective film PSV is formed, and a photoresist film PRES is formed so that an aperture is formed in the central portion of the pixel area (including the region in which the thin film transistor TFT is formed) except the periphery of the pixel area.

This photoresist film PRES is used as a mask to remove the portion of the protective film PSV that is exposed from this mask. Incidentally, at the same time that holes are formed in this protective film PSV, holes at the gate terminal parts GTM and the drain terminal parts DTM are also formed. After that, the photoresist film PRES is removed, as shown in FIG. 22G.

<<Drain Signal Line DL>>

Figure 19:
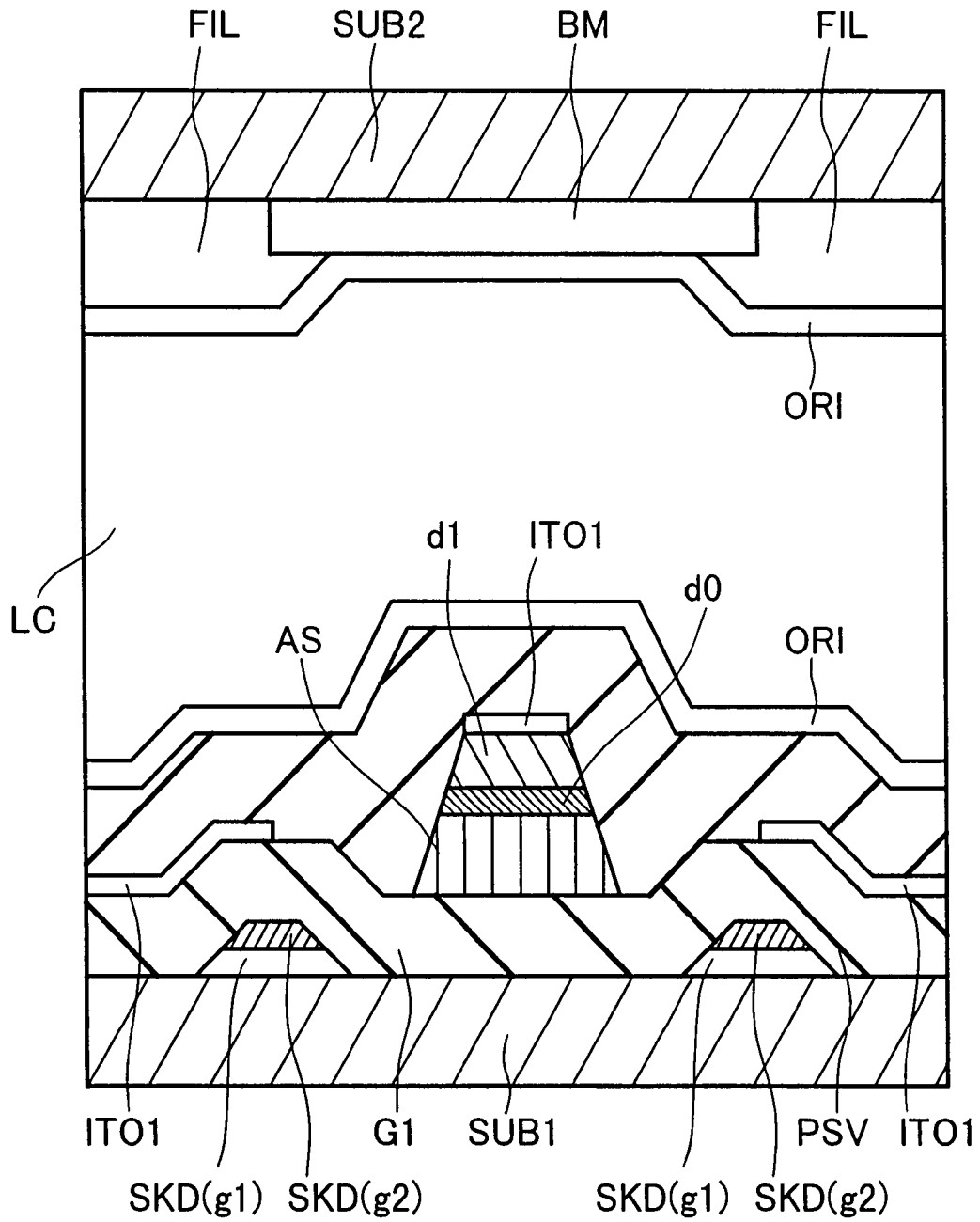
FIG. 19 is a view showing another embodiment of the liquid crystal display device according to the invention, and showing a cross section of a drain signal line and the vicinity thereof.

A cross section of one of drain signal lines DL is shown in FIG. 19. The shown drain signal line DL is made of a stacked structure in which the semiconductor layer AS, the high-concentration layer $d_0$, the Mo layer $d_1$ and the ITO film ITO1 are stacked in that order.

<<Gate Terminal Part GTM>>

Figure 20:
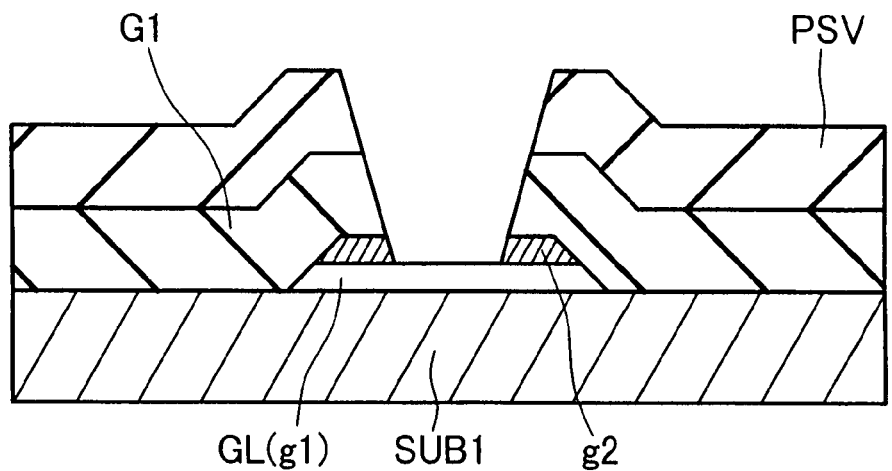
FIG. 20 is a view showing another embodiment of the liquid crystal display device according to the invention, and showing a cross section of a gate terminal part.

A cross section of one of the gate terminal parts GTM is shown in FIG. 20. The shown gate terminal part GTM has a construction similar to that of the gate terminal part GTM of each of Embodiments 1 and 2.

<<Drain Terminal Part DTM>>

Figure 21:
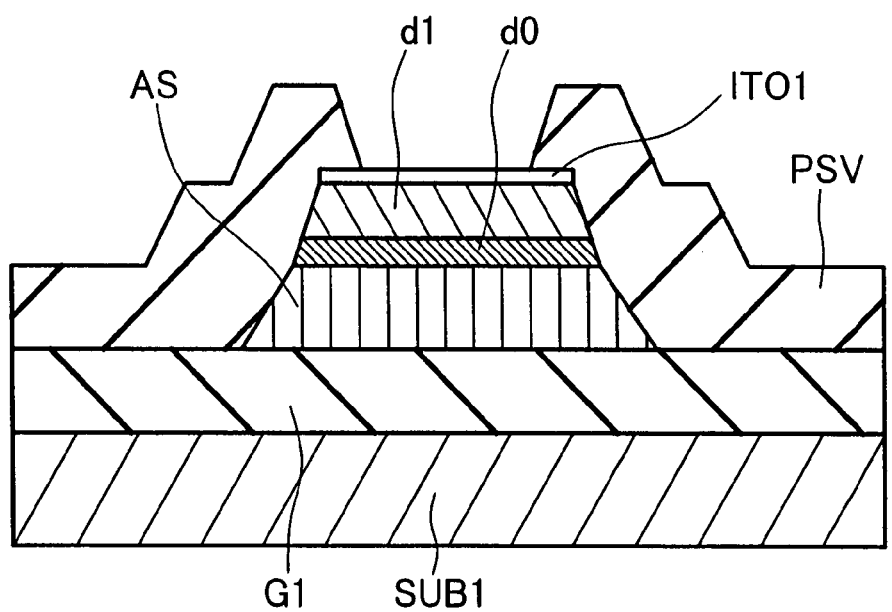
FIG. 21 is a view showing another embodiment of the liquid crystal display device according to the invention, and showing a cross section of a drain terminal part.

A cross section of one of the drain terminal parts DTM is shown in FIG. 21. At the drain terminal part DTM, since the drain signal line DL is made of the above-described stacked structure, the ITO film ITO1 is exposed at the bottom of the aperture of the protective film PSV so that it is possible to obtain a construction having reliability in resistance to electrolytic corrosion.

<<Manufacturing Method>>

FIGS. 23A to 23G are process diagrams showing one embodiment of a manufacturing method for the above-described liquid crystal display device.

FIGS. 23A to 23G are views showing the process diagrams for forming the portion of the gate terminal part GTM, together with the process diagrams shown in FIGS. 22A to 22G.

Figure 23A:
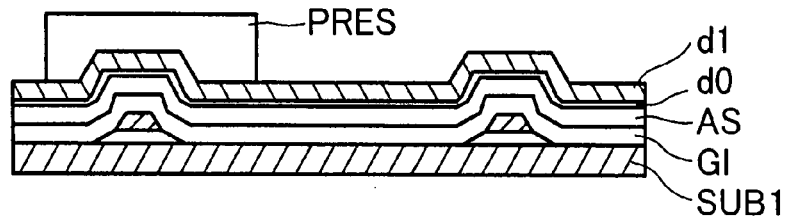
FIGS. 23A to 23G are process diagrams showing one embodiment of a manufacturing method for the liquid crystal display device according to the invention.
Figure 23B:
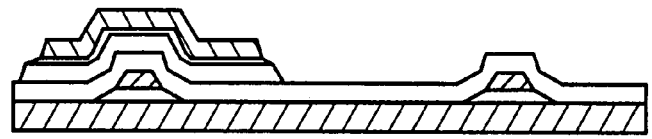
Figure 23C:
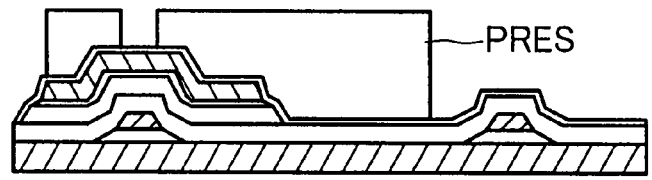
Figure 23D:
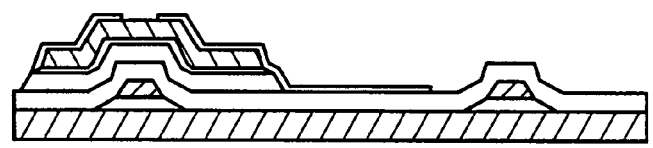
Figure 23E:
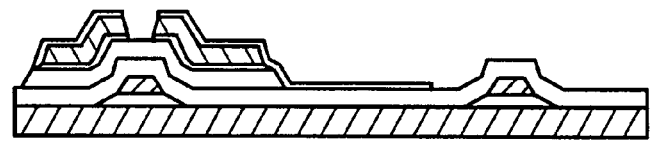
Figure 23F:
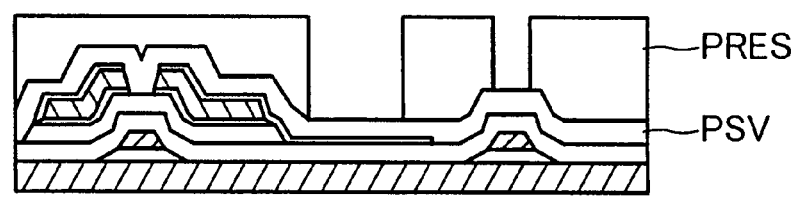
Figure 23G:
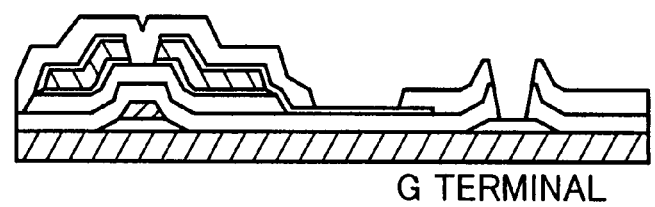

FIG. 23A corresponds to FIG. 22B, FIG. 23C corresponds to FIG. 22C, FIG. 23D corresponds to FIG. 22D, FIG. 23E corresponds to FIG. 22E, FIG. 23F corresponds to FIG. 22F, and FIG. 23G corresponds to FIG. 22G.

A series of processes is as shown in the Table of FIG. 24. As is apparent from this table, the number of photo-processes can be reduced to four, specifically, the patterning of the gate signal lines GL, the patterning of the pixel electrodes PX (the drain signal lines DL), the patterning of the drain electrodes and the source electrodes, and the pattering of the protective film PSV.

Embodiment 4

In the above description of each of the embodiments, reference has been made to a so-called vertical electric field type of liquid crystal display device in which a pixel electrode is formed in each pixel area on its transparent substrate SUB1 and a counter electrode common to each pixel area is formed on its glass substrate SUB2 so that the optical transmissivity of its liquid crystal is controlled by an electric field generated between each of these electrodes approximately perpendicularly to the substrates.

However, the invention is not limited to such a vertical electric field type of liquid crystal display device, and can also be applied to a so-called in-plane-switching type of liquid crystal display device in which a pixel electrode and a counter electrode are formed in each pixel area on its transparent substrate SUB1 so that the optical transmissivity of its liquid crystal is controlled by an electric field component generated between the pixel electrode and the counter electrode approximately in parallel with the transparent substrate SUB1.

Figure 25:
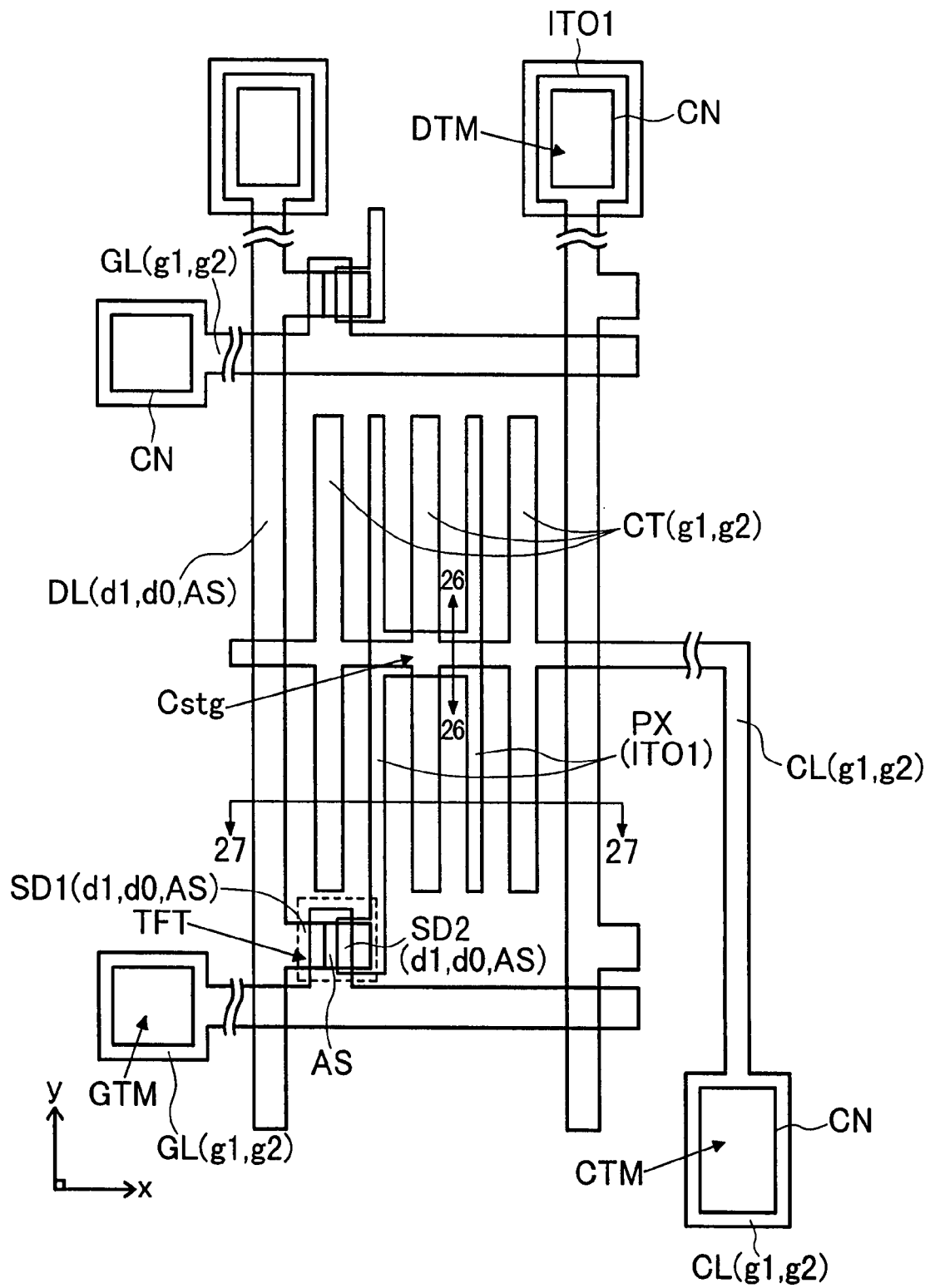
FIG. 25 is a plan view showing one embodiment of a pixel of the liquid crystal display device according to the invention.
Figure 26:
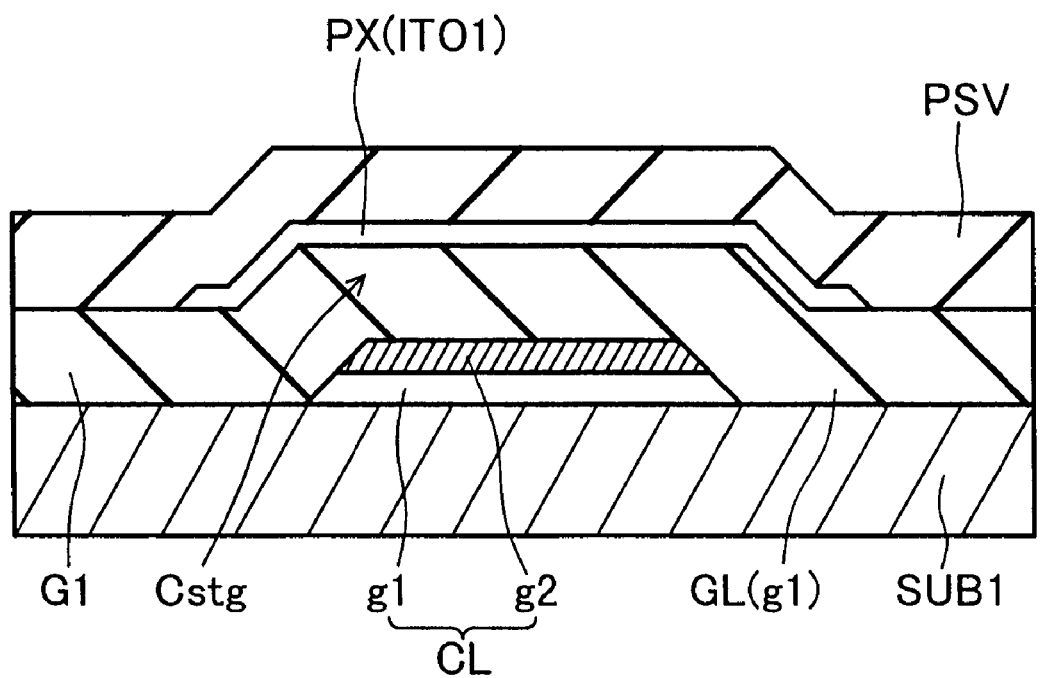
FIG. 26 is a cross-sectional view taken along line 26-26 of FIG. 25.
Figure 27:
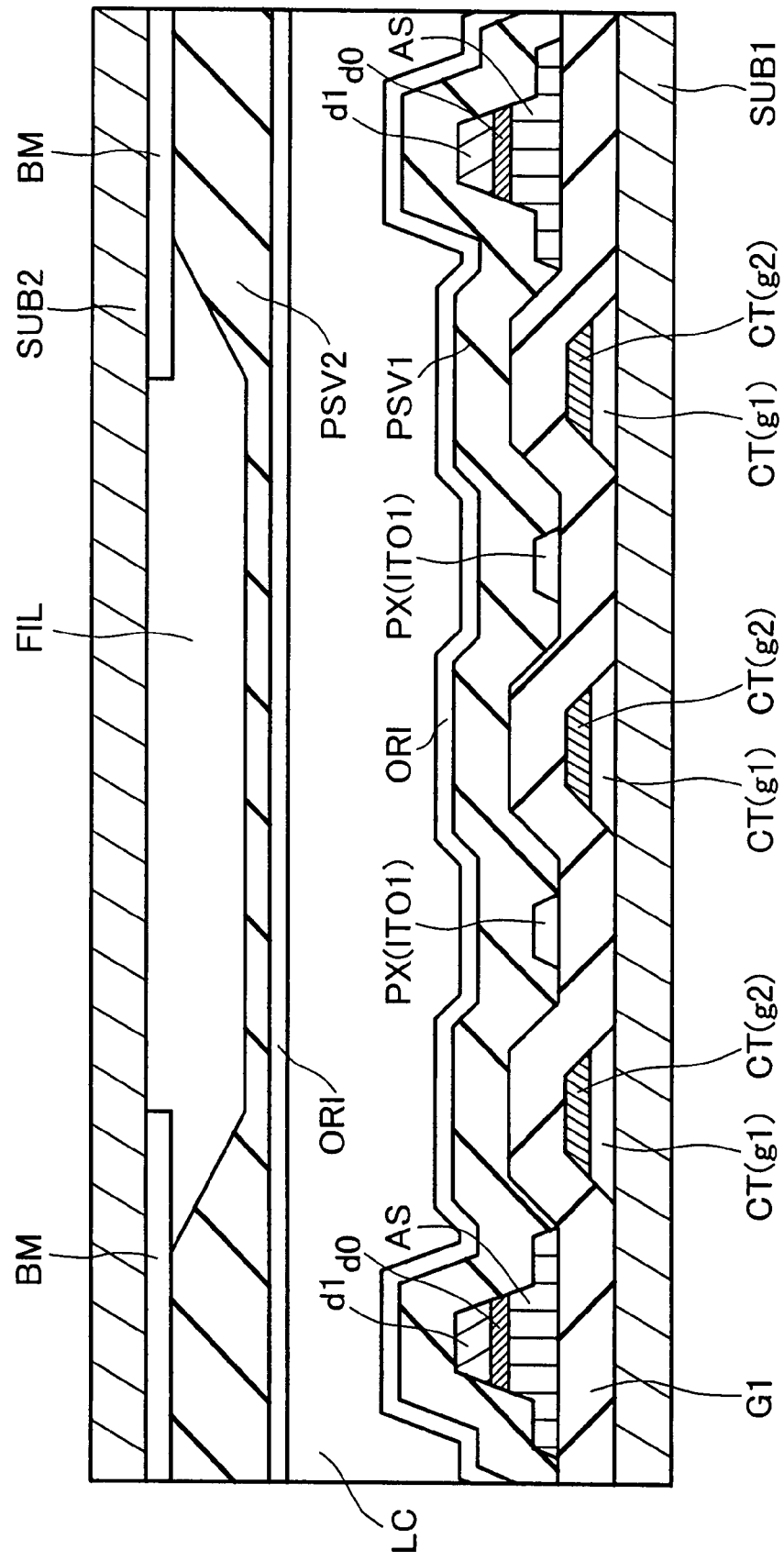
FIG. 27 is a cross-sectional view taken along line 27-27 of FIG. 25.

FIG. 25 is a plan view showing the construction of a pixel on the in-plane-switching type of liquid crystal display device, and corresponds to FIG. 1. Incidentally, FIG. 26 shows a cross-sectional view taken along line 26-26 of FIG. 25 and FIG. 27 shows a cross-sectional view taken along line 27-27 of FIG. 25.

The construction shown in FIG. 25 differs from that shown in FIG. 1 as will be described below.

Referring to FIG. 25, first of all, a plurality of pixel electrodes PX and a plurality of counter electrodes CT are disposed in the form of stripes which are extended in parallel with drain signal lines DL, and the pixel electrodes PX and the counter electrodes CT are formed to be alternately arranged.

In Embodiment 4, two pixel electrodes PX and three counter electrodes CT are disposed, and these two pixel electrodes PX and three counter electrodes CT are alternately arranged so that two of the counter electrodes CT are respectively disposed on the opposite extreme sides, that is to say, adjacently to the drain signal lines DL.

The respective counter electrodes CT disposed on the opposite extreme sides have shielding functions for preventing the pixel electrodes PX from being influenced by electric fields generated from the adjacent drain signal lines DL, and are formed to be wider than the other electrodes.

The counter electrodes CT are formed at the same time as gate signal lines GL, and are formed of the same material as the gate signal lines GL. Accordingly, the counter electrodes CT are each made of a two-layer structure having a lower layer formed of an ITO film and an upper layer formed of a Mo layer.

The three counter electrodes CT are connected in common by being formed integrally with a counter voltage signal line CL which is formed in parallel with the gate signal lines GL in the central portion of the pixel area. A counter voltage signal is supplied to the counter electrodes CT via the counter voltage signal line CL. Accordingly, this counter voltage signal line CL is also made of a two-layer structure having a lower layer formed of an ITO film and an upper layer formed of a Mo layer.

This counter voltage signal line CL is formed in common with pixels juxtaposed in the x direction as viewed in FIG. 25, and is connected in common to the other counter voltage signal lines CL of pixels arranged in the y direction as viewed in FIG. 25. The counter voltage signal line CL is supplied with the counter voltage signal from a common terminal part CTM which is formed at a common connection line extended to the outside of a display part.

The pixel electrodes PX are formed as a layer different from the counter electrodes CT (the counter voltage signal line CL) with an insulating film GI interposed between the pixel electrodes PX and the counter electrodes CT.

The two pixel electrodes PX are formed in a pattern in which they are connected to each other over the counter voltage signal line CL. In this connection portion, a storage capacitance Cstg which uses the insulating film GI as its dielectric is formed between the pixel electrodes PX and the counter voltage signal line CL.

The one of the two pixel electrodes PX that is closer to the thin film transistor TFT is extended at one end to the upper surface of a semiconductor layer AS of the thin film transistor TFT, and constitutes the source electrode of the thin film transistor TFT.

This thin film transistor TFT is formed by the resist reflow method described previously in, for example, Embodiment 1.

<<Capacitance Element Cstg>>

FIG. 26 is a view showing a cross section of the capacitance element Cstg. A part of the pixel electrode PX is superposed on a part of the counter voltage signal line CL with the insulating film GI interposed therebetween, and the insulating film GI serves as the dielectric film of the capacitance element Cstg.

Since the pixel electrode PX is formed to be positioned as a layer underlying the protective film PSV, the dielectric film of the capacitance element Cstg does not use a two-layer structure made of the protective film PSV and the insulating film GI, and is formed of only the insulating film GI.

For this reason, the capacitance value of the capacitance element Cstg can be set by the film thickness of the insulating film GI and the area of superposition between the counter voltage signal line CL and the pixel electrode PX, whereby the capacitance value of the capacitance element Cstg can readily be set.

<<Counter Electrode CT>>

Cross sections of the counter electrodes CT are shown in FIG. 27.

By subjecting each of the counter electrodes CT having the two-layer structure to selective etching which allows for the etching rates of the respective layers, tapered surfaces which become gradually more open toward the transparent substrate SUB1 can be formed on the side walls of each of the counter electrodes CT, whereby it is possible to prevent damages such as cracks from occurring in the insulating film GI at a location where the insulating film GI climbs over any of the counter electrodes CT, and it is also possible to prevent the distribution of electric fields between the counter electrodes CT and the pixel electrodes PX.

<<Drain Signal Line DL>>

Cross sections of the drain signal lines DL are shown in FIG. 27. Each of the drain signal lines DL is formed in parallel with the thin film transistors TFT formed by a resist reflow method, and is made of a stacked structure in which a semiconductor layer AS, a high-concentration layer $d_0$ and a Mo layer $d_1$ are stacked in that order. Tapered surfaces which become gradually more open toward the transparent substrate SUB1 are respectively formed on the side walls of each of the drain signal lines DL, and steps are respectively formed midway on these tapered surfaces, specifically, in the portion of the semiconductor layer AS that underlies the high-concentration layer $d_0$. Incidentally, the thin film transistors TFT may be formed by the above-described half-exposure method instead of the resist reflow method.

Therefore, it is possible to fully prevent climb-over damages from occurring in the protective film PSV and the alignment layer ORI which are formed to overlie the drain signal lines DL.

<<Gate Terminal Part GTM, Common Terminal Part CTM>>

Each gate terminal part GTM has a construction similar to that of the gate terminal part GTM described previously in Embodiment 1 (FIG. 5). The common terminal part CTM has a two-layer structure formed of the same material as and in the same layer as the gate signal lines GL, and has a construction similar to that of the gate terminal part GTM.

<<Drain Terminal Part DTM>>

Each of drain terminal parts DTM has a construction similar to that of the drain terminal part DTM described previously in Embodiment 1 (FIG. 6).

<<Thin Film Transistor TFT>>

Each of the thin film transistors TFT has a construction similar to that of the thin film transistor TFT described previously in Embodiment 1 (FIG. 2).

Embodiment 5

Figure 28:
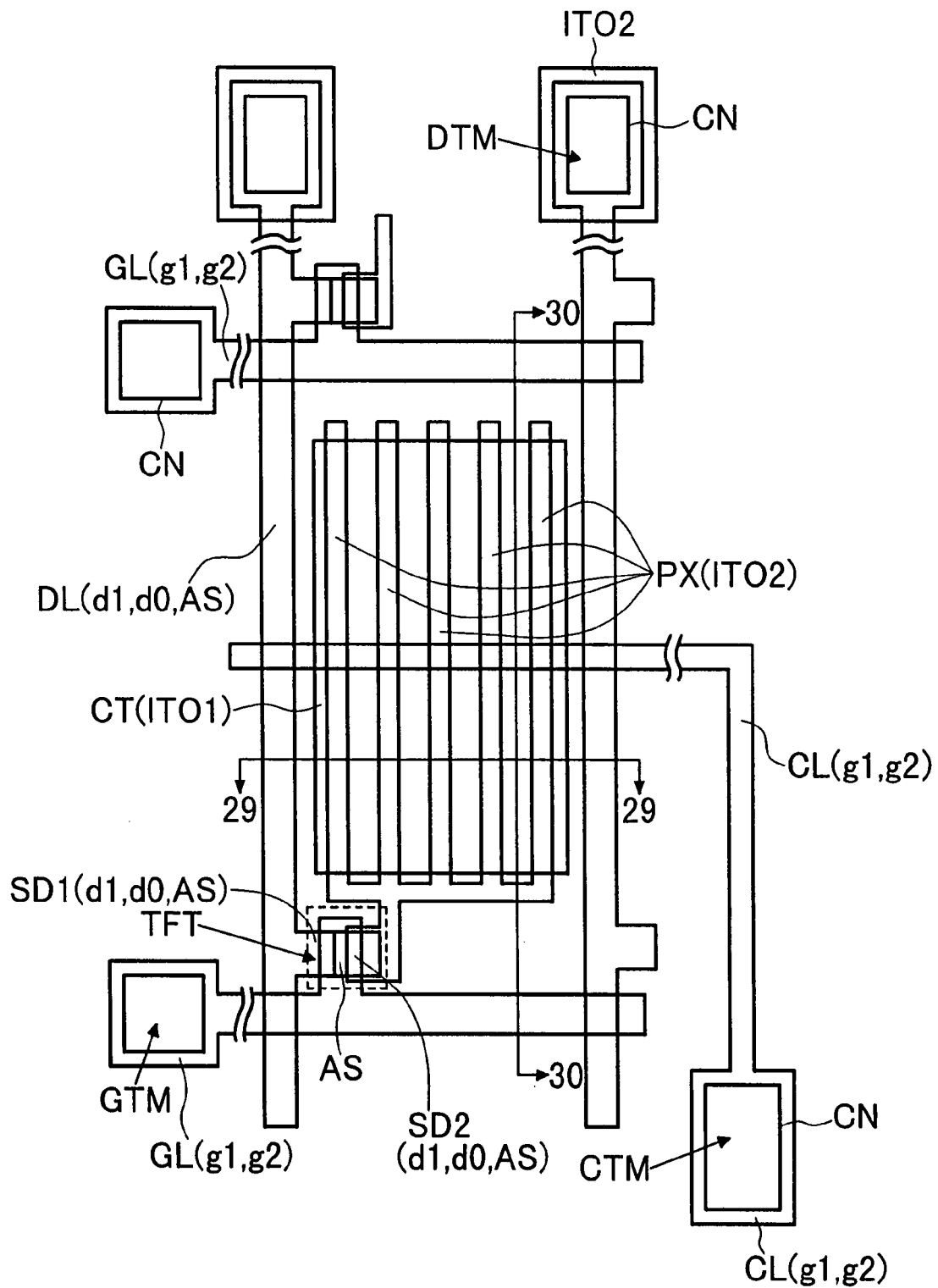
FIG. 28 is a plan view showing one embodiment of a pixel of the liquid crystal display device according to the invention.

FIG. 28 is a plan view showing another embodiment of a pixel on the in-plane-switching type of liquid crystal display device.

Referring to FIG. 28, first of all, pixel electrodes PX and a counter electrode CT are respectively formed of transparent conductive layers such as ITO films, and the counter electrode CT is superposed on the pixel electrodes PX and is formed in nearly the entire area of the pixel area.

Specifically, the counter electrode CT is formed on the entire central portion of the pixel area except the narrow periphery thereof on the surface of the transparent substrate SUB1.

A counter voltage signal is supplied to this counter electrode CT via a counter voltage signal line CL which is formed to run through the central portion of the pixel area in the x direction as viewed in FIG. 28.

The counter voltage signal line CL is formed directly on the counter electrode CT, and is formed at the same time that the gate signal lines GL are formed. Accordingly, the counter voltage signal line CL is made of a two-layer structure having a lower layer formed of an ITO film and an upper layer formed of a Mo layer.

The pixel electrodes PX are formed on an insulating film GI which covers the counter electrode CT (the counter voltage signal line CL). The pixel electrodes PX are disposed in, for example, a stripe-shaped pattern which is extended in parallel with drain signal lines DL, and are juxtaposed in a direction perpendicular to the drain signal lines DL.

The pixel electrodes PX are connected in common at an end connected to the thin film transistor TFT, and is extended to the surface of a semiconductor layer AS of the thin film transistor TFT and constitutes a source electrode SD2 of the thin film transistor TFT.

This thin film transistor TFT is formed by a resist reflow method similarly to the case of Embodiment 1.

<<Counter Electrode CT>>

Figure 30:
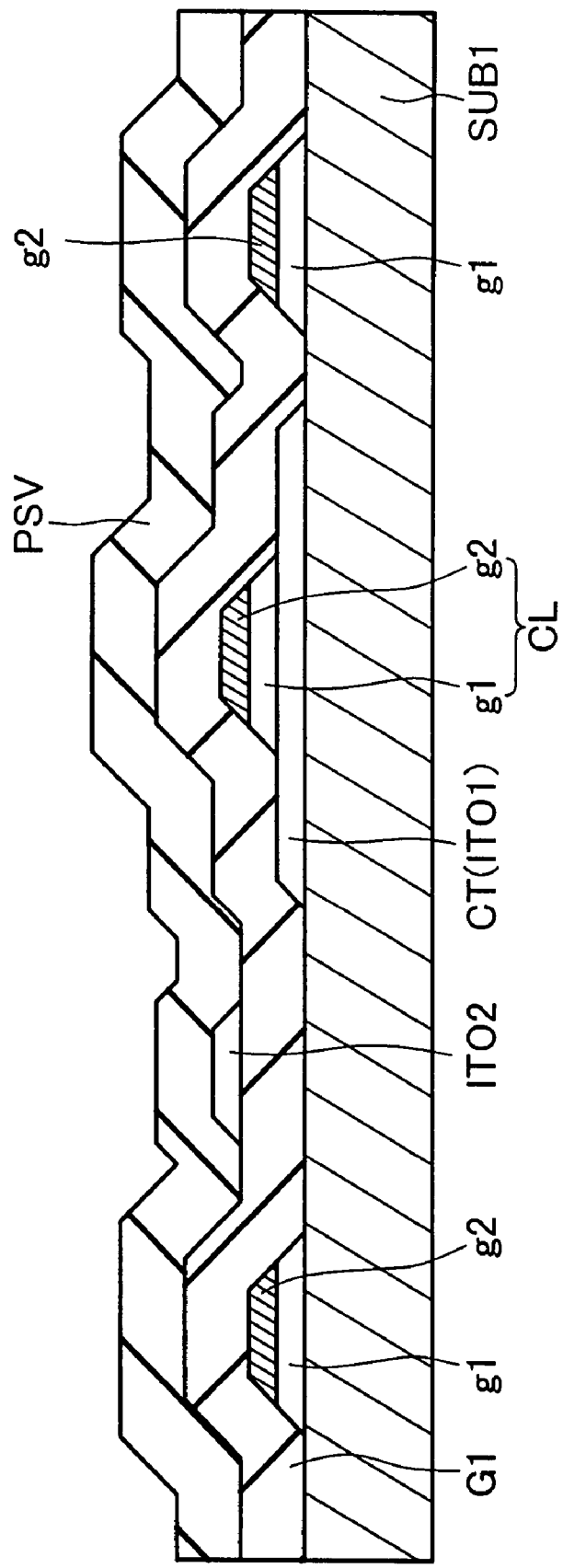
FIG. 30 is a cross-sectional view taken along line 30-30 of FIG. 28.

A cross section of the counter voltage signal line CL is shown in FIG. 30.

By subjecting the counter voltage signal line CL having the two-layer structure to selective etching which allows for the etching rates of the respective layers, tapered surfaces which become gradually more open toward the transparent substrate SUB1 can be formed on the side walls of the counter voltage signal line CL, whereby it is possible to prevent climb-over damages occurring in the insulating film GI.

In addition, since the counter voltage signal line CL is formed on the upper surface of the counter electrode CT made of an ITO film and the lower layer of the counter voltage signal line CL is made of an ITO film, the adhesion of the counter voltage signal line CL to the counter electrode CT can be ensured.

<<Drain Signal Line DL>>

Figure 29:
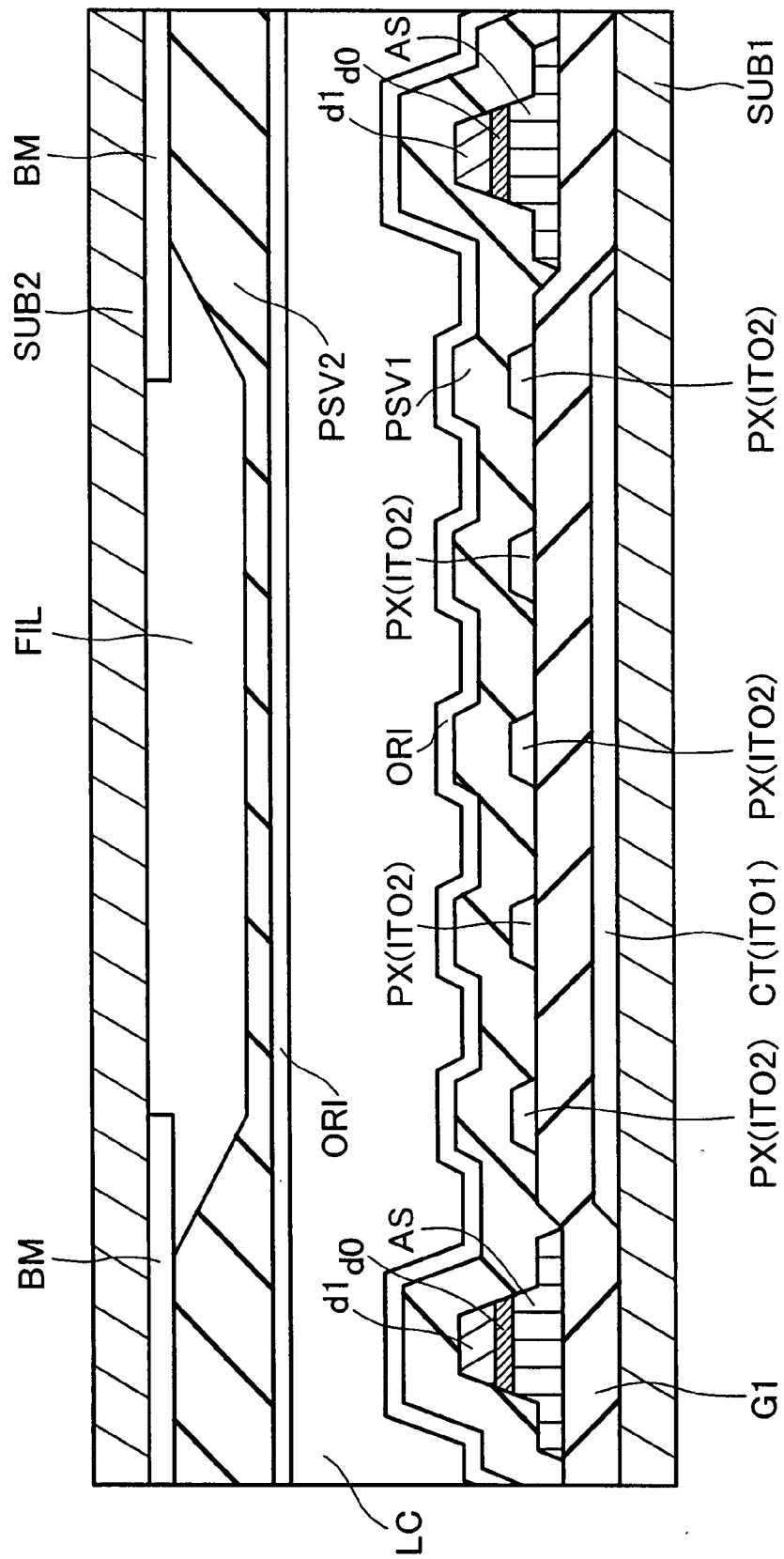
FIG. 29 is a cross-sectional view taken along line 29-29 of FIG. 28.

Cross sections of the drain signal lines DL are shown in FIG. 29. Each of the drain signal lines DL is formed in parallel with the thin film transistors TFT formed by a resist reflow method, and is made of a stacked structure in which the semiconductor layer AS, the high-concentration layer $d_0$ and the Mo layer $d_1$ are stacked in that order. Tapered surfaces which become gradually more open toward the transparent substrate SUB1 are respectively formed on the side walls of each of the drain signal lines DL, and steps are respectively formed midway on these tapered surfaces, specifically, in the portion of the semiconductor layer AS that underlies the high-concentration layer $d_0$. Incidentally, the thin film transistors TFT may be formed by the above-described half-exposure method instead of the resist reflow method.

Therefore, it is possible to fully prevent climb-over damages from occurring in the protective film PSV and the alignment layer ORI which are formed to overlie the drain signal lines DL.

<<Gate Terminal Part GTM, Common Terminal Part CTM>>

Each of gate terminal parts GTM and a common terminal part CTM has a construction similar to that of the gate terminal part GTM described previously in Embodiment 1 (FIG. 5).

<<Drain Terminal Part DTM>>

Each of drain terminal parts DTM has a construction similar to that of the drain terminal part DTM described previously in Embodiment 1 (FIG. 6).

<<Thin Film Transistor TFT>>

Each of the thin film transistors TFT has a construction similar to that of the thin film transistor TFT described previously in Embodiment 1 (FIG. 2).

Embodiment 6

Figure 31:
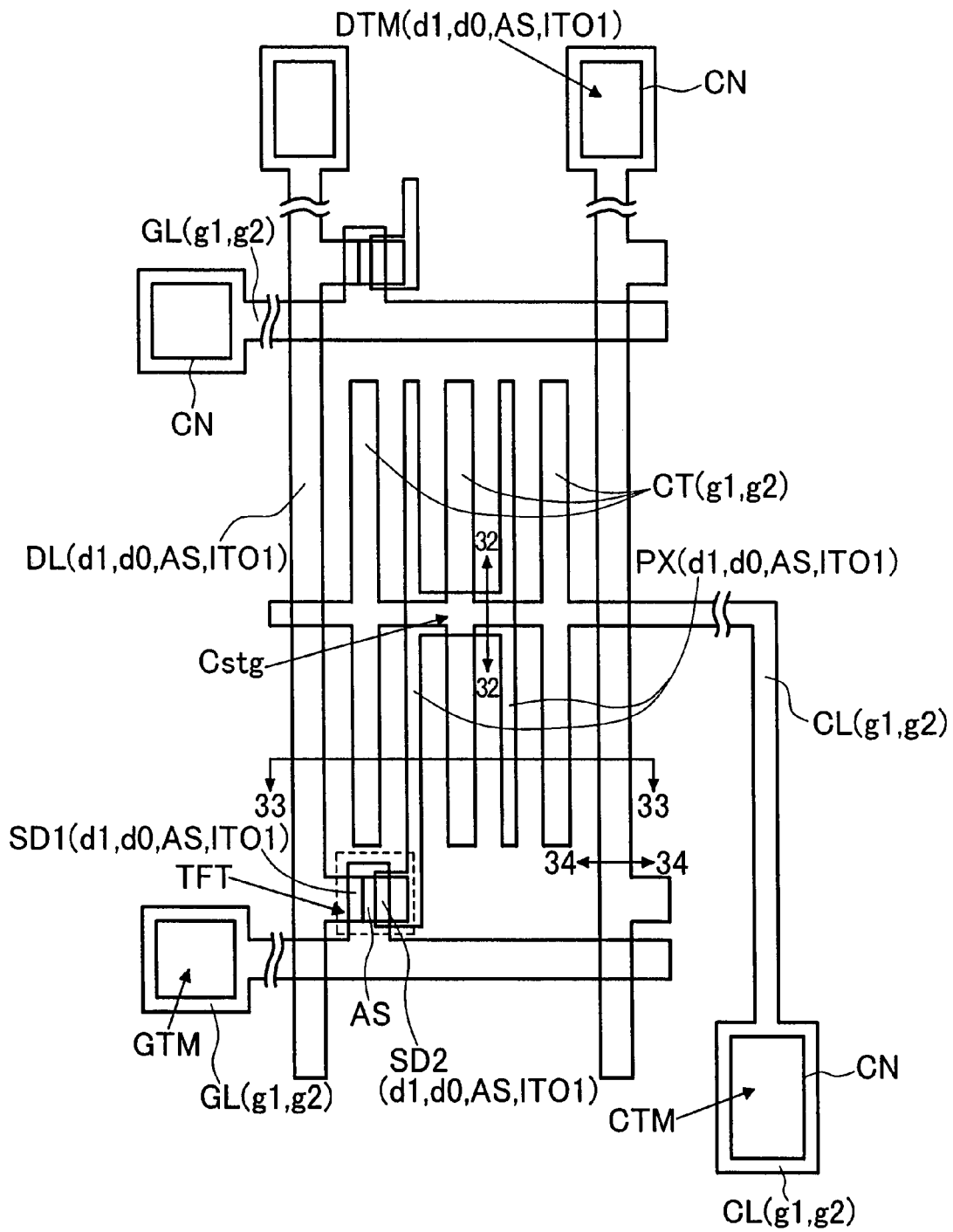
FIG. 31 is a plan view showing one embodiment of a pixel of the liquid crystal display device according to the invention.

FIG. 31 is a plan view showing another embodiment of a pixel on the in-plane-switching type of liquid crystal display device, and corresponds to FIG. 25.

FIG. 31 shows the construction of a pixel formed through a half-exposure method. The shown gate signal lines GL has a two-layer structure made of an ITO film and a Mo layer similarly to the case of each of the above-described embodiments, but this construction is not shown in FIG. 31.

<<Storage Capacitance Cstg>>

Figure 32:
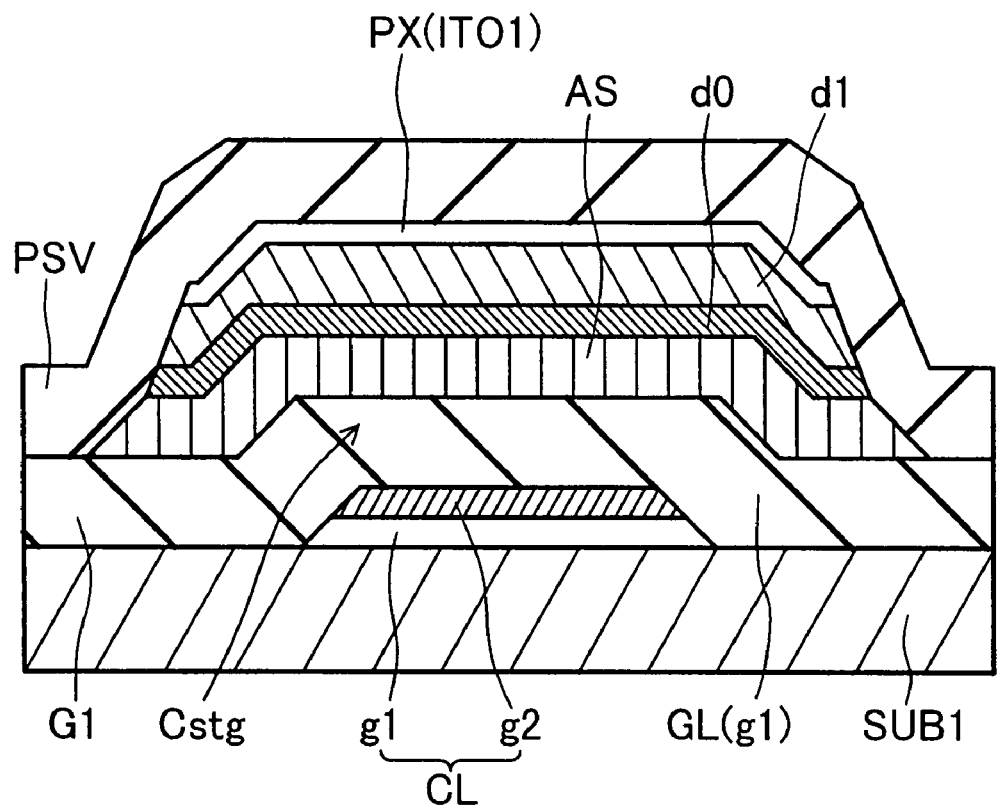
FIG. 32 is a cross-sectional view taken along line 32-32 of FIG. 31.

A cross section of one of storage capacitances Cstg is shown in FIG. 32.

The storage capacitance Cstg is formed in such a manner that the pixel electrode PX is superposed on the upper surface of the counter voltage signal line CL with the insulating film GI interposed therebetween.

The counter voltage signal line CL has a two-layer structure which includes the ITO film g1 as its lower layer and the Mo layer g2 as its upper layer. The pixel electrode PX is made of a stacked structure in which the semiconductor layer AS, the high-concentration layer $d_0$, the Mo layer $d_1$ and the ITO film ITO1 are stacked in that order.

<<Pixel Electrode PX>>

Figure 33:
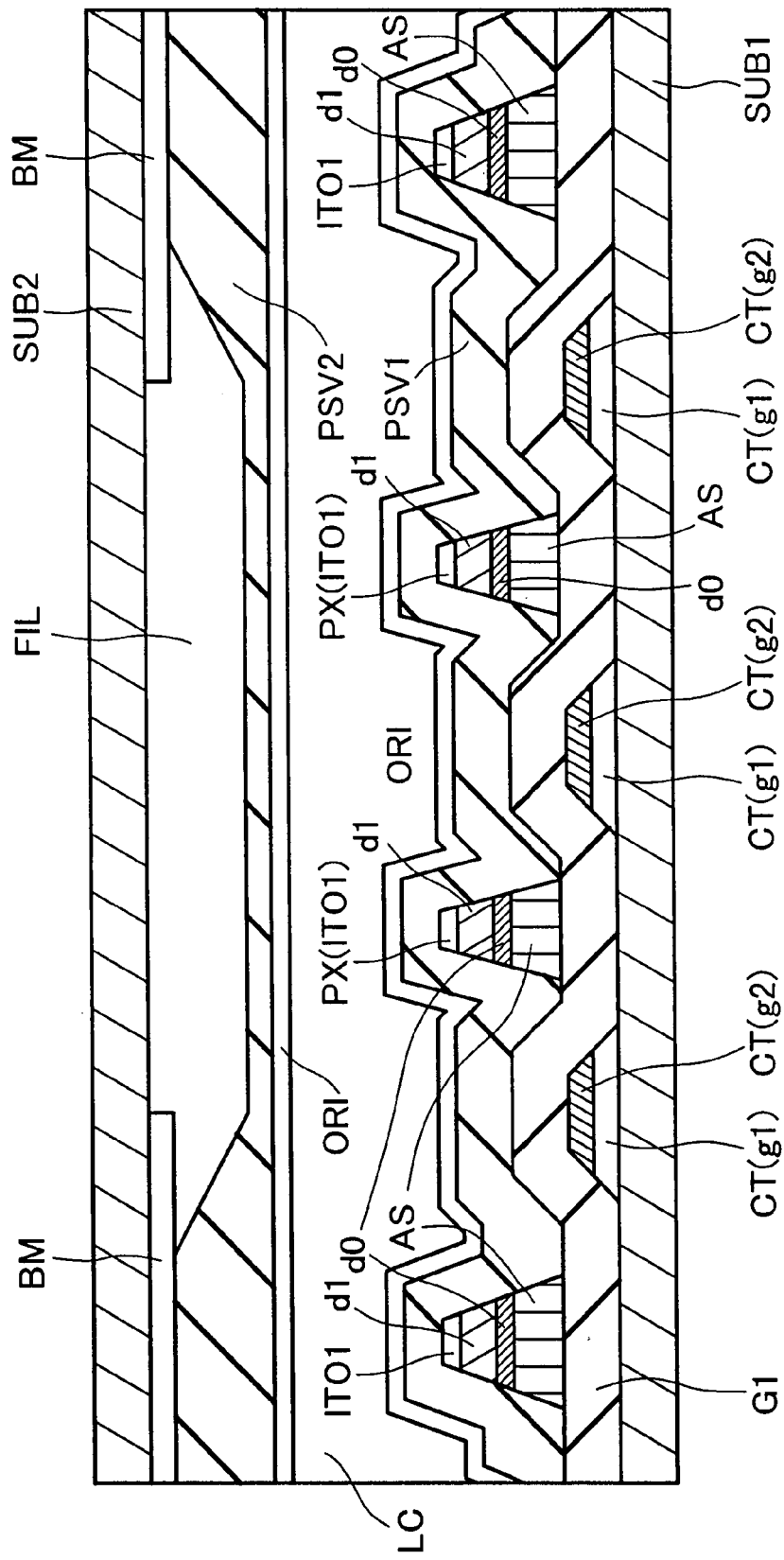
FIG. 33 is a cross-sectional view taken along line 33-33 of FIG. 31.
Figure 34:
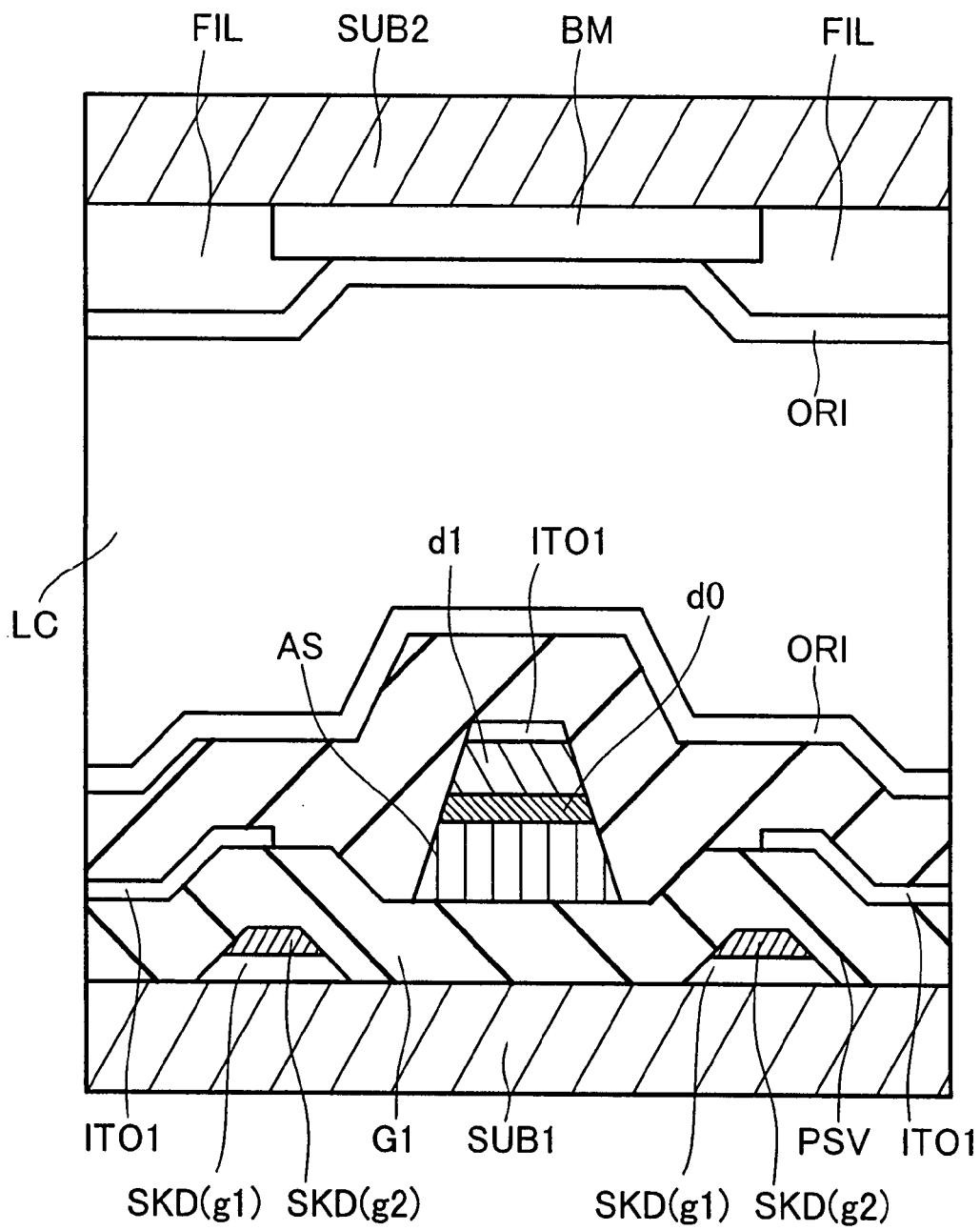
FIG. 34 is a cross-sectional view taken along line 34-34 of FIG. 31.

Cross sections of the pixel electrodes PX are clearly shown in FIG. 33.

As described above, each of the pixel electrodes PX is made of a stacked structure in which the semiconductor layer AS, the high-concentration layer $d_0$, the Mo layer $d_1$ and the ITO film ITO1 are stacked in that order.

In this case, although damages may be caused by steps due to the pixel electrodes PX, the respective side walls of each of the pixel electrodes PX are formed to have gently tapered surfaces which become gradually more open toward the transparent substrate SUB1. Accordingly, it is possible to fully mitigate climb-over damages from occurring in the protective film PSV and the alignment layer ORI which are formed to overlie the drain signal lines DL.

<<Drain Signal Line DL>>

Cross sections of the drain signal lines DL are shown in FIG. 33.

Each of the drain signal lines DL is also made of a stacked structure in which the semiconductor layer AS, the high-concentration layer $d_0$, the Mo layer $d_1$ and the ITO film are stacked in that order, similarly to the case of the pixel electrodes PX.

For this reason, damages may be caused by steps due to the pixel electrodes PX, but the respective side walls of each of the drain signal lines DL are formed to have gently tapered surfaces which become gradually more open toward the transparent substrate SUB1, whereby it is possible to fully mitigate climb-over damages from occurring in the protective film PSV and the alignment layer ORI which are formed to overlie the drain signal lines DL.

<<Gate Terminal Part GTM>>

Figure 35:
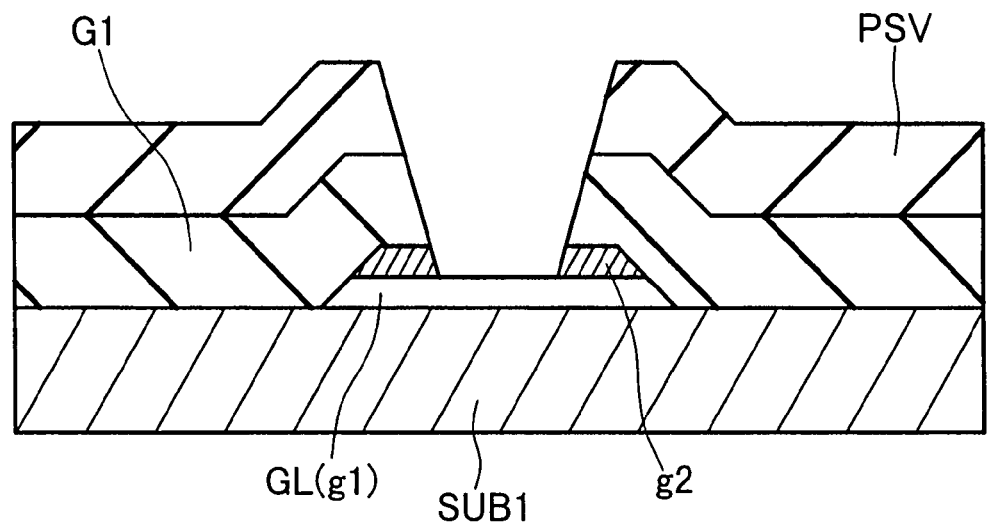
FIG. 35 is a cross-sectional view showing one embodiment of a gate terminal part of the liquid crystal display device shown in FIG. 25.

FIG. 35 is a view showing a cross section of one of gate terminal parts GTM. The shown gate terminal part GTM is formed by opening apertures, respectively, in the protective film PSV and the insulating film GI in that order (by selective etching using dry etching) and exposing an extending end of the gate signal line GL.

As is apparent from FIG. 35, the gate signal line GL which has been formed of the ITO film g1 as the lower layer and the Mo layer g2 as the upper layer is formed with the overlying Mo layer g2 being removed at the gate terminal part GTM. This is because the Mo layer g2 for which no selection ratio can be ensured is etched while the apertures are being opened in the protective film PSV and the insulating film GI by dry etching.

However, the underlying ITO film g1 having the function of a stopper of the etching is left, and the function of the gate terminal part GTM is fully realized by the ITO film g1. In addition, the ITO film g1 is made of a material which cannot easily be oxidized, whereby it is possible to form, for example, the gate terminal part GTM having reliability in resistance to electrolytic corrosion.

<<Drain Terminal Part DTM>>

Figure 36:
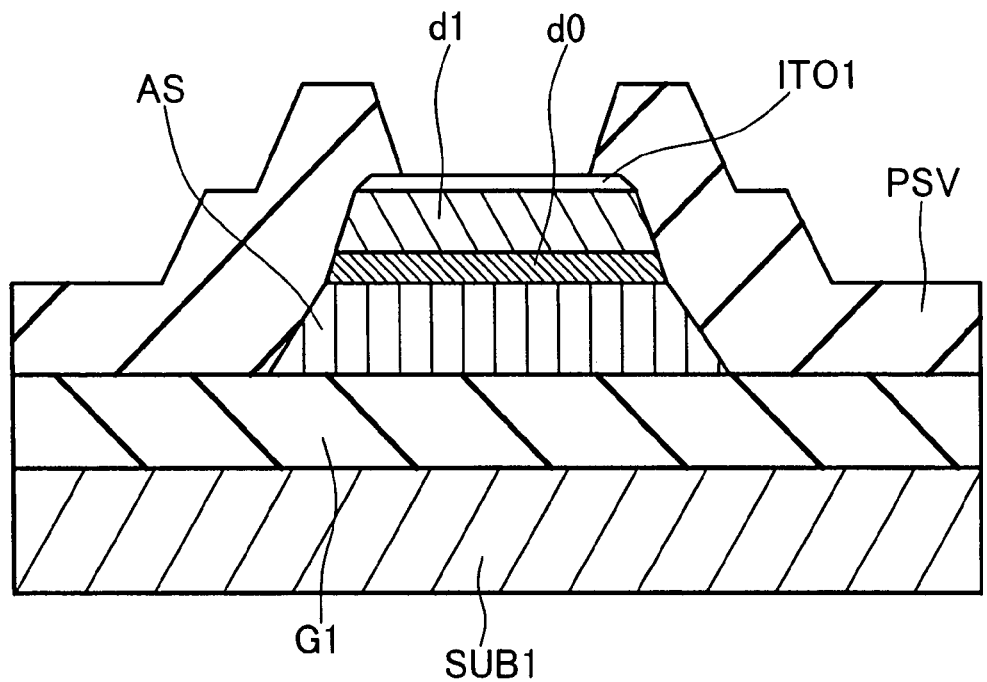
FIG. 36 is a cross-sectional view showing one embodiment of a drain terminal part of the liquid crystal display device shown in FIG. 25.

FIG. 36 is a view showing a cross section of one of drain terminal parts DTM. The shown drain signal line DL is made of a stacked structure in which the semiconductor layer AS, the high-concentration layer $d_0$, the Mo layer $d_1$ and the ITO film ITO1 are stacked in that order. Accordingly, the drain terminal part DTM is formed by opening an aperture in the protective film PSV.

Since the ITO film ITO formed on the surface of the drain signal lines DL is exposed by opening the aperture in the protective film PSV, it is not particularly necessary to form an ITO film for preventing electrolytic corrosion.

<<Thin Film Transistor TFT>>

In Embodiment 6, the thin film transistors TFT are formed by a half-exposure method. FIGS. 37A to 37F are process diagrams showing one embodiment of a method of forming the above-described thin film transistor TFT.

Figure 37A:
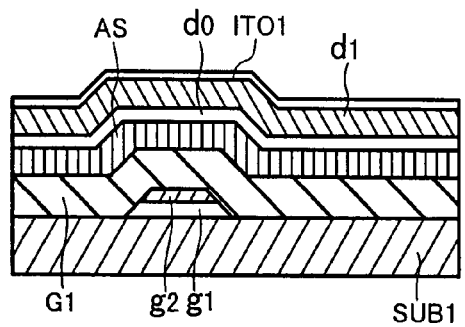
FIGS. 37A to 37F are process diagrams showing one embodiment of a manufacturing method for a thin film transistor of the liquid crystal display device shown in FIG. 25.

First, as shown in FIG. 37A, after a gate signal line GL and an insulating film GI have been formed, a semiconductor layer AS is formed on the surface of this insulating film GI and a high-concentration layer $d_0$ is formed on the surface of the semiconductor layer AS, and a Mo layer $d_1$ is formed on the high-concentration layer do, and furthermore, a ITO film ITO1 is formed on the Mo layer $d_1$. In this case, the semiconductor layer AS, the high-concentration layer $d_0$, the Mo layer $d_1$ and the ITO film ITO1 are continuously deposited in the same chamber.

Figure 37D:
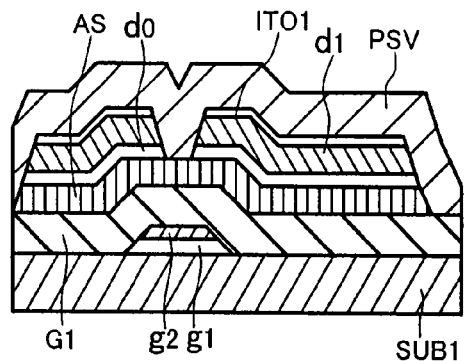
Figure 37B:
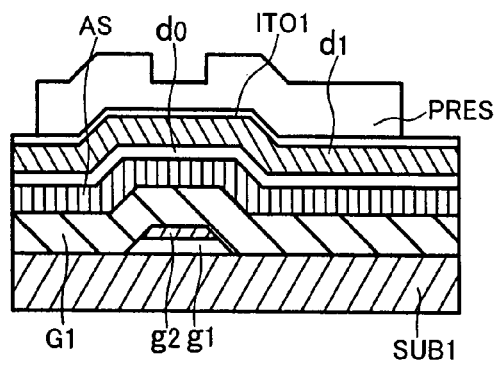

As shown in FIG. 37B, a photoresist film PRES is formed on the surface of the ITO film ITO1, and selective exposure using a photomask is performed. The photomask used in this case is either a mask having a grid structure or a mask fabricated by controlling the film thickness of a semi-transparent film such as MoSi, and the photoresist film PRES is left by using the photomask in portions which correspond to portions in which to form a drain signal line DL, a drain electrode SD1 and a source electrode SD2 and in a portion which corresponds to the portion (channel portion) between the drain electrode SD1 and the source electrode SD2. In this case, the film thickness of the photoresist film PRES over the channel portion is made smaller than the film thickness of the photoresist film PRES over the other regions.

Specifically, in the channel portion, resist conditions are controlled so that the time of completion of etching of the photoresist, the Mo layer $d_1$ and the high-concentration layer $d_0$ becomes (approximately) the same as the time of completion of etching of the Mo layer $d_1$, the high-concentration layer $d_0$ and the semiconductor layer AS.

Figure 37E:
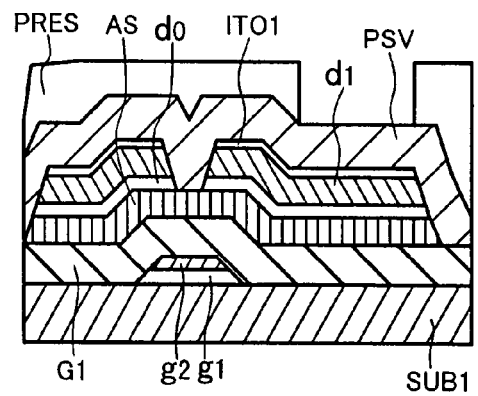
Figure 37C:
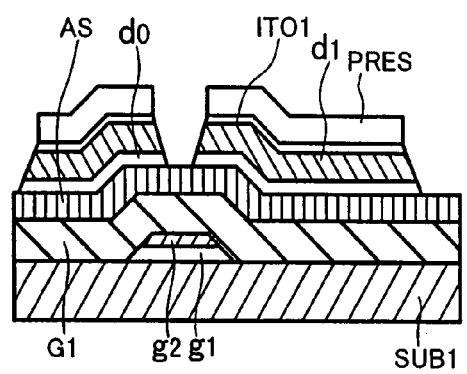

As shown in FIG. 37C, the photoresist film PRES is used a mask, and the portions of the ITO film ITO1, the Mo layer $d_1$, the high-concentration layer do and the semiconductor layer AS that are exposed from this mask are selectively etched (for example, a fluorine-containing gas such as $SF_6$ or $CF_4$ is selected as a gas for selective etching of the semiconductor layer AS and the high-concentration layer $d_0$).

In this manner, the semiconductor layer AS which constitutes the thin film transistor TFT is etched in an island-like shape, but the channel portion is etched to at least the high-concentration layer $d_0$. After that, the photoresist film PRES is removed.

As shown in FIG. 37D, a protective film PSV is formed. As shown in FIG. 37E, a photoresist film PRES is formed on the surface of the protective film PSV so that an aperture is formed in the central portion of the pixel area (including the region in which the thin film transistor TFT is formed) except the periphery of the pixel area.

Figure 37F:
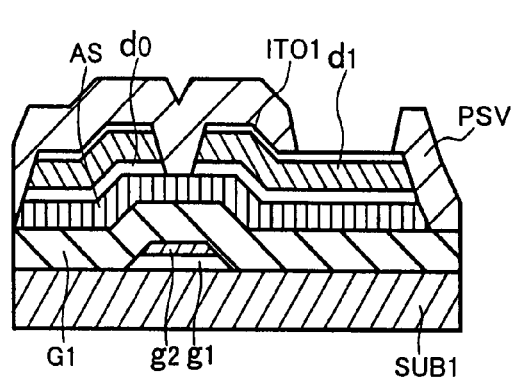

As shown in FIG. 37F, this photoresist film PRES is used as a mask to remove the portion of the protective film PSV that is exposed from this mask. Incidentally, at the same time that holes are formed in this protective film PSV, holes at the gate terminal parts GTM and the drain terminal parts DTM are also formed. After that, the photoresist film PRES is removed.

<<Manufacturing Method>>

Figure 38A:
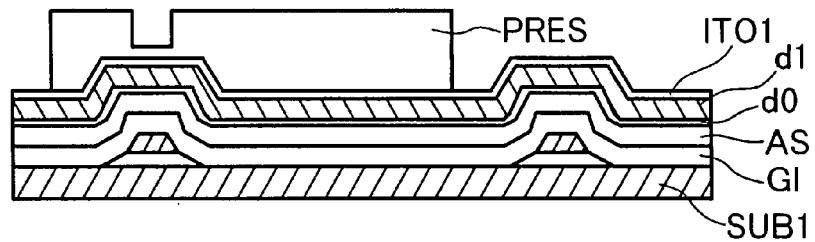
FIGS. 38A to 38E are process diagrams showing one embodiment of the liquid crystal display device shown in FIG. 25.
Figure 38B:
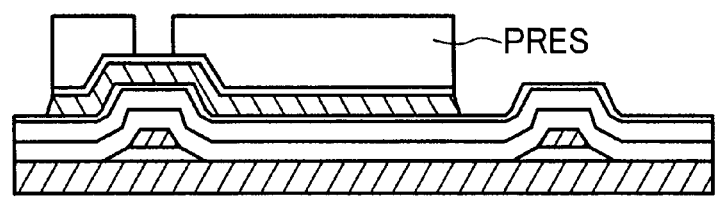
Figure 38C:
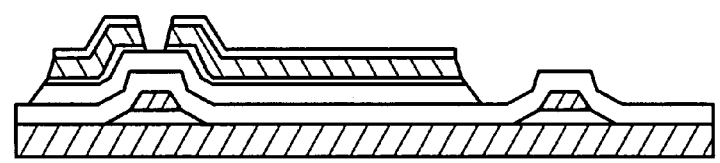
Figure 38D:
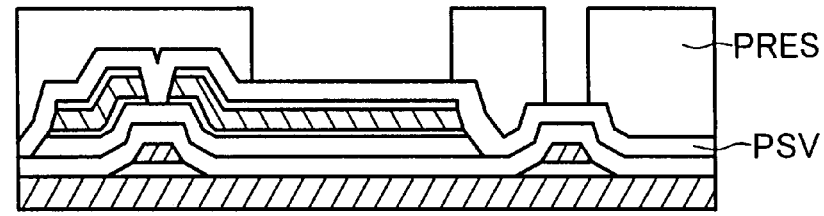
Figure 38E:
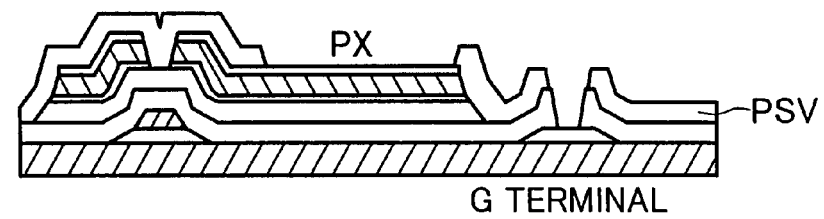

FIGS. 38A to 38E are process diagrams showing one embodiment of a manufacturing method for the above-described liquid crystal display device. FIGS. 38A to 38E are views showing the process diagrams for forming the portion of the gate terminal part GTM, together with the process diagrams shown in FIGS. 37A to 37F. FIG. 38A corresponds to FIG. 37B, FIG. 38C corresponds to FIG. 37C, FIG. 38D corresponds to FIG. 37E, and FIG. 38E corresponds to FIG. 37F.

A series of processes is as shown in the Table of FIG. 39. As is apparent from this table, the number of photo-processes can be reduced to three, specifically, the patterning of the gate signal lines GL, the patterning of the drain signal lines DL (the drain electrodes and the source electrodes), and the patterning of the protective film PSV.

Embodiment 7

Figure 40:
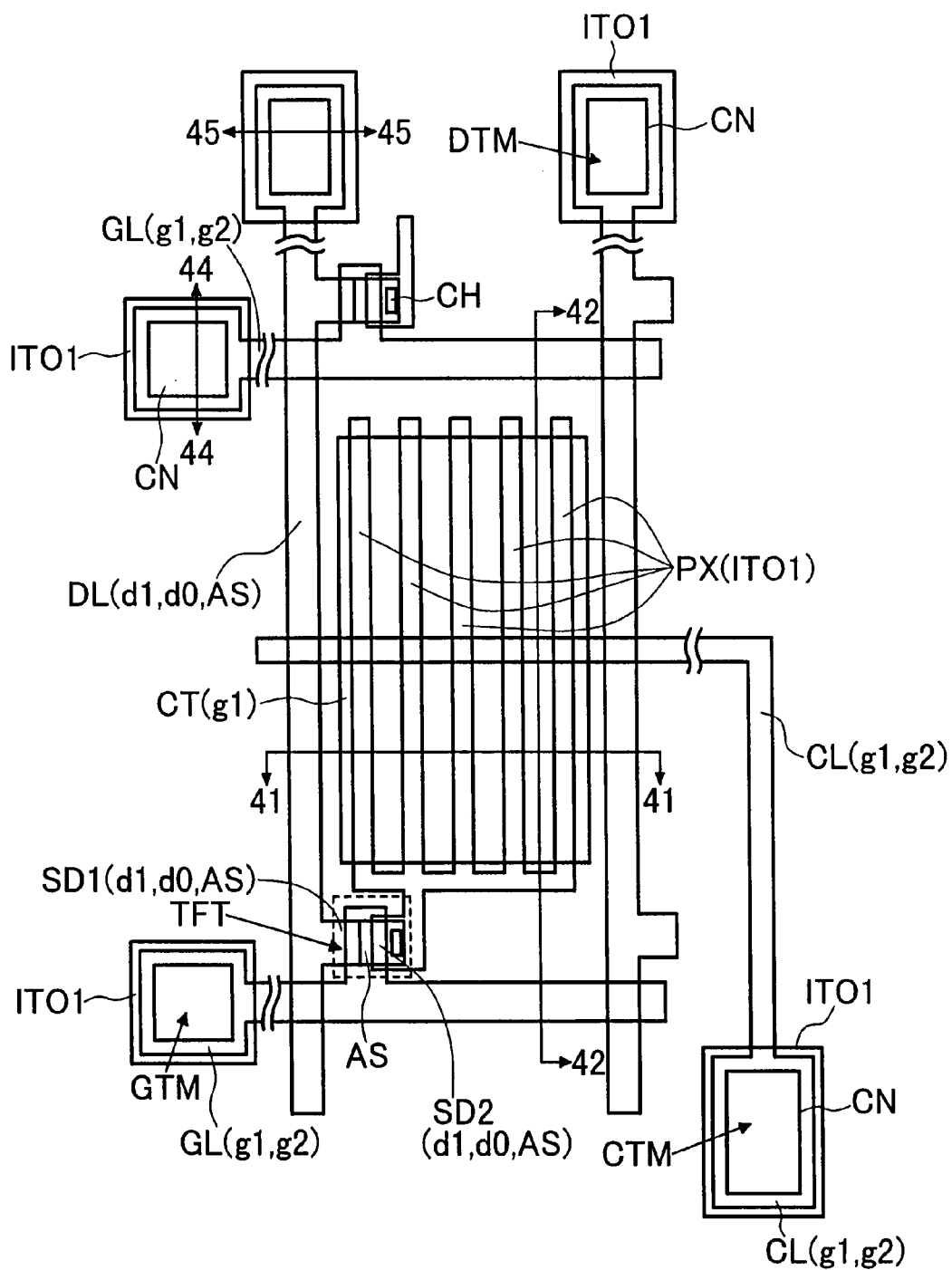
FIG. 40 is a plan view showing one embodiment of a pixel of the liquid crystal display device according to the invention.

FIG. 40 is a plan view showing another embodiment of a pixel on the liquid crystal display device according to the invention, and corresponds to FIG. 28. Specifically, a counter electrode CT made of, for example, an ITO film is formed in the greater part of the pixel area, and a plurality of pixel electrodes PX made of, for example, an ITO film are formed to be juxtaposed in the form of stripes. In Embodiment 7, the insulating film interposed between the counter electrode CT and the pixel electrodes PX has a two-layer structure made of an insulating film GI and a protective film PSV. A film transistor TFT is formed by a resist reflow method.

Figure 41:
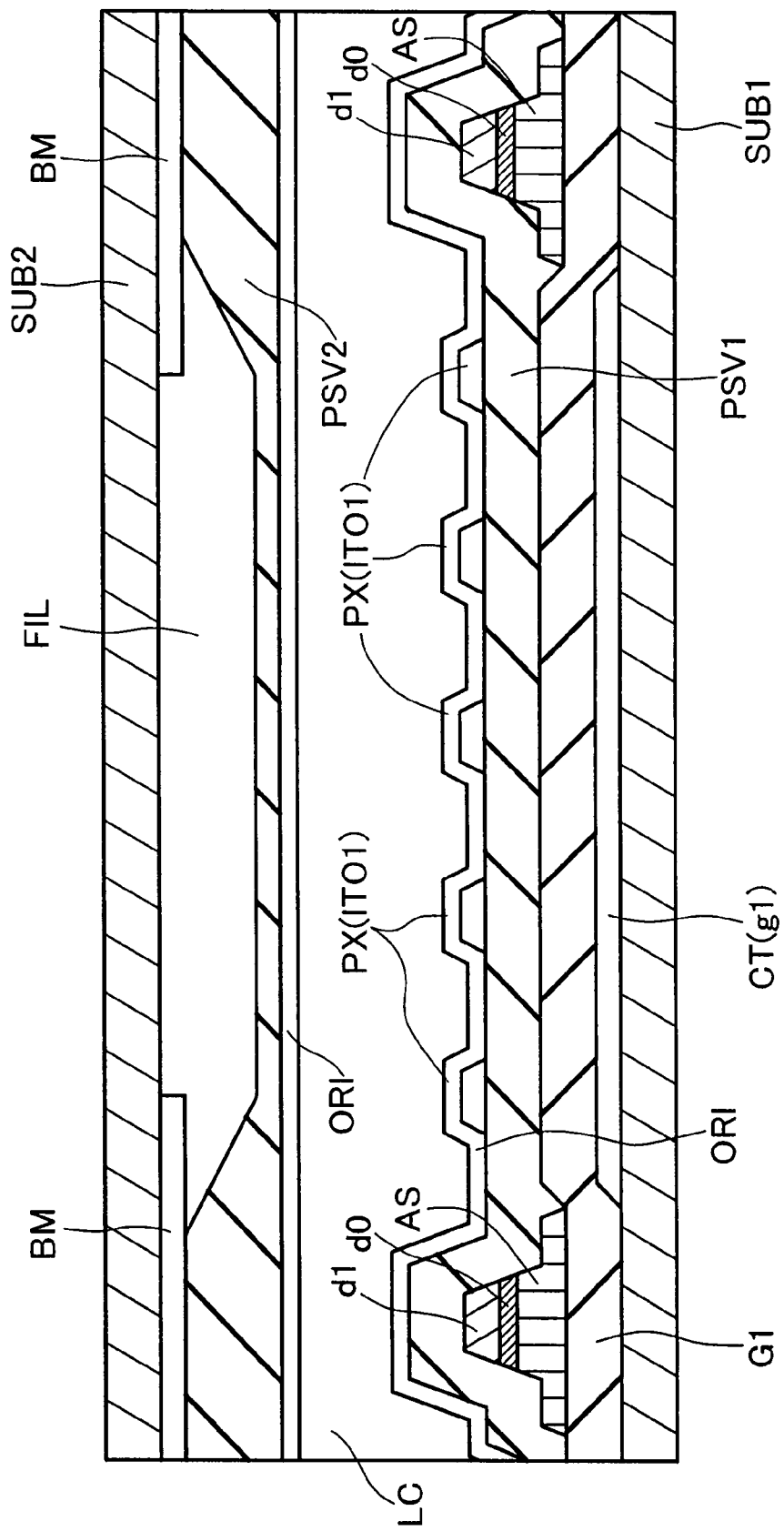
FIG. 41 is a cross-sectional view taken along line 41-41 of FIG. 40.
Figure 42:
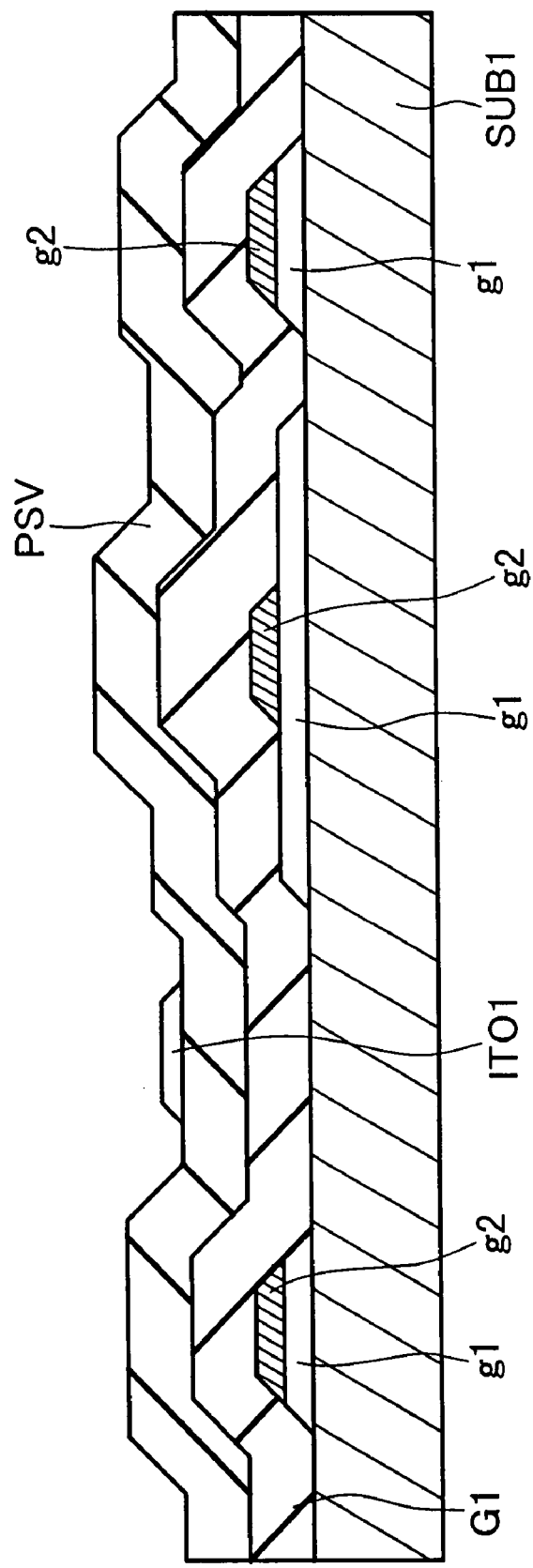
FIG. 42 is a cross-sectional view taken along line 42-42 of FIG. 40.
Figure 45:
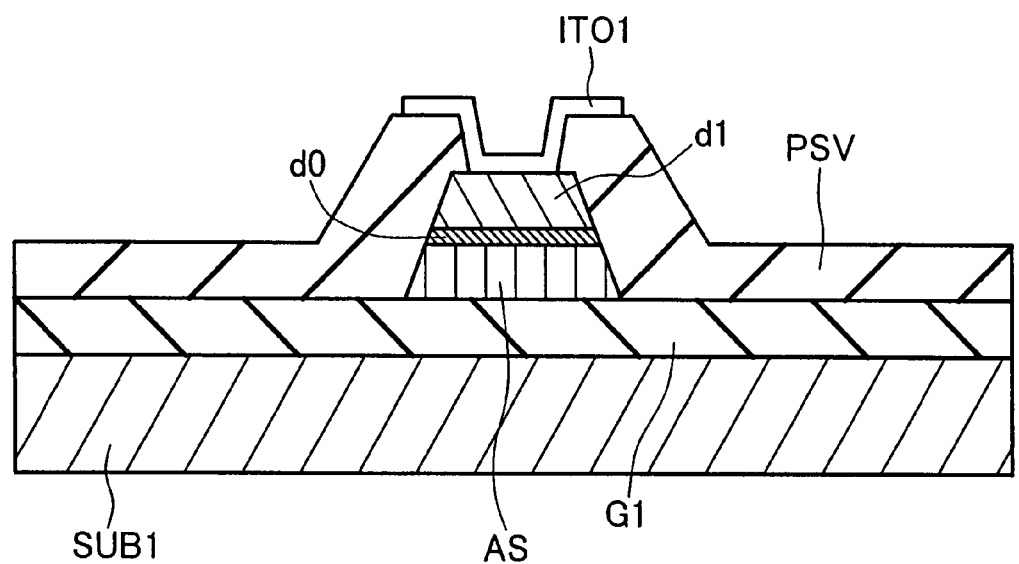
FIG. 45 is a cross-sectional view taken along line 45-45 of FIG. 40.

Incidentally, FIG. 41 shows a cross-sectional view taken along line 41-41 of FIG. 40, FIG. 42 shows a cross-sectional view taken along line 44-44 of FIG. 40, and FIG. 45 shows a cross-sectional view taken along line 45-45 of FIG. 40.

<<Drain Signal Line DL>>

Cross sections of drain signal lines DL are shown in FIG. 41. Each of the drain signal lines DL is formed on the insulating film GI, and is made of a stacked structure in which the semiconductor layer AS, the high-concentration layer $d_0$ and the Mo layer $d_1$ are stacked in that order.

Since the drain signal lines DL are formed in parallel with the thin film transistors TFT formed by the resist reflow method, the side walls of each of the drain signal lines DL are respectively formed to have gently tapered surfaces (which become gradually more open toward the transparent substrate SUB1) with steps being respectively formed on the opposite side surfaces of the semiconductor layer AS of each of the drain signal lines DL.

<<Gate Signal Line GL>>

Cross sections of gate signal lines GL are shown in FIG. 42. Each of the gate signal lines GL is formed on the transparent substrate SUB1, and is made of a stacked structure in which the ITO film g1 and the Mo layer g2 are stacked in that order. Tapered surfaces which become gradually more open toward the transparent substrate SUB1 are respectively formed on the side walls of each of the gate signal lines GL.

<<Counter Voltage Signal Line CL>>

A cross section of a counter voltage signal line CL is shown in FIG. 42. The counter voltage signal line CL is made of a stacked structure in which the ITO film g1 and the Mo layer g2 are stacked in that order, similarly to the gate signal lines GL. The ITO film g1 is formed to be wider than the Mo layer g2 so that the ITO film g1 can serve the function of the counter electrode CT.

As described above, although the counter electrode CT has a one-layer structure, the counter voltage signal line CL has a two-layer structure in which a layer made of a material different from that of the counter electrode CT is formed on a layer which constitutes the counter electrode CT. The counter voltage signal line CL and the counter electrode CT can be formed by one photo-process adopting a half-exposure method.

Figure 43A:
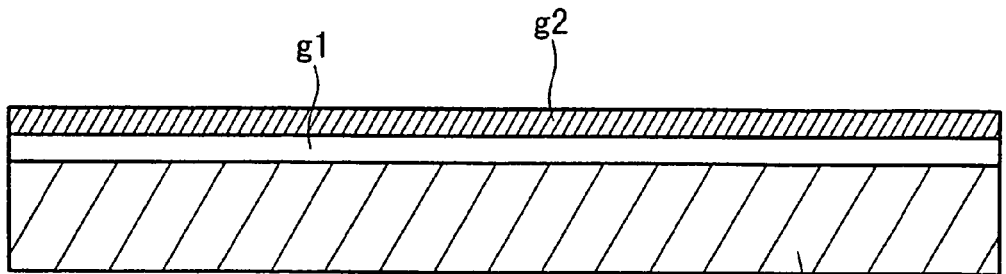
FIG. 43 is an explanatory view showing a half-exposure method.

FIGS. 43A to 43D are views showing a process to be used in this case. First of all, as shown in FIG. 43A, a stacked structure in which, for example, the ITO film g1 and the Mo layer g2 are stacked in that order is formed on the surface of the transparent substrate SUB1.

Figure 43B:
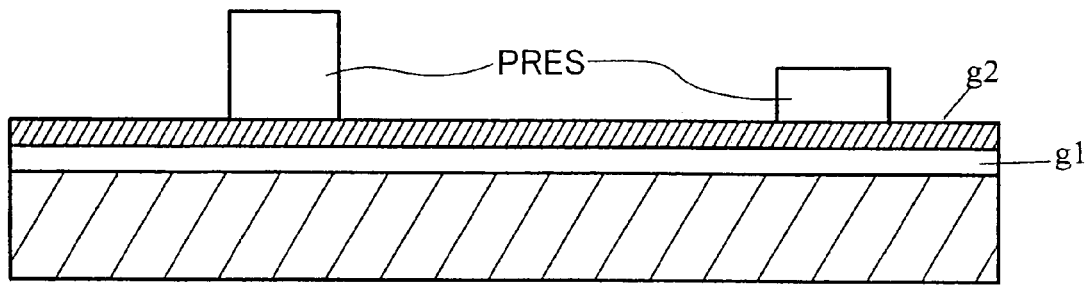

Then, a photoresist film PRES is selectively formed on the surface of the stacked structure, but as shown in FIG. 43B, the photoresist film PRES has different thicknesses in different areas. The formation of the photoresist film having different thicknesses is achieved by effecting so-called half-exposure using either a photomask having a grid structure or a photomask fabricated by controlling the film thickness of a semi-transparent film such as MoSi.

Figure 43C:
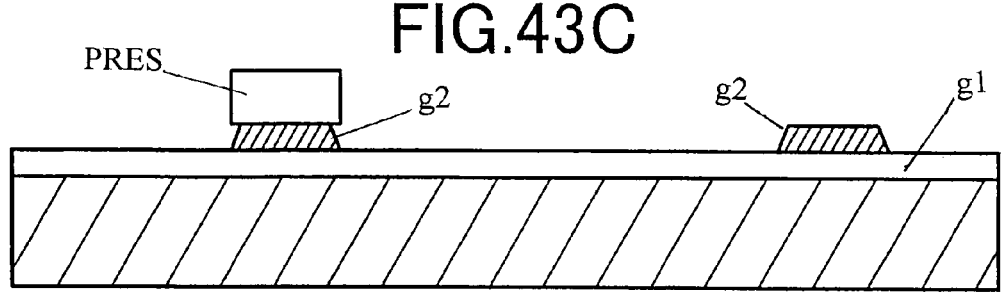

After that, as shown in FIG. 43C, the overlying Mo layer g2 is selectively etched by using the photoresist film PRES as a mask. In this case, the photoresist film of larger film thickness is left in the form of a photoresist film of reduced film thickness, but the photoresist film of smaller film thickness vanishes.

Figure 43D:
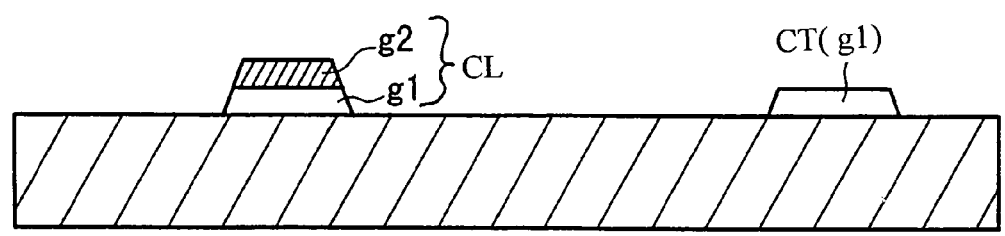

Then, as shown in FIG. 43D, the underlying ITO film g1 is selectively etched by using the remaining photoresist film PRES as a mask. In this case, the Mo layer g2 lying on the side where the photoresist film is vanished is etched at this time.

<<Gate Terminal Part GTM>>

Figure 44:
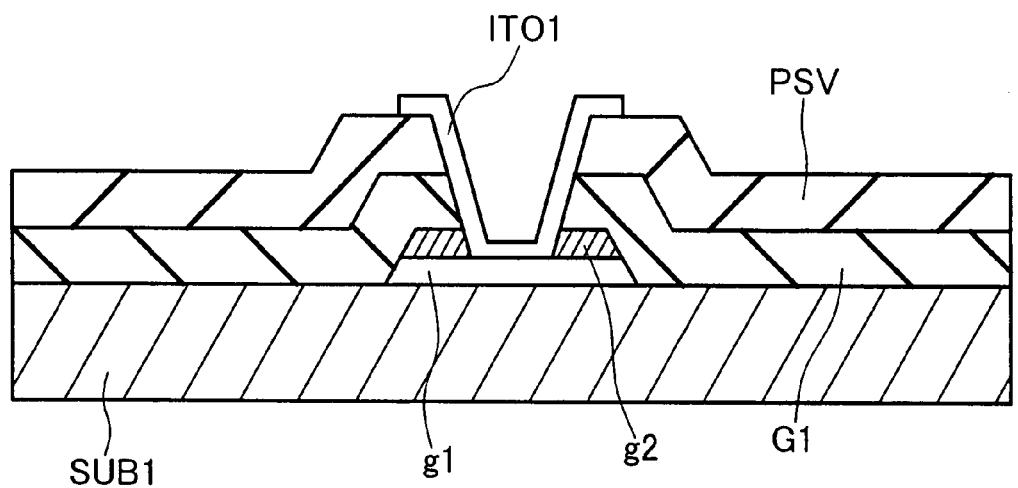
FIG. 44 is a cross-sectional view taken along line 44-44 of FIG. 40.

A cross section of one of gate terminal parts GTM is shown in FIG. 44. The shown gate terminal part GTM is formed by opening an aperture in the insulating film GI and the protective film PSV which covers the gate signal lines GL.

In this case, the Mo layer g2 which is the upper layer of the gate signal lines GL is removed by opening the aperture, and the electrolytic corrosion of the gate terminal part GTM can be far more effectively prevented by an ITO film which is formed in the aperture as well as in a portion around the aperture. Incidentally, the ITO film is formed at the same time as the pixel electrodes PX.

<<Drain Terminal Part DTM>>

A cross section of one of drain terminal parts DTM is shown in FIG. 45. The drain terminal part DTM is formed by opening an aperture in the protective film PSV which covers the drain signal lines DL.

In this case, the electrolytic corrosion of the gate terminal part GTM can be far more effectively prevented by an ITO film which is formed in the aperture as well as in a portion around the aperture. This ITO film is also formed at the same time as the pixel electrodes PX.

<<Manufacturing Method>>

FIGS. 46A to 46D, FIGS. 47E to 47H and FIG. 48I are process diagrams showing one embodiment of a manufacturing method for the above-described liquid crystal display device, and show a portion which includes a thin film transistor TFT and a counter electrode CT.

Figure 46A:
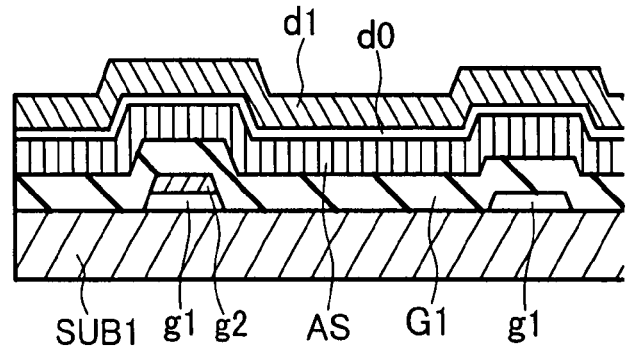
FIGS. 46A to 46D are process diagrams showing one embodiment of a manufacturing method for the thin film transistor shown in FIG. 40.

First of all, as shown in FIG. 46A, after a gate signal line GL and an insulating film GI have been formed, a semiconductor layer AS, a high-concentration layer $d_0$ and a Mo layer $d_1$ are formed on the surface of the insulating film GI in a stacked manner. In this case, the semiconductor layer AS, the high-concentration layer $d_0$ and the Mo layer $d_1$ are continuously deposited in the same chamber.

Figure 46B:
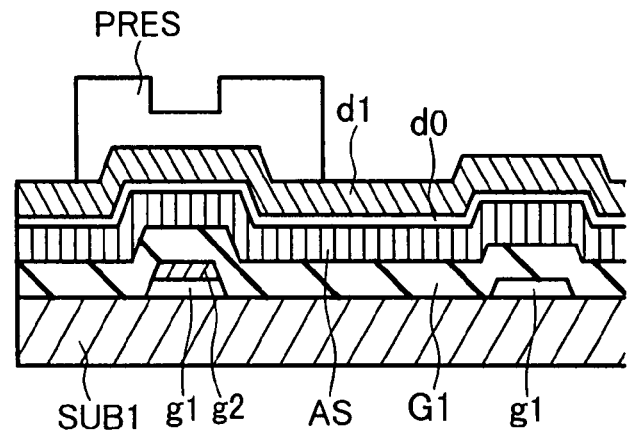

As shown in FIG. 46B, a photoresist film PRES is formed on the surface of an ITO film, and selective exposure using a photomask is performed. The photomask used in this case is either a mask having a grid structure or a mask fabricated by controlling the film thickness of a semi-transparent film such as MoSi, and the photoresist film PRES is left by using the photomask in portions which correspond to portions in which to form a drain signal line DL, a drain electrode SD1 and a source electrode SD2 and in a portion which corresponds to the portion (channel portion) between the drain electrode SD1 and the source electrode SD2. In this case, the film thickness of the photoresist film PRES over the channel portion is made smaller than the film thickness of the photoresist film PRES over the other regions.

Specifically, in the channel portion, resist conditions are controlled so that the time of completion of etching of the photoresist, the Mo layer $d_1$ and the high-concentration layer $d_0$ becomes (approximately) the same as the time of completion of etching of the Mo layer $d_1$, the high-concentration layer $d_0$ and the semiconductor layer AS.

Figure 46C:
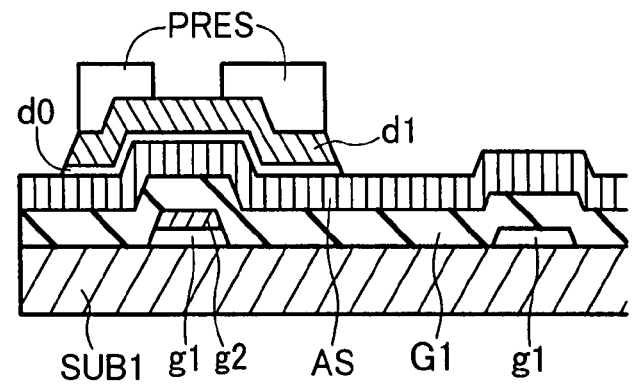

As shown in FIG. 46C, the photoresist film PRES is used a mask, and the portions of the Mo layer $d_1$, the high-concentration layer $d_0$ and the semiconductor layer AS that are exposed from this mask are selectively etched (for example, a fluorine-containing gas such as $SF_6$ or $CF_4$ is selected as a gas for selective etching of the semiconductor layer AS and the high-concentration layer $d_0$).

In this manner, the semiconductor layer AS is exposed in the area other than the area in which to form the thin film transistor TFT, and the photoresist film PRES is reduced in film thickness in its entire area. In the channel portion, the Mo layer $d_1$ is exposed from the photoresist film PRES.

Figure 46D:
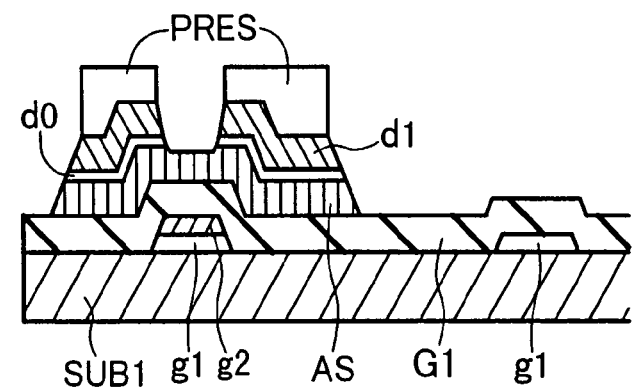

As shown in FIG. 46D, etching is performed by using the remaining photoresist film PRES as a mask. In this manner, the semiconductor layer AS is exposed in the area other than the area in which to form the thin film transistor TFT, and the insulating film GI is exposed.

Figure 47E:
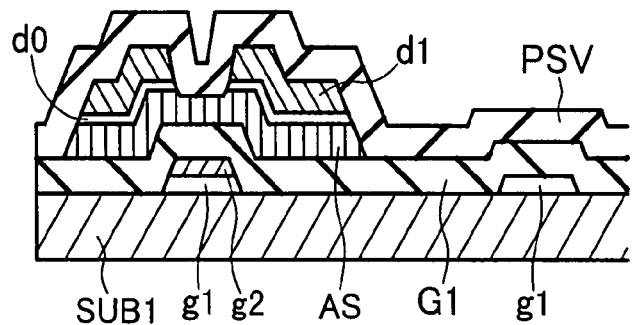
FIGS. 47E to 47H are process diagrams following FIG. 46D, showing one embodiment of a manufacturing method for the thin film transistor shown in FIG. 40.

In addition, in the channel portion, the Mo layer $d_1$ and the high-concentration layer $d_0$ are etched, and the semiconductor layer AS is exposed. As shown in FIG. 47E, a protective film PSV is formed.

Figure 47F:
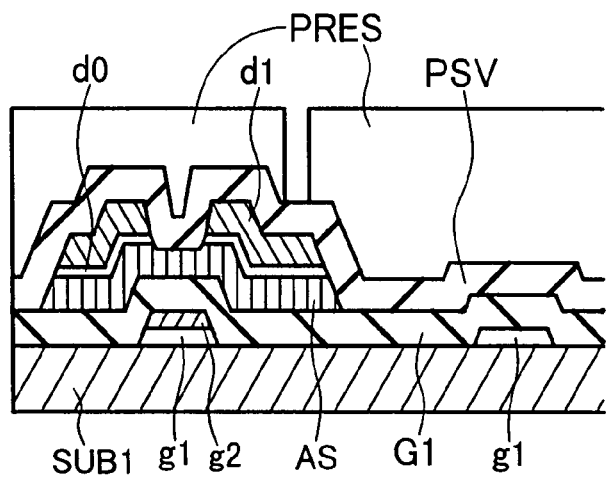

As shown in FIG. 47F, a photoresist film PRES is formed on the upper surface of the protective film PSV so that an aperture is formed in a portion in which to form a contact hole for the source electrode SD2 of the thin film transistor TFT. Then, the protective film PSV is etched by using the photoresist film PRES as a mask. Incidentally, at the same time that holes are formed in this protective film PSV, holes at the gate terminal parts GTM and the drain terminal parts DTM are also formed. After that, the photoresist film PRES is removed.

Figure 47G:
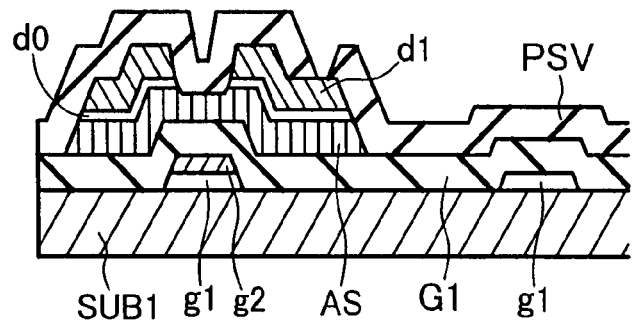
Figure 47H:
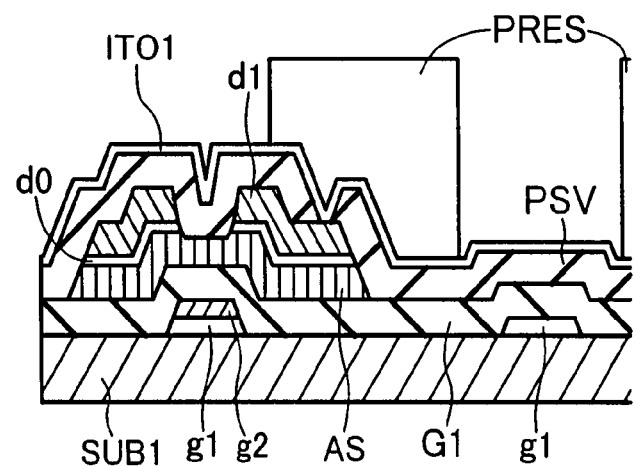
Figure 48I:
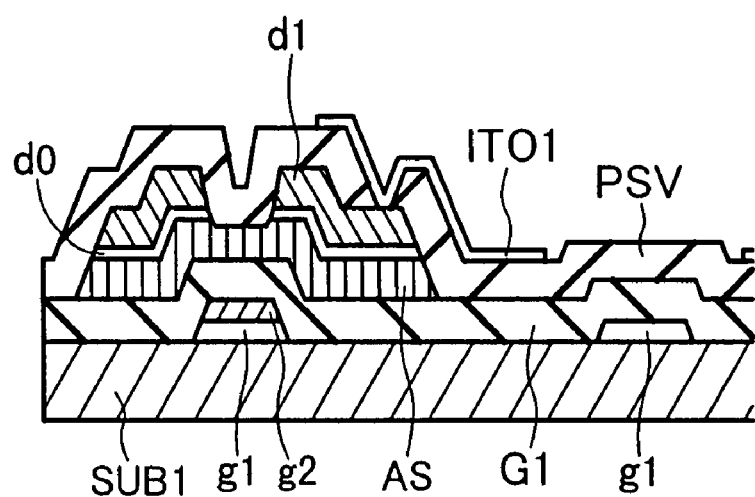
FIG. 48I are a process diagram following FIG. 47H, showing one embodiment of a manufacturing method for the thin film transistor shown in FIG. 40.

As shown in FIG. 47G, the contact hole is formed in the protective film PSV, and a part of the source electrode SD2 of the thin film transistor TFT is exposed from this contact hole. As shown in FIG. 47H, an ITO film is formed on the protective film PSV, and a photoresist film PRES is formed on the ITO film over an area in which to form a pixel electrodes PX and an extending portion of the pixel electrodes PX to be connected to the source electrode SD2 of the thin film transistor TFT. As shown in FIG. 48I, the ITO film is etched by using the photoresist film PRES as a mask, and then the photoresist film PRES is removed.

Embodiment 8

Figure 49:
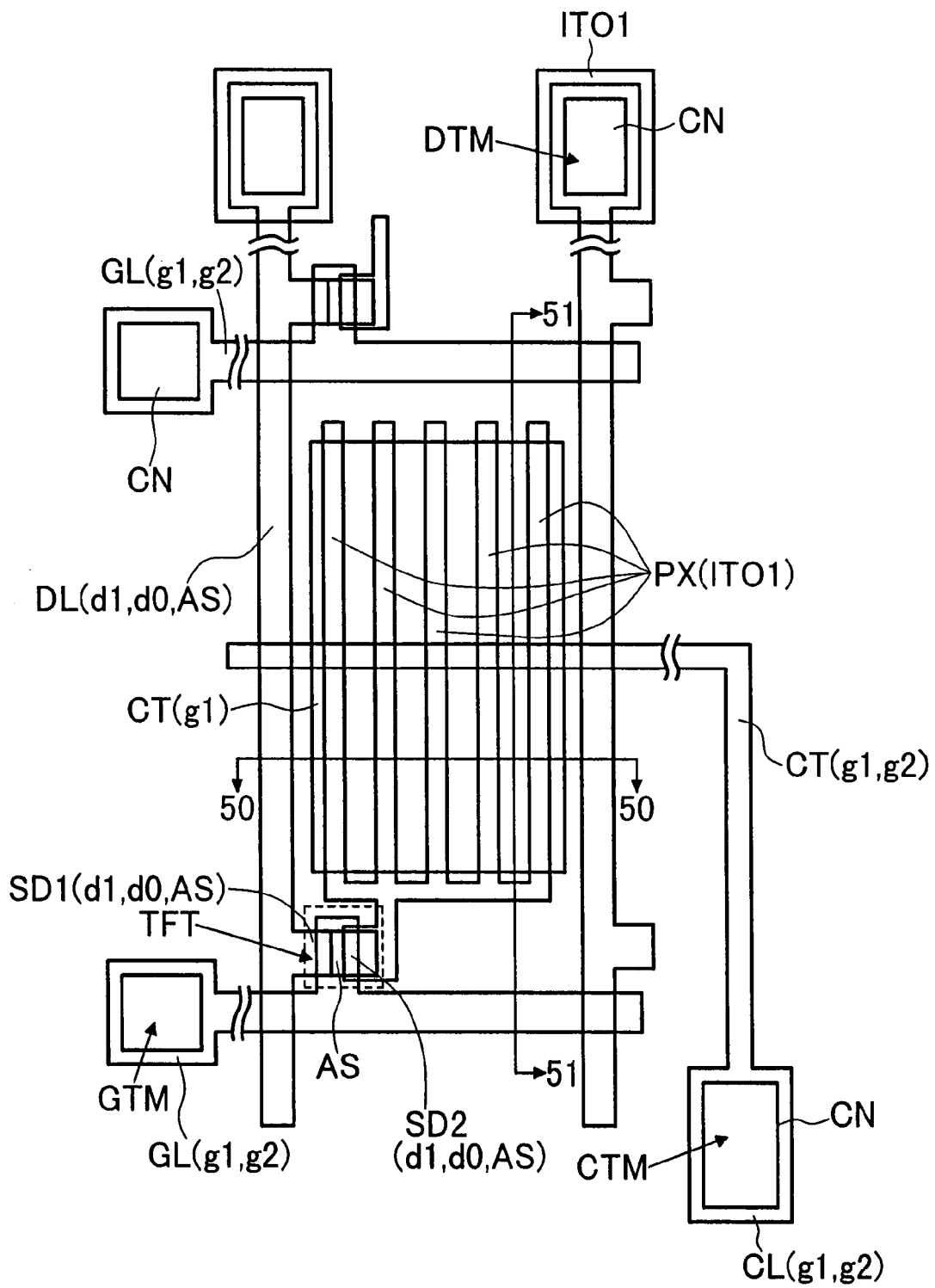
FIG. 49 is a plan view showing one embodiment of a pixel of the liquid crystal display device according to the invention.

FIG. 49 is a plan view showing another embodiment of a pixel on the liquid crystal display device according to the invention, and corresponds to FIG. 40. The construction shown in FIG. 49 differs from that shown in FIG. 40 in that a resist reflow method is adopted and no contact holes are formed in the protective film PSV. Incidentally, FIG. 50 shows a cross section taken along line 50-50 of FIG. 49, and FIG. 51 shows a cross section taken along line 51-51 of FIG. 49.

<<Drain Signal Line DL>>

Figure 50:
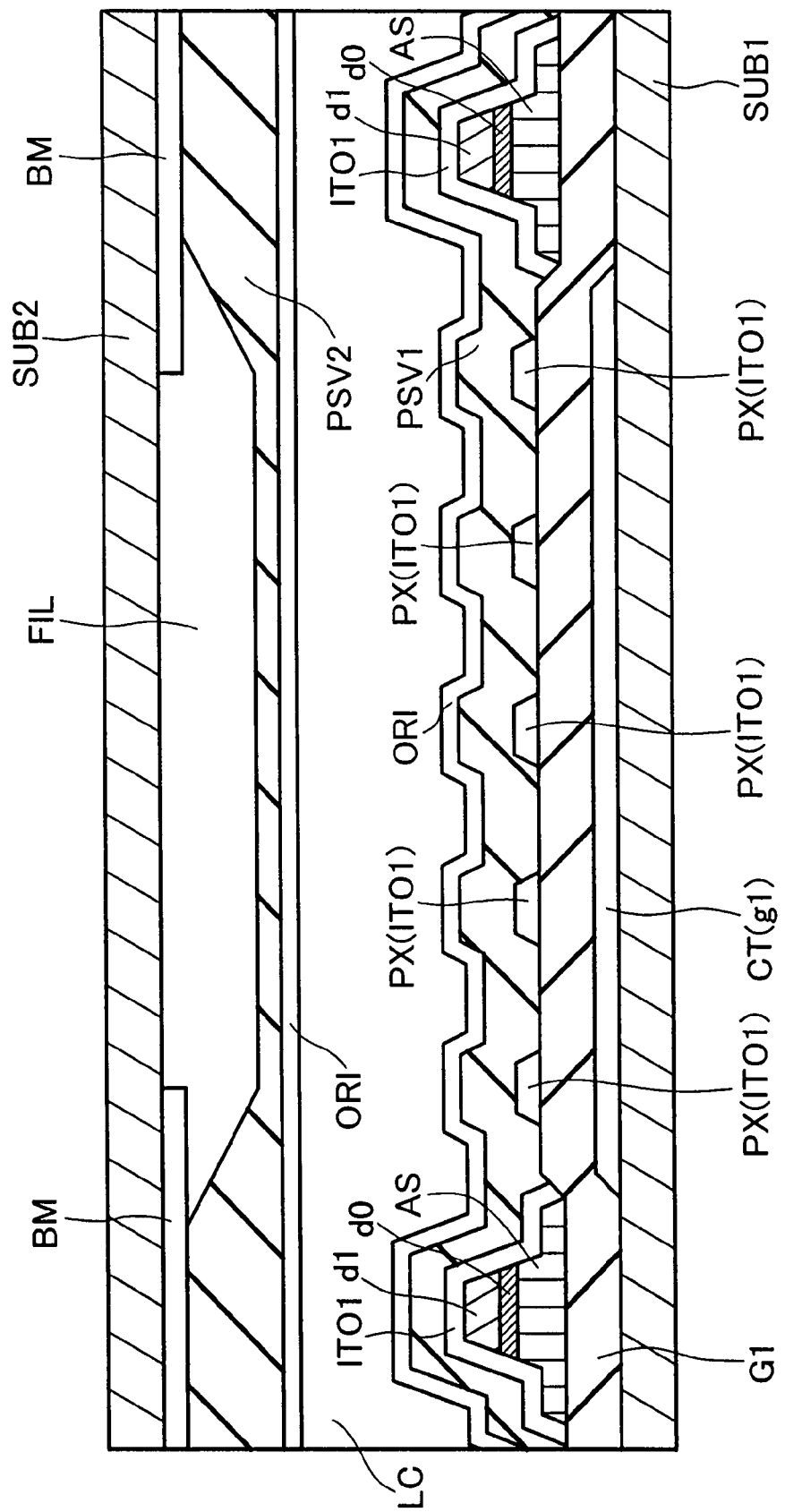
FIG. 50 is a cross-sectional view taken along line 50-50 of FIG. 49.
Figure 51:
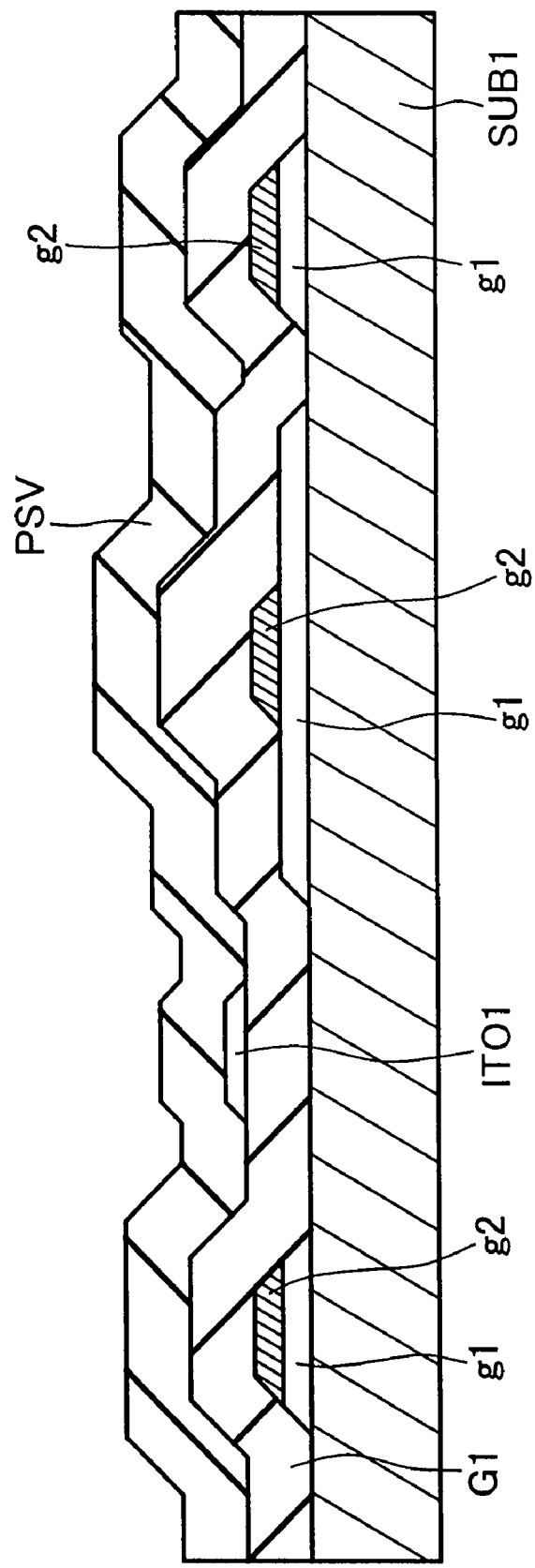
FIG. 51 is a cross-sectional view taken along line 51-51 of FIG. 49.

Cross sections of drain signal lines DL are shown in FIG. 50. Each of the drain signal lines DL is made of a stacked structure in which a semiconductor layer AS, a high-concentration layer $d_0$, a Mo layer $d_1$ and an ITO film ITO1 are stacked in that order. In this construction, the ITO film ITO1 is formed to be extended to the side walls of the stacked structure, that is to say, to cover the whole of the drain signal line DL.

<<Gate Signal Line GL>>

Cross sections of gate signal lines GL are shown in FIG. 51. Each of the gate signal lines GL is formed on the transparent substrate SUB1, and is made of a stacked structure in which the ITO film g1 and the Mo layer g2 are stacked in that order. Tapered surfaces which become gradually more open toward the transparent substrate SUB1 are respectively formed on the side walls of each of the gate signal lines GL.

<<Counter Voltage Signal Line CL>>

A cross section of a counter voltage signal line CL is shown in FIG. 51. The counter voltage signal line CL is made of a stacked structure in which the ITO film g1 and the Mo layer g2 are stacked in that order, similarly to the gate signal lines GL. The ITO film g1 is formed to be wider than the Mo layer g2 so that the ITO film g1 can serve the function of the counter electrode CT.

<<Drain Terminal Part DTM>>

Figure 52:
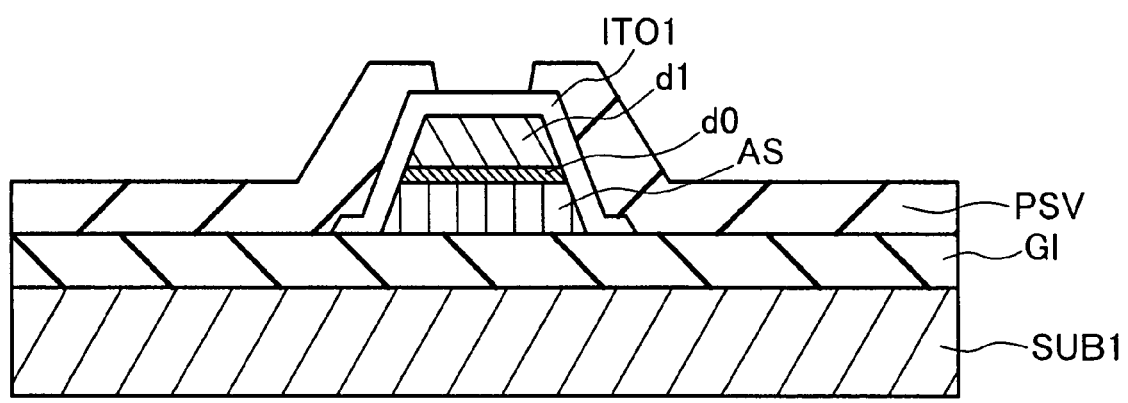
FIG. 52 is a cross-sectional view showing the drain terminal part shown in FIG. 49.

A cross section of one of drain terminal parts DTM is shown in FIG. 52. The drain terminal part DTM is made of a stacked structure in which the semiconductor layer AS, the high-concentration layer $d_0$, the Mo layer $d_1$ and the ITO film ITO1 are stacked in that order. In this construction, the ITO film ITO1 is formed to be extended to the side walls of the stacked structure.

The drain terminal part DTM is formed by opening apertures in the protective film PSV which covers the drain signal lines DL and exposing the surface of the ITO film.

<<Manufacturing Method>>

FIGS. 53A to 53D are process diagrams showing one embodiment of a manufacturing method for the above-described liquid crystal display device, and show a portion which includes a thin film transistor TFT and a counter electrode CT.

Figure 53A:
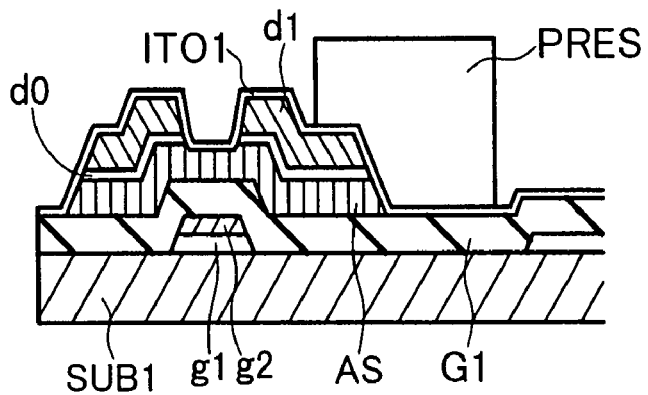
FIGS. 53A to 53D are process diagrams showing one embodiment of a manufacturing method for the thin film transistor shown in FIG. 49.

First of all, as shown in FIG. 53A, after a gate signal line GL, the counter electrode CT and a counter voltage signal line CL have been formed on the surface of the transparent substrate SUB1, an insulating film GI is formed to cover the gate signal line GL, the counter electrode CT and the counter voltage signal line CL.

A semiconductor layer AS, a high-concentration layer $d_0$ and a Mo layer $d_1$ are formed on the surface of the insulating film GI in a stacked manner, whereby the thin film transistor TFT and a drain signal lines DL are formed by the above-described resist reflow method.

An ITO film ITO1 is formed on the entire area of the surface of the transparent substrate SUB1 formed in this manner, and a photoresist film PRES is formed on the surface of the ITO film ITO1 in a portion which corresponds to an area in which to form a pixel electrodes PX.

Figure 53B:
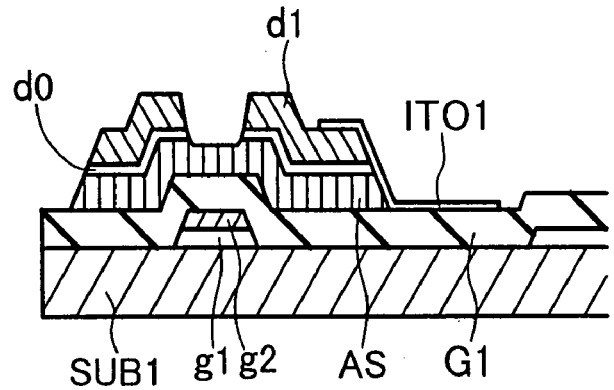
Figure 53C:
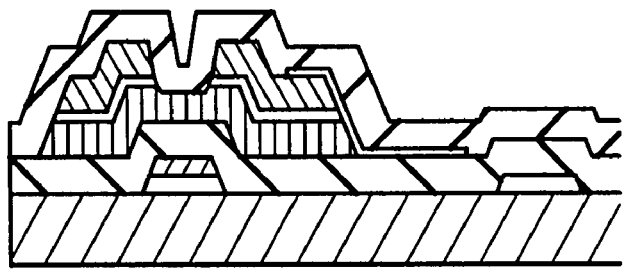

Then, the ITO film ITO1 is etched by using this photoresist film PRES as a mask, whereby the pixel electrodes PX is formed as shown in FIG. 53B. As shown in FIG. 53C, a protective film PSV is formed.

Figure 53D:
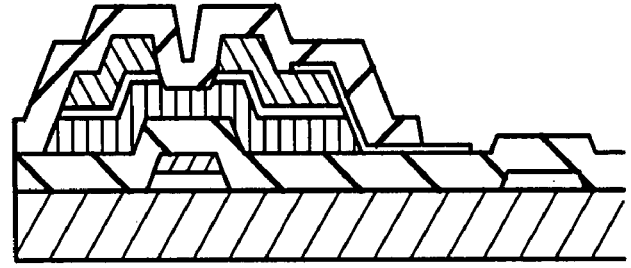

Then, as shown in FIG. 53D, an aperture is opened in the protective film PSV through a photo-process (not shown), thereby preparing a construction in which the protective film PSV is not formed in the central portion of the pixel area except the periphery thereof. Incidentally, at the same time that holes are formed in this protective film PSV, holes at the gate terminal parts GTM and the drain terminal parts DTM are also formed.

Incidentally, in each of the above-described embodiments, the Mo layer $d_1$ which constitutes the drain signal lines DL, the drain electrodes SD1 and the source electrodes SD2 are formed of molybdenum (Mo), but even if molybdenum (Mo) is replaced with another high melting point metal such as tungsten (W), chromium (Cr), titanium (Ti) or tantalum (Ta), it is possible to achieve similar advantages.

In addition, an IZO (Indium-Zinc-Oxide) film may also be used instead of each of the above-described ITO films. As is apparent from the foregoing description, in accordance with the liquid crystal display device according to the invention, it is possible to obtain a construction in which signal lines have small wiring resistivity.

In addition, in accordance with the liquid crystal display device according to the invention, it is possible to obtain a construction in which few steep steps are present on the liquid-crystal-side surface of a substrate. In addition, in accordance with the manufacturing method for the liquid crystal display device according to the invention, it is possible to reduce the number of processes in the manufacturing method.

The invention claimed is:

1. A manufacturing method for a liquid crystal display device which includes pixel areas provided on a liquid-crystal-side surface of either one of substrates disposed in opposition to each other with a liquid crystal interposed therebetween, each of the pixel areas being surrounded by gate signal lines disposed to be extended in the x direction and to be juxtaposed in the y direction and drain signal lines disposed to be extended in the y direction and to be juxtaposed in the x direction;

each of the pixel areas including:
a switching element to be driven by a gate signal from either one of the gate signal lines;
a pixel electrode to be supplied with a video signal from the drain signal line via the switching element; and
a counter electrode for causing an electric field to be generated between the counter electrode and the pixel electrode, the counter electrode being formed between the substrate and the pixel electrode, the manufacturing method comprising the steps of:
forming, on either one of the substrates, a stacked structure in which a first material layer and a second material layer are stacked in that order, the first material layer for forming the gate signal line and the counter electrode, and the second material layer for forming the gate signal line;
forming a photoresist film on the upper surface of the stacked structure, the thickness of the photoresist film on the counter electrode is thinner than the thickness of the photoresist film on the gate signal line;
etching the second material layer by using the photoresist film as a mask and vanishing the photoresist film of thinner film thickness on the counter electrode; and
etching the first material layer by using the second material layer as a mask.

2. A manufacturing method for a liquid crystal display device according to claim 1, wherein the first material layer is made of an ITO (Indium-Tin-Oxide) film, and the second material layer is made of a Mo (Molybdenum) layer.

* * * * *